(12) United States Patent
Meguro et al.

(10) Patent No.: US 6,202,379 B1
(45) Date of Patent: Mar. 20, 2001

(54) MODULAR DEPLOYABLE ANTENNA

(75) Inventors: Akira Meguro; Jin Mitsugi; Kazuhide Ando, all of Kanagawaken (JP)

(73) Assignee: Nippon Telegraph & Telephone Corp. (JP)

( * ) Notice: Subject to any disclaimer, the term of this patent is extended or adjusted under 35 U.S.C. 154(b) by 0 days.

(21) Appl. No.: 09/120,671

(22) Filed: Jul. 22, 1998

Related U.S. Application Data

(62) Division of application No. 08/535,661, filed on Sep. 28, 1995, now Pat. No. 5,787,671.

(30) Foreign Application Priority Data

| | | |
|---|---|---|
| Sep. 28, 1994 | (JP) | P6-233138 |
| Sep. 28, 1994 | (JP) | P6-233719 |
| Sep. 28, 1994 | (JP) | P6-233734 |
| Oct. 18, 1994 | (JP) | P6-252099 |
| Oct. 18, 1994 | (JP) | P6-252111 |
| Oct. 18, 1994 | (JP) | P6-252240 |
| Oct. 18, 1994 | (JP) | P6-252246 |
| Oct. 27, 1994 | (JP) | P6-263922 |
| Oct. 27, 1994 | (JP) | P6-263930 |
| Nov. 1, 1994 | (JP) | P6-269091 |
| Nov. 1, 1994 | (JP) | P6-269092 |

(51) Int. Cl.$^7$ ................................................. E04H 14/00
(52) U.S. Cl. ................ 52/653.1; 52/79.4; 52/79.5; 52/80.2; 52/81.1; 52/81.2; 52/646; 52/653.2; 52/654.1; 52/DIG. 10; 343/915
(58) Field of Search ................... 52/646, 653.1, 52/653.2, 654.1, 80.1, 80.2, 81.1, 81.2, 79.4, 79.5, DIG. 10, 915; 343/915

(56) References Cited

U.S. PATENT DOCUMENTS

| | | | |
|---|---|---|---|
| 4,527,362 | * | 7/1985 | Tobey et al. ................... 52/646 X |
| 4,771,585 | * | 9/1988 | Onoda et al. ..................... 52/646 |
| 4,813,191 | * | 3/1989 | Huang ............................ 52/646 X |
| 5,125,206 | * | 6/1992 | Motohashi et al. ............... 52/646 |
| 5,228,258 | * | 7/1993 | Onoda et al. ..................... 52/646 |

* cited by examiner

*Primary Examiner*—Christopher T. Kent
(74) *Attorney, Agent, or Firm*—Banner & Witcoff, Ltd.

(57) ABSTRACT

The present invention provides a transformable linked structure, a deployable diagonal structure, a plane stowage-type deployable truss and a line stowage-type deployable truss with high rigidity and reliability constituted by the above-described transformable linked structure and the above-described deployable diagonal structure, and also provides a plane/line stowage truss structure extremely approximated to a spherical surface using the two types of deployable trusses. The present invention discloses a module linked structure for linking deployable trusses securely and a holding/releasing mechanism for realizing reliable holding and release. Further, the present invention provides a modular deployable antenna with high precision even if it is large-sized which is realized by spreading mesh on the plane/line stowage truss structure.

7 Claims, 53 Drawing Sheets

FIG. 55
FIG. 56
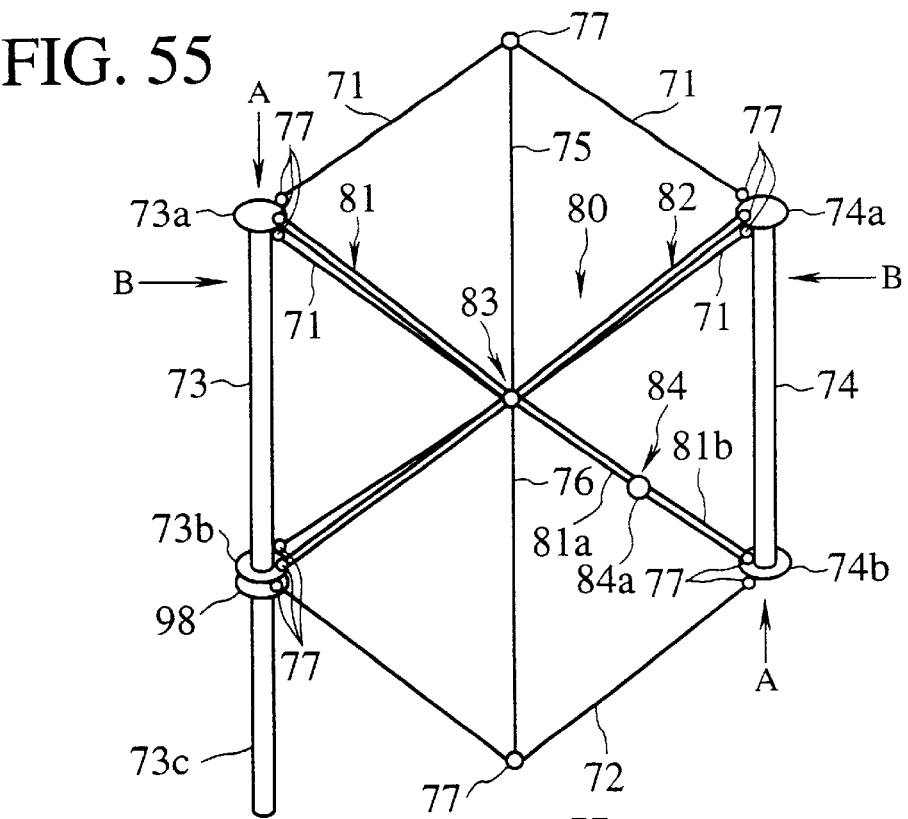
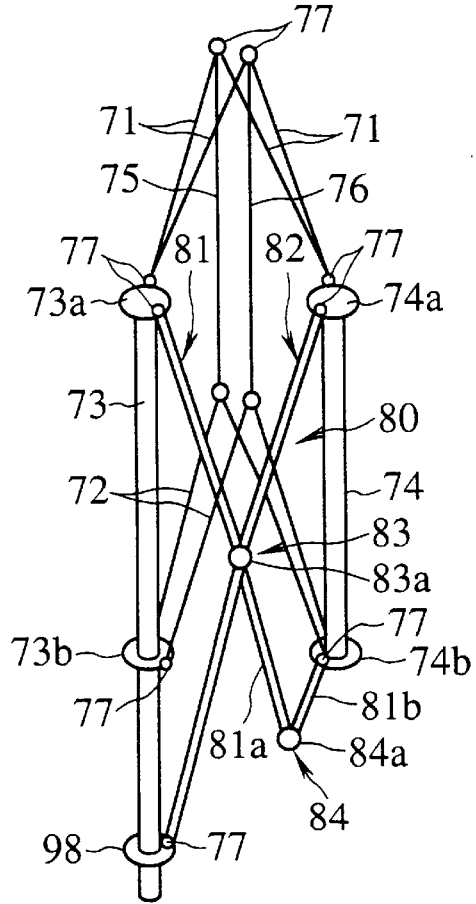

MODULAR DEPLOYABLE ANTENNA

This application is a divisional of U.S. application Ser. No. 08/535,661, filed Sep. 28, 1995, now U.S. Pat. No. 5,787,671.

BACKGROUND OF THE INVENTION

1. Field of the Invention

The present invention relates to a modular deployable antenna, to particularly the one applicable as a transmit-receive antenna 10 to 15 m long mounted in a mobile communications satellite, as an antenna for a remote-sensing satellite for investigating resources, and to a geostationary platform and a solar beam converging panel for a space station.

2. Description of the Related Art

The development of a large-sized deployable antenna applicable to a variety of purposes such as communication, broadcasting, and further survey of the earth and deep space is accelerated for the purpose of communicating more information at present. The basic idea in design of the large-sized deployable antenna varies considerably depending upon practicability, profitability or a purpose of use. For example, for an antenna applied to a communication or broadcasting satellite requiring a large-sized deployed reflector, efficiency of stowing an antenna into a launched satellite, light weight, reliability of a deploying mechanism and precision after deployment are primarily required. For such an antenna applied to such a satellite requiring a high-precision reflector, choice of material suitable for the location of use and reflector forming technique are required. In case an antenna is assembled in an orbit, the technique of assembling in an orbit is primarily required.

Referring to a large-sized deployed reflector, various types are developed at present. A deployable truss mesh type in which metallic mesh is spread on a deployable trussed back structure, an inflatable type which is hardened in a predetermined shape by expanding it with gas pressure, and a tension truss type constituted by an extensible mast mounted on the central support structure and extending outside the radius and specular mesh spread over the central support structure by the mast are contained.

Referring to the deployable truss mesh type above all, generally the back structure is constituted by combining plural modules constituted by a triangle or hexagonal prism serially, and mesh is fixed on a stand-off which is different in height respectively provided with an individual module.

Referring to the deployable truss mesh type, it is first required that sufficient precision of a reflector is kept even if the reflector is enlarged. It is also required that a reflector is rigid through it is kept light or lightened more. Further, the deploying and stowing operation must be smooth and reliable. Furthermore, to realize effective modularization, linkage or detachment of modules must be facilitated.

At present an antenna approximately 5 to 30 m in diameter is developed all over the world, however, in any case, the frequency band is $\overline{L}$ band.

SUMMARY OF THE INVENTION

The object of the present invention is to provide a modular deployable antenna which can handle a highfrequency wave wherein sufficient surface accuracy can be kept even if a reflector is enlarged, a reflector can be kept rigid through it is kept light or lightened more and further deploying and stowing operation is smooth and reliable.

Another object of the present invention is to provide a plane/line stowage trussed structure for mounting securely on the base structure constituting a large plane as a whole.

The other object of the present invention is to provide a plane stowage-type deployable truss for mounting securely on the base structure with high rigidity and reliability of deployment which can construct a plane structure by combining several plane stowage-type deployable trusses.

The other object different from the above-described of the present invention is to provide a line stowage-type deployable truss with high rigidity and reliability of deployment which can construct a plane structure by combining several line stowage-type deployable trusses.

The other object different from the above-described of the present invention is to provide a module linkage mechanism which facilitates attachment or detachment of modules even if the modules are constituted complicatedly.

The other object different from the above-described of the present invention is to provide a holding release mechanism which can hold a movable object securely in a given position to prevent vibration, can release it securely in the home position and may not damage it when released.

The other object different from the above-described of the present invention is provide a linked structure which can constitute a structure with curvature readily, is very rigid and has a simple structure.

The other object different from the above-described of the present invention is to provide a deployable diagonal structure which is effective for shearing or other force and can improve structural strength.

To achieve the above-described objects, the present invention provides a linked structure comprising two opposite parallel members; two opposite nonparallel members forming a quadrangle together by coupling them to the above-described parallel members through a hinge; and a intermediate coupling member coupled through a hinge so that it is parallel to one of the above-described nonparallel members in the middle of each of the above-described parallel members wherein the distance between the the hinges for the other nonparallel member can be changed.

In a preferred embodiment according to the present invention, the above-described distance can be changed by constituting so that an end of one of above-described parallel members can be moved along an end of corresponding nonparallel member.

In a preferred embodiment according to the present invention, the above-described distance can be changed by extending or contracting the other nonparallel member.

In a preferred embodiment according to the present invention, one end of the further provided diagonal member is connected to the corner of the above-described other nonparallel member, the other end is connected to the above-described one nonparallel member through a slider, and the above-described slider can be moved along the axis of the above-described one nonparallel member.

To achieve the above-described objects, the present invention provides a deployable diagonal structure comprising two opposite longitudinal members; and two diagonal members with a rotatable intersection for coupling the above-described two longitudinal members wherein the above-described two diagonal members can be deployed or stowed as if they are separating or approating.

In a preferred embodiment according to the present invention, each end of the above-described two longitudinal members is coupled to each end of the above-described two diagonal members and the above-described two diagonal members are provided with a folding or unfolding portion respectively between the above-described intersection and a connection point with one end of the above-described longitudinal member.

In a preferred embodiment according to the present invention, each end of one of the above-described two longitudinal members is coupled to each end of one of the above-described two diagonal members and each end of the other of the above-described two diagonal members is coupled to the above-described two longitudinal members so that they can be moved along the axis.

In a preferred embodiment according to the present invention, each end of one of the above-described two longitudinal members is coupled to each end of one of the above-described two diagonal members, the other end of one of the above-described two diagonal members is coupled to the end of one of the above-described two longitudinal members, the one diagonal member is provided with a folding or unfolding portion between the above-described intersection and a coupled portion with the longitudinal member and the other end of the other of the above-described two diagonal members is coupled to the other of the above-described two longitudinal members so that it can be moved along the axis.

To achieve the above-described objects, the present invention provides a truncated hexagonal plane stowage-type deployable truss comprising first six horizontal members forming a hexagon on one side; second six horizontal members forming a hexagon on the other side; six longitudinal members coupling each corresponding vertexes of a hexagon on one side and a hexagon on the other side; and six sides formed by adjacent longitudinal members and first and second horizontal members wherein a set of opposite sides is constituted by a fixed frame, other sides are constituted by adjacent two sets of transformable frames and deploying/ stowing operation is performed as a whole when the above-described one set of fixed frames separate or approach mutually.

In a preferred embodiment according to the present invention, a central longitudinal member is provided so that it may pierce the centers of hexagons on one side and on the other side, a first radial member coupling one side of this central longitudinal member and one side of each longitudinal member located on each fixed frame is provided, a second radial member coupling the other side of the central longitudinal member and the other side of each longitudinal member located on each fixed frame is provided and the above-described transformable frame is constituted by the central longitudinal member, a pair of the first and second radial members and corresponding longitudinal members.

In a preferred embodiment according to the present invention, a first folding/unfolding member coupling one side of the central longitudinal member and one side of each longitudinal member located in the center of the adjacent transformable frame is provided, a second folding/unfolding member coupling the other side of the central longitudinal member and the other side of each longitudinal member located in the center of the adjacent transformable frame is provided, and the first and second folding/unfolding members are stretched straight when deployed and hold one or the other hexagon.

In a preferred embodiment according to the present invention, a cable is set on a diagonal of the above-described transformable frame, one end of the cable is constituted so that it can be wound and the other end is connected to the upper end or lower end of any longitudinal member, and the above-described deploying/stowing operation is performed by transforming the above-described transformable frame by such winding.

A preferred embodiment according to the present invention provides a truncated hexagonal plane stowage-type deployable truss comprising first six horizontal members forming a hexagon on one side; second six horizontal member forming a hexagon on the other side; and six longitudinal members coupling each corresponding vertex of a hexagon on one side and a hexagon on the other side and having six sides formed by adjacent longitudinal members and the first and second horizontal members wherein a set of opposite sides are constituted by fixed frames, the other sides are constituted by adjacent two sets of transformable frames and deploying/stowing operation is performed as a whole when the above-described one set of fixed frames separate or approach mutually; and as the above-described transformable frame, also provides linked structures comprising two opposite parallel members; two opposite nonparallel members forming a quadrangle by being coupled to the above-described parallel members through a hinge; and a middle coupled member coupled through a hinge so that it is parallel to one of the above-described nonparallel members in the middle of each of the above-described parallel members wherein distance between hinges for the other nonparallel member can be changed and wherein distance between the hinges can be changed by constituting so that one end of one of the above-described parallel members can be moved along one end of the corresponding nonparallel member.

A preferred embodiment according to the present invention provides a truncated hexagonal plane stowage-type deployable truss comprising first six horizontal members forming a hexagon on one side; second six horizontal members forming a hexagon on the other side; and six longitudinal members coupling each corresponding vertex of a hexagon on one side and a hexagon on the other side and having six sides formed by adjacent longitudinal members and the first and second horizontal members wherein a set of opposite sides are constituted by fixed frames, the other sides are constituted adjacent two sets of transformable frames and deploying/stowing operation is performed as a whole when the above-described one set of fixed frames separate or approach mutually; and as the above-described transformable frame, also provides opposite linked structures comprising two opposite parallel members; two opposite nonparallel members forming a quadrangle by coupling to the above-described parallel members through a hinge; and a middle coupled member coupled through a hinge so that it is parallel to one of the above-described nonparallel members in the middle of each of the above-described parallel members wherein distance between hinges for the other nonparallel member can be changed, and distance between the hinges can be changed by constituting the other nonparallel member so that it can be extended or shortened.

A preferred embodiment according the present invention provides a truncated hexagonal plane stowage-type deployable truss comprising first six horizontal members forming a hexagon on one side; second six horizontal members forming a hexagon on the other side; and six longitudinal members coupling each corresponding vertex of a hexagon on one side and a hexagon on the other side and having six sides formed by adjacent longitudinal members and the first and second horizontal members wherein a set of corresponding sides are constituted by fixed frames, the other sides are constituted by adjacent two sets of transformable frames and deploying/stowing operation is performed as a whole when the above-described one set of fixed frames separate or approach mutually; and as the above-described transformable frame, also provides opposite linked structures comprising two opposite parallel members; two opposite nonparallel members forming a quadrangle by being coupled to the above-described parallel members through a hinge; and a middle coupled member coupled through a hinge so that it is parallel to one of the above-described nonparallel members in the middle of each of the above-described parallel members wherein distance between hinges for the other nonparallel member can be changed, further comprising opposite members of which other end is coupled to the above-described one nonparallel member through a slider the other end wherein one end is coupled to the corner of the above-described other nonparallel member and the above-described slider can be moved along the axis of the above-described one nonparallel member. To achieve the above-described objects, the present invention provides a truncated pyramid line stowable-type deployable truss comprising first even horizontal members forming a an even-numbered polygon on one side; second even horizontal members forming a an even-numbered polygon on the other side; and even longitudinal members coupling each corresponding vertex of a an even-numbered polygon on one side and a an even-numbered polygon on the other side and having even sides formed by adjacent longitudinal members and the first and second horizontal members wherein each of the above-described first and second horizontal members is coupled to each of the above-described longitudinal members so that it can swing along each side, at least every other side is constituted by a transformable frame and deploying/stowing operation is performed as a whole when each longitudinal member separate or approach mutually.

In a preferred embodiment according to the present invention, a cable is set on a diagonal of the above-described transformable frame, one end of the cable can be wound, the other end is connected to the upper or lower end of any longitudinal member and the above-described deploying/stowing operation is performed by transforming the above-described transformable frame by winding.

A preferred embodiment according to the present invention provides a truncated pyramid line stowage-type deployable truss comprising first even horizontal members forming a an even-numbered polygon on one side; second even horizontal members forming an even-numbered polygon on the other side; and even longitudinal members coupling each corresponding vertex of an even-numbered polygon on one side and an even-numbered polygon on the other side and having even sides formed by adjacent longitudinal members and the first and second horizontal members wherein each of the above-described first and second horizontal members is coupled to each of the above-described longitudinal members so that it can swing along each side, at least every other side is constituted by a transformable frame, deploying/stowing operation is performed as a whole when each longitudinal member separates or approaches mutually, and as the above-described transformable frame, also provides a linked structure comprising two opposite parallel members; two opposite nonparallel members forming a quadrangle by being coupled to the above-described parallel members through a hinge; and a middle coupled member coupled through a hinge so that it is parallel to one of the above-described nonparallel members in the middle of each of the above-described parallel members wherein distance between hinges for the other nonparallel member can be changed and distance between the hinges can be changed by constituting so that one end of one the above-described parallel members can be moved along one end of the corresponding nonparallel member.

A preferred embodiment according to the present invention provides a truncated pyramid line stowage-type deployable truss comprising first even horizontal members forming an even-numbered polygon on one side; second even horizontal members forming an even-numbered polygon on the other side; and even longitudinal members coupling each corresponding vertex of an even-numbered polygon on one side and an even-numbered polygon on the other side and having even sides formed by adjacent longitudinal members and the first and second horizontal members wherein each of the above-described first and second horizontal members is coupled to each of the above-described longitudinal members so that it can swing along each side, at least every other side is constituted by a transformable frame and deploying/stowing operation is performed as a whole when each longitudinal member separate or approach mutually, and as the above-described transformable frame, also provides a linked structure comprising two opposite parallel members; two opposite nonparallel members forming a quadrangle by being coupled to the above-described parallel members through a hinge; and a middle coupled member coupled through a hinge so that it is parallel to one of the above-described nonparallel members in the middle of each of the above-described parallel members wherein distance between hinges for the other nonparallel member can be changed and distance between the hinges can be changed by constituting so that the other nonparallel member can be extended or shortened.

A preferred embodiment according to the present invention provides a truncated pyramid line stowage-type deployable truss comprising first even horizontal members forming an even-numbered polygon on one side; second even horizontal members forming an even-numbered polygon on the other side; and even longitudinal members coupling each corresponding vertex of an even-numbered polygon on one side and an even-numbered polygon on the other side and having even sides formed by adjacent longitudinal members and the first and second horizontal members wherein each of the above-described first and second horizontal members is each of the above-described longitudinal members so that it can swing along each side, at least every other side is constituted by a transformable frame and deploying/stowing operation is performed as a whole when each longitudinal member separate or approach mutually; and as the above-described transformable frame, also provides a linked structure comprising two opposite parallel members; two opposite nonparallel members forming a quadrangle by being coupled to the above-described parallel members through a hinge; and a middle coupled member coupled through a hinge so that it is parallel to one of the above-described parallel members in the middle of each of the above-described parallel members, further comprising opposite members of which one end is coupled to the corner of the above-described other nonparallel member and of which the other end is coupled to the above-described one nonparallel member through a slider wherein distance between hinges for the other nonparallel member can be changed, and the above-described slider is constituted so that it can be moved along the axis of the above-described one nonparallel member.

A preferred embodiment according to the present invention provides a truncated pyramid line stowage-type deployable truss comprising first even horizontal members forming an even-numbered polygon on one side; second even horizontal members forming an even-numbered polygon on the other side; and even longitudinal members coupling each corresponding vertex of an even-numbered polygon on one side and an even-numbered polygon on the other side and having even sides formed by adjacent longitudinal members and the first and second horizontal members wherein each of the above-described first and second horizontal members is coupled to each of the above-described longitudinal members so that it can swing along each side, at least every other side is constituted by a transformable frame, and deploying/stowing operation is performed as a whole when each longitudinal member separate or approach mutually; and as the above-described transformable frame, also provides a linked structure comprising two opposite parallel members; two opposite nonparallel members forming a quadrangle by being coupled to the above-described parallel members through a hinge; and a middle coupled member coupled through a hinge so that it is parallel to one of the above-described nonparallel members in the middle of each of the above-described parallel members wherein distance between the hinges for the other nonparallel member can be changed. and distance between the hinges can be changed by constituting so that one end of one of the above-describe(d parallel members can be moved along one end of the corresponding nonparallel member. Further in the preferred embodiment, central longitudinal members piercing the centers of one even-numbered polygon and the other even-numbered polygon are provided, a first radial member coupling one side of the central longitudinal member and one side of the above-described other nonparallel member is provided, a second radial member coupling the other side of the central longitudinal member and the other side of the above-described other nonparallel member is provided, and the above-transformable frame is constituted by the central longitudinal member, a pair of the first and second radial members and the corresponding longitudinal members.

To achieve the above-described objects, the present invention provides a plane/line stowage truss structure comprising plane stowage-type deployable truss in which deploying/stowing operation is performed as a whole when opposite fixed frames separate or approach mutually; line stowage-type deployable truss in which as a whole deploying/stowing operation is performed radially with a stowage position in the center wherein the above-described plane stowage-type deployable truss and line stowage-type deployable truss are arranged so that each other covers a portion which cannot be occupied, and as a whole they are constituted so that they have a plane expanse when deployed.

In a preferred embodiment according to the present invention, the base structure is provided, the above-described plane stowage-type deployable truss is coupled on the above-described base structure through the above-described fixed frame, plural plane stowage-type deployable trusses are coupled in a row through respective fixed frames, and the above-described line stowage-type deployable truss is arranged in distance between rows consisting of the above-described plane stowage-type deployable trusses.

In a preferred embodiment according to the present invention, one or plural fixed trusses are provided, the above-described plane stowage-type deployable truss is coupled to the above-described fixed truss through the above-described fixed frame, plural plane stowage-type deployable trusses are coupled in a row through respective fixed frames, and the above-described line stowage-type deployable truss is arranged in distance between rows consisting of the above-described plane stowage-type deployable trusses.

In a preferred embodiment according to the present invention, the above-described plane stowage-type deployable truss and the above-described line stowage-type deployable truss are constituted by the like of a truncated pyramid with even angles and as a whole they are constituted so that they have a plane expanse when deployed.

In a preferred embodiment according to the present invention, the above-described plane stowage-type deployable truss and the above-described line stowage-type deployable truss are constituted by the like of a truncated pyramid with even angles and as a whole they are constituted so that they have a curved expanse when deployed.

A preferred embodiment according to the present invention provides a plane/line stowage truss structure comprising a plane stowage-type deployable truss in which deploying/stowing operation is performed as a whole when opposite fixed frames separate or approach mutually and a line stowage-type deployable truss in which as a whole deploying/stowing operation is performed radially with a stowage position in the center wherein the above-described plane stowage-type deployable truss and line stowage-type deployable truss are arranged so that each other covers a portion which cannot be occupied, and as a whole they are constituted so that they have a plane expanse when deployed, and the above-described plane stowage-type deployable truss and the above-described line stowage-type deployable truss are constituted by the like of a truncated pyramid with even angles and as a whole they are constituted so that they have a curved expanse when deployed; as the above-described plane stowage-type deployable truss, also provides a truncated hexagonal plane stowage-type deployable truss comprising first six horizontal members forming a hexagon on one side; second six horizontal members forming a hexagon on the other side; and six longitudinal members coupling each corresponding vertex of the hexagon on one side and the hexagon on the other side and having six sides formed by adjacent longitudinal members and the first and second horizontal members wherein a set of opposite sides are constituted by fixed frames, the other sides are constituted by adjacent two pairs of transformable frames, and as a whole deploying/stowing operation is performed when the above-described one set of fixed frames separate or approach mutually; and as the above-described line stowage-type deployable truss, further provides a truncated pyramid line stowage-type deployable truss comprising first even horizontal members forming a even-numbered polygon on one side; second even horizontal members forming an even-numbered polygon on the other side; and even longitudinal members coupling each corresponding vertex of the even-numbered polygon on one side and the even-numbered polygon on the other side and having even sides formed by adjacent longitudinal members and the first and second horizontal members wherein each of the above-described first and second horizontal members is coupled to each of the above-described longitudinal members so that it can swing along each side, at least every other side is constituted by a transformable frame, and as a whole deploying/stowing operation is performed when each longitudinal member separate or approach mutually.

To achieve the above-described objects, the present invention provides a module linkage mechanism for linking basic modules one another and constituting a structure consisting of plural modules, comprising a coupled member of which end is free; and a coupling member for engaging with the above-described free end around opposite coupled members wherein each module is disposed in an opposite position, in the above-described coupled member a coupling hole is provided at the position corresponding to the coupling member, in the above-described coupling member a lock member with a coupling projection for engaging with the above-described coupling hole is provided, a stopper member for stopping relative movement of the coupled member and the coupling member in contact with the free end of the above-described coupled member when the above-described coupling projection is engaged with the coupling hole is provided.

To achieve the above-described objects, the present invention provides a holding/releasing mechanism for holding a movable on the base structure fixedly or for releasing holding power for the movable comprising a support arm of which base is coupled to the base structure; a push rod which is located at the end of the support arm and of which end is coupled to the movable; and an intermediate link of which base is coupled to the end of the above-described support arm so that the above-described base can be turned and of which end is coupled to the base of the above-described push rod so that the end can be turned wherein at the end of the above-described intermediate link, a coupling/detaching means for coupling with the push rod or detaching from it is provided, the coupling/detaching means pulls the push rod toward the base structure securely when the end of the above-described intermediate link is turned on the side of the base of the support arm with the base as a support and holds the movable on the base structure fixedly, and coupling to the push rod is released when the end of the above-described intermediate link is turned on the side of an extension of the end of the support arm with the base as a support.

A preferred embodiment according to the present invention provides a plane/line stowage truss structure comprising a plane stowage-type deployable truss in which deploying/stowing operation is performed as a whole when opposite fixed frames separate or approach mutually; and a line stowage-type deployable truss in which deploying/stowing operation is performed as a whole radially with a convergent point in the center wherein the above-described plane stowage-type deployable truss and line stowage-type deployable truss are disposed so that each other covers a portion which cannot be occupied, and as a whole they are constituted so that they have a plane expanse when deployed; and in order to couple the above-described plane stowage-type deployable truss and line stowage-type deployable truss, also provides a module linkage mechanism for linking basic modules one another and constituting a structure consisting of plural modules comprising a coupled member disposed in an opposite position of modules of which end is free; and a coupling member for engaging with the above-described free end around opposite coupled members wherein in the above-described coupled member a coupling hole is provided in the corresponding position to the coupling member, in the above-described coupling member a lock member with a coupling projection for engaging with the above-described coupling hole is provided, a stopper member for stopping relative movement of the coupled member and the coupling member in contact with the free end of the above-described coupled member when the coupling member is engaged with the coupling hole is provided.

A preferred embodiment according to the present invention provides a plane/line stowage truss structure comprising a plane stowage-type deployable truss in which deploying/stowing operation is performed as a whole when opposite fixed frames separate or approach mutually; and a line stowage-type deployable truss in which deploying/stowing operation is performed as a whole radially with a convergent point in the center wherein the above-described plane stowage-type deployable truss and line stowage-type deployable truss are disposed so that each other covers a portion which cannot be occupied, and they are constituted so that they have a plane expanse as a whole when deployed; for the time when the above-described plane stowage-type deployable truss and line stowage-type deployable truss are deployed, also provides a holding/releasing mechanism for holding a movable on the base structure fixedly and releasing holding power for the movable comprising a support arm of which base is coupled to the base structure; a push rod located at the end of the support arm of which end is coupled to the movable; and an intermediate link of which base is coupled to the end of the above-described support arm so that the base can be turned and of which end is coupled to the base of the above-described push rod so that the end can be turned wherein at the end of the above-described intermediate link a coupling/detaching means for coupling to or detaching from the push rod is provided, the coupling/detaching means pulls the push rod toward the base structure securely when the end of the above-described intermediate link is turned on the side of the base of the support arm with the base as a support and holds the movable on the base structure fixedly, and releases coupling to the push rod when the end of the above-described intermediate link is turned on the side of an extension of the end of the support arm with the base as a support.

To achieve the above-described objects, the present invention provides an approximate spherical structure wherein truncated hexagonal plural structures are coupled at their each side so that either or both of the upper or/and lower face of each structure is/are like a spherical surface wherein the base structure constituted in the shape of a truncated regular hexagon of the above-described structures is provided and a radial position structure formed into the same spherical surface as a whole as structures ranged radially from each side of this base structure is provided.

A preferred embodiment according to the present invention provides an approximate spherical structure wherein a truncated hexagonal plural structures are coupled at their each side so that either or both of the upper or/and lower face of each structure is/are like a spherical surface, the base structure constituted in the shape of a truncated regular hexagon of the above-described structures is provided, and a radial position structure formed into the same spherical surface as a whole as structures ranged radially from each side of this base structure is provided; and as the above-described an approximate spherical structure, also provides a plane/line stowage truss structure comprising a plane stowage-type deployable truss in which deploying/stowing operation is performed as a whole when opposite fixed frames separate or approach mutually; and a line stowage-type deployable truss in which deploying/stowing operation is performed as a whole radially with a stowage position in the center wherein the above-described plane stowage-type deployable truss and line stowage-type deployable truss are disposed so that each other covers a portion which cannot be occupied, and they are constituted so that they have a plane expanse as a whole when deployed, the above-described plane stowage-type deployable truss and line stowage-type deployable truss are constituted in the shape of a truncated even-numbered polygon and they are constituted so that they have a curved expanse as a whole when deployed.

To achieve the above-described objects, the present invention provides a modular deployable antenna constituted by stretching mesh on an approximate spherical structure comprising an approximate spherical structure wherein truncated hexagonal plural structures are coupled at their each side so that either or both of the upper or/and lower face of each structure is/are like a spherical surface, the base structure constituted in the shape of a truncated regular hexagon of the above-described structures is provided, and a radial position structure formed into the same spherical surface as a whole as structures ranged radially from each side of this base structure is provided; and as the above-described an approximate spherical structure, also comprising a plane/line stowage truss structure comprising a plane stowage-type deployable truss in which deploying/stowing operation is performed as a whole when opposite fixed frames separate or approach mutually; and a line stowage-type deployable truss in which deploying/stowing operation is performed as a whole radially with a stowage position in the center wherein the above-described plane stowage-type deployable truss and line stowage-type deployable truss are disposed so that each other covers a portion which cannot be occupied and they are constituted so that they have a plane expanse as a whole when deployed, the above-described plane stowage-type deployable truss and line stowage-type deployable truss are constituted in the shape of a truncated even-numbered polygon and they are constituted so that they have a curved expanse as a whole when deployed.

The nature, principle and utility of the invention will become more apparent from the following detailed description when read in conjunction with the accompanying drawings.

BRIEF DESCRIPTION OF THE DRAWINGS

In the accompanying drawings:

FIG. 55 shows a second embodiment of a deployable diagonal structure according to the present invention.

FIGS. 56 and 57 show stowing process of a deployable diagonal structure according to a second embodiment.

DESCRIPTION OF THE PREFERRED EMBODIMENT

Embodiments according to the present invention will be described in detail based upon drawings below.

First, two types of deployable trusses, that is, a plane stowage-type deployable truss and a line stowage-type deployable truss which are a structural basis of a modular deployable antenna according to the present invention will be described below.

First, a plane stowage-type deployable truss will be described.

FIGS. 1 to 9 are explanatory drawings of a first embodiment of a plane stowage-type deployable truss.

Figure 1:
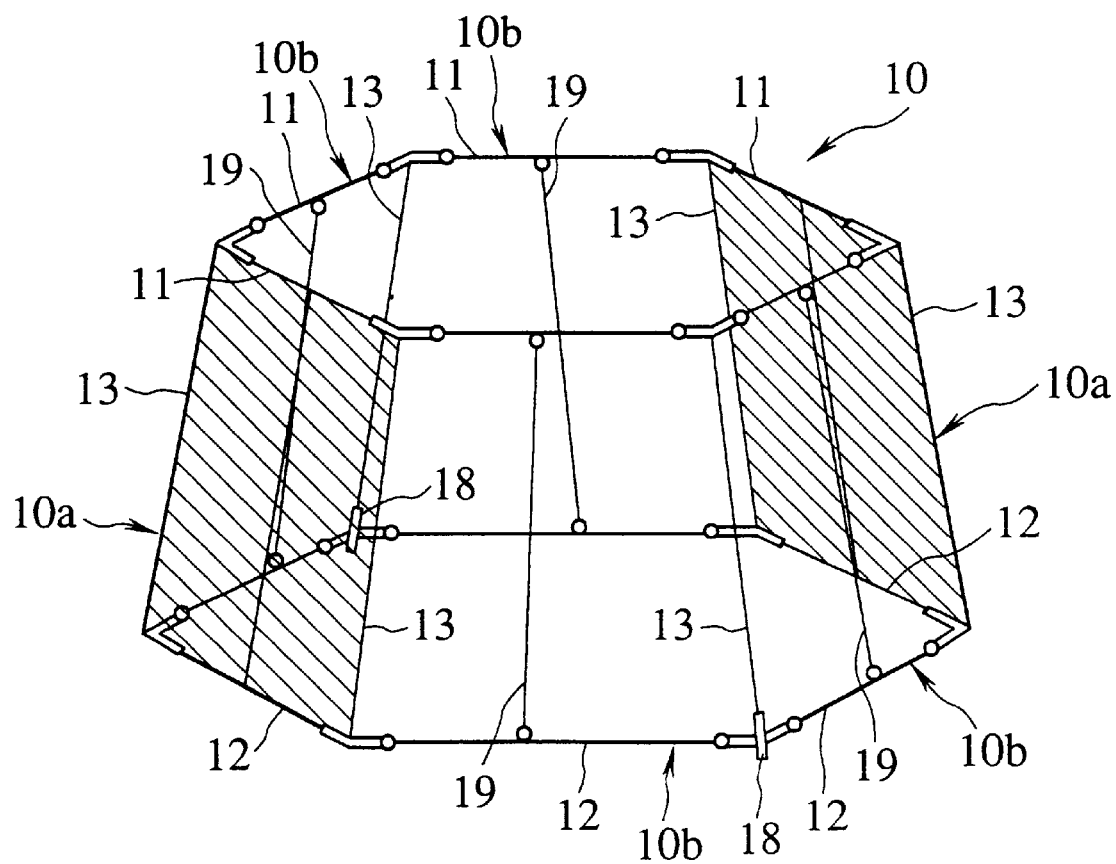
FIG. 1 is a perspective drawing showing a first embodiment of a plane stowage-type deployable truss according to the present invention.

Referring to FIG. 1, a plane stowage-type deployable truss 10 can be deployed in a truncated hexagon. That is, a hexagon is formed by first six horizontal members 11 provided on one side, another regular hexagon is formed by second six horizontal members 12 provided on the other side, and longitudinal members 13 are constituted so that they can couple each vertex of hexagons on one and the other sides. Six sides are formed in the shape of a trapezoid by adjacent longitudinal members 13 and the first and second horizontal members 11 and 12.

A set of opposite sides in the plane stowage-type deployable truss 10 are constituted by fixed frames 10a and other sides are constituted by two sets of transformable frames 10b disposed so that they are adjacent. The fixed frame 10a is constituted by coupling the first and second horizontal members 11 and 12 to a longitudinal member 13 fixedly. The transformable frame 10b is constituted by coupling the first and second horizontal members 11 and 12 to each longitudinal member 13 so that they can swing along each side on which they exist.

A parallel swing member 19 for swinging the first and second horizontal members 11 and 12 holding them in parallel is provided for each transformable frame 10b and a slider 18 is provided so that it can be moved along the axis for the longitudinal member 13 located in the center of the adjacent transformable frame 10b.

The parallel swing member 19 is arranged in parallel to the longitudinal member 13 nearest to the fixed frame 10a adjacent to the transformable frame 10b. The parallel swing member 19 is coupled to the first and second horizontal members 11 and 12 so that it can swing along each side constituting a transformable frame 10b. One end of the second horizontal member 12 in the transformable frame 10b is coupled to a slider 18 so that it can swing. However, the direction in which the second horizontal member 12 can swing is the one along each side constituting the transformable frame 10b. The slider 18 may also be provided on one side (on the upper side in the drawing) and the first horizontal member 11 in the transformable frame 10b may be coupled to a slider 18 so that it can swing.

Next, referring to FIGS. 2 to 7, deployment motion of a plane stowage-type deployable truss 10 constituted as described above will be described below.

Figure 2:
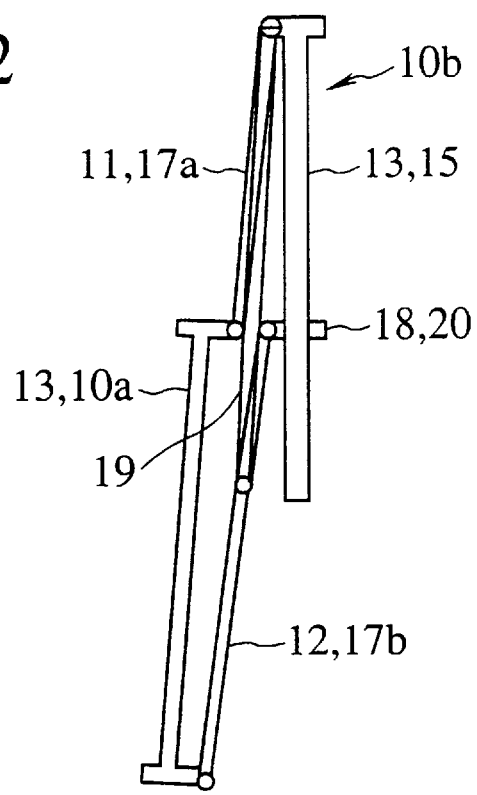
FIG. 2 shows the folded state of a transformable frame.
Figure 3:
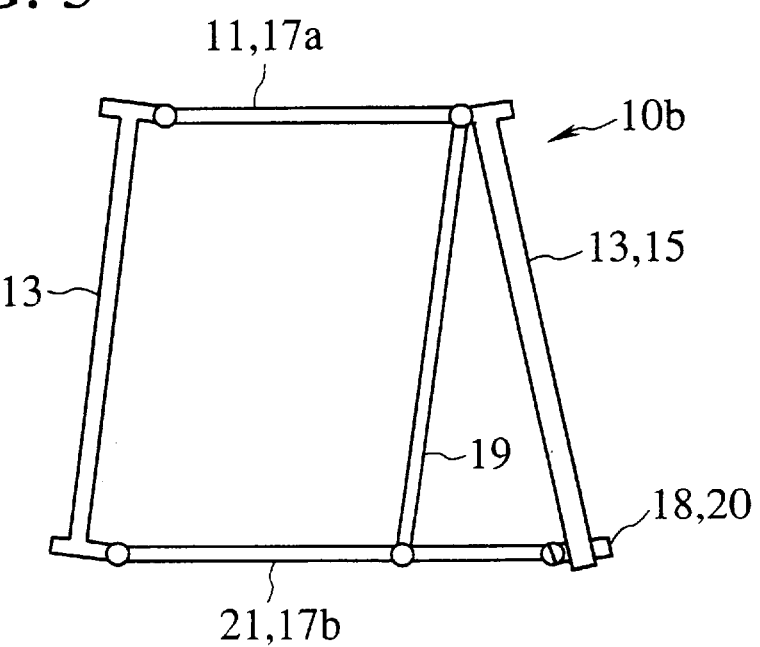
FIG. 3 shows the deployed state of a transformable frame.
Figure 4A:
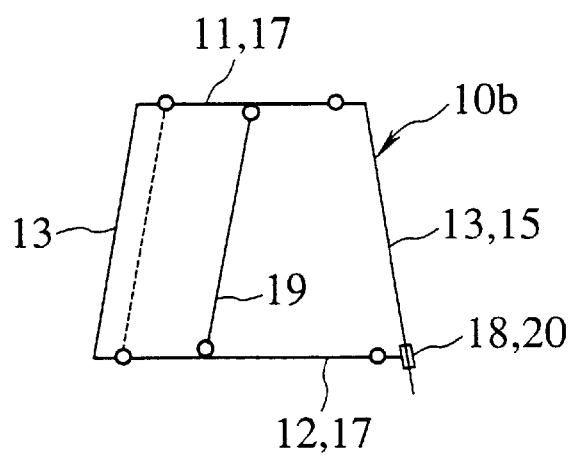
FIGS. 4A to 4F are explanatory drawings of detailed movement of a transformable frame.
Figure 4B:
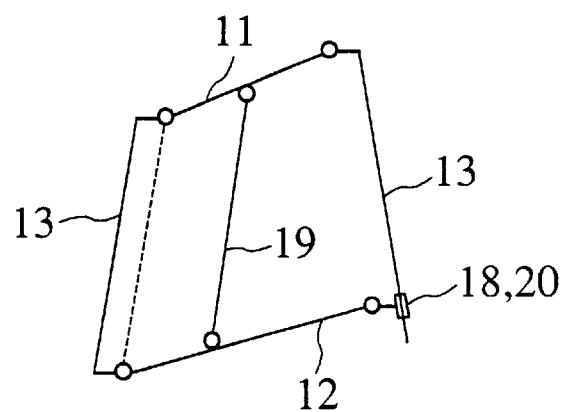
Figure 4C:
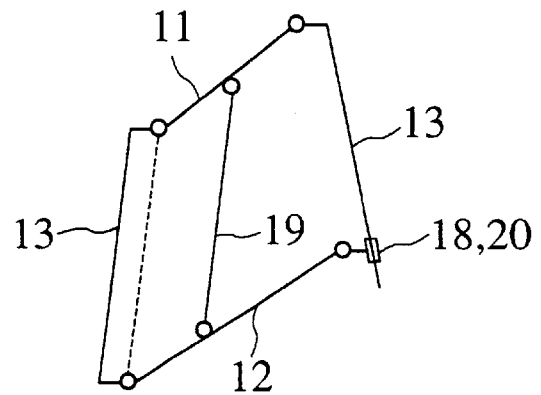
Figure 4D:
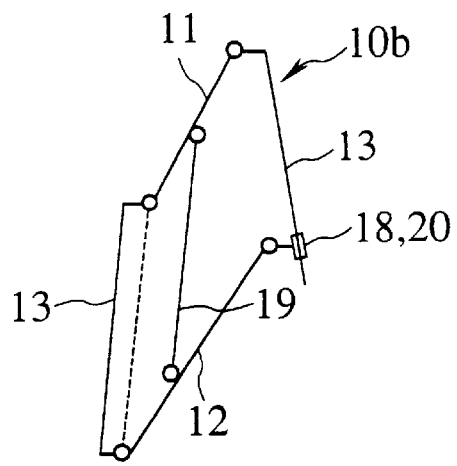
Figure 4E:
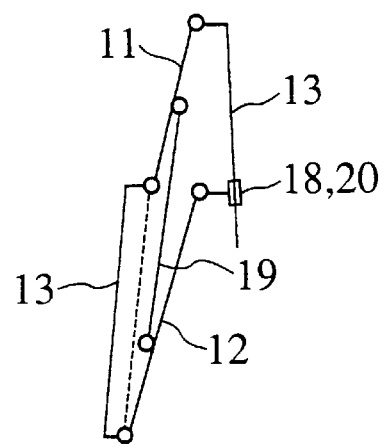
Figure 4F:
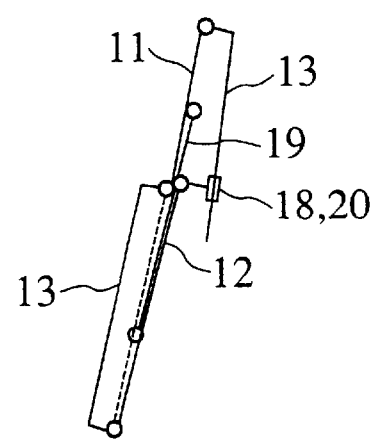

First, referring to FIGS. 2 and 3, movement of the transformable frame 10b will be described. FIG. 2 shows the transformable frame 10b in a folded state and FIG. 3 shows the transformable frame 10b in a deployed state. That is, when a slider 18 is moved on one side (on the upper side in the drawing) along a longitudinal member 13 from a deployed state shown in FIG. 3, the first horizontal member 11 and the second horizontal member 12 approach with each other kept in parallel due to a parallel swing member 19. A longitudinal member 13 on the side of the transformable frame 10b (a longitudinal member 13 with a slider 18) and a longitudinal member 13 on the side of the fixed frame 10a approach, shifting upward or downward, and the transformable frame is folded as shown in FIG. 2. FIGS. 4A to 4F show the process in detail. The swinging angle of the first and second horizontal members 11 and 12 is decided depending upon the position of a slider 18 uniquely. Therefore, if a slider 18 can be fixed in a predetermined position by a stopper, for example, the transformable frame can be fixed in a folded or deployed state.

Even if a slider 18 is moved on the other side (on the down side in the drawing) along a longitudinal member 13 from in the deployed state shown in FIG. 3 though not shown in FIGS. 2 to 4F, the first and second horizontal members 11 and 12 approach with each other kept in parallel, and a longitudinal member 13 on the side of the transformable frame 10b and a longitudinal member 13 on the side of the fixed frame 10a approach, shifting upward or downward. However, a longitudinal member 13 on the side of the transformable frame 10b is located in the lower position than a longitudinal member 13 on the side of the fixed frame 10a.

Figure 5:
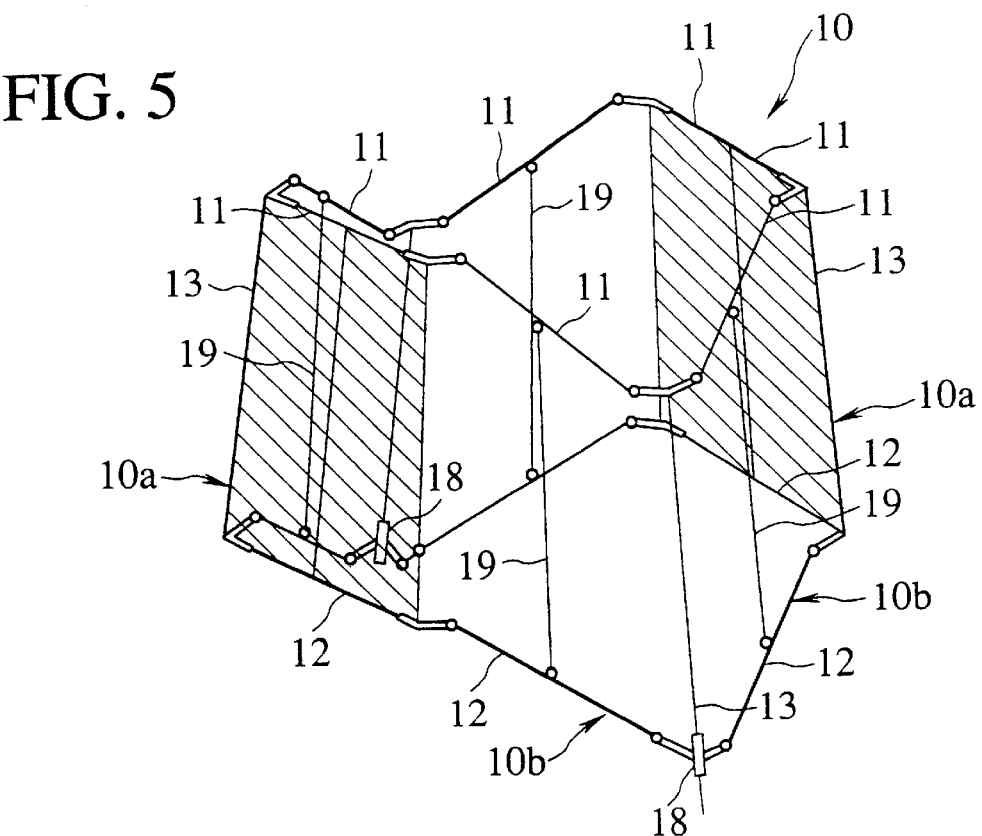
FIGS. 5 to 7 show stowing process of a plane stowage-type truss.
Figure 6:
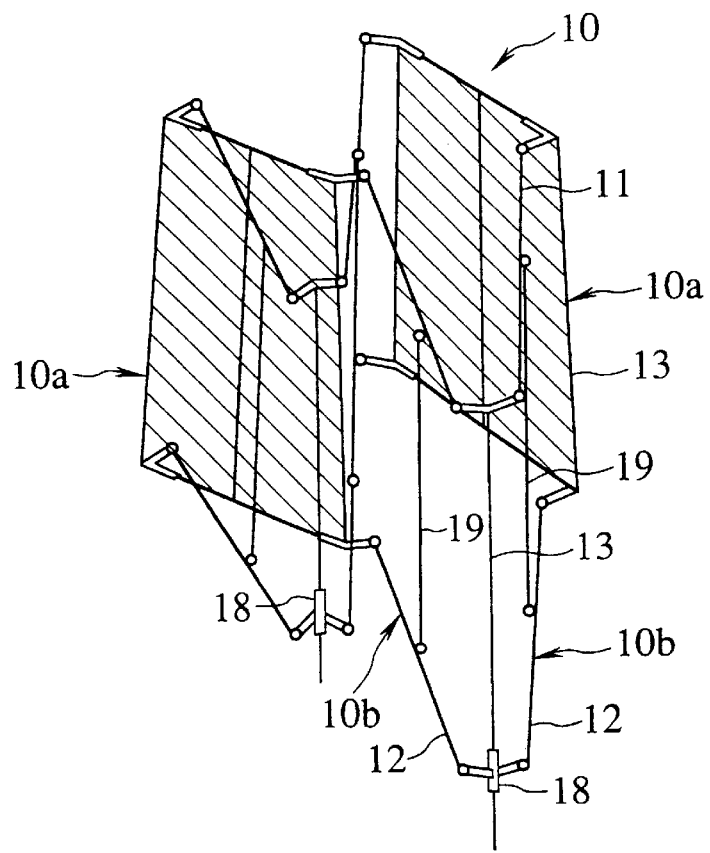
Figure 7:
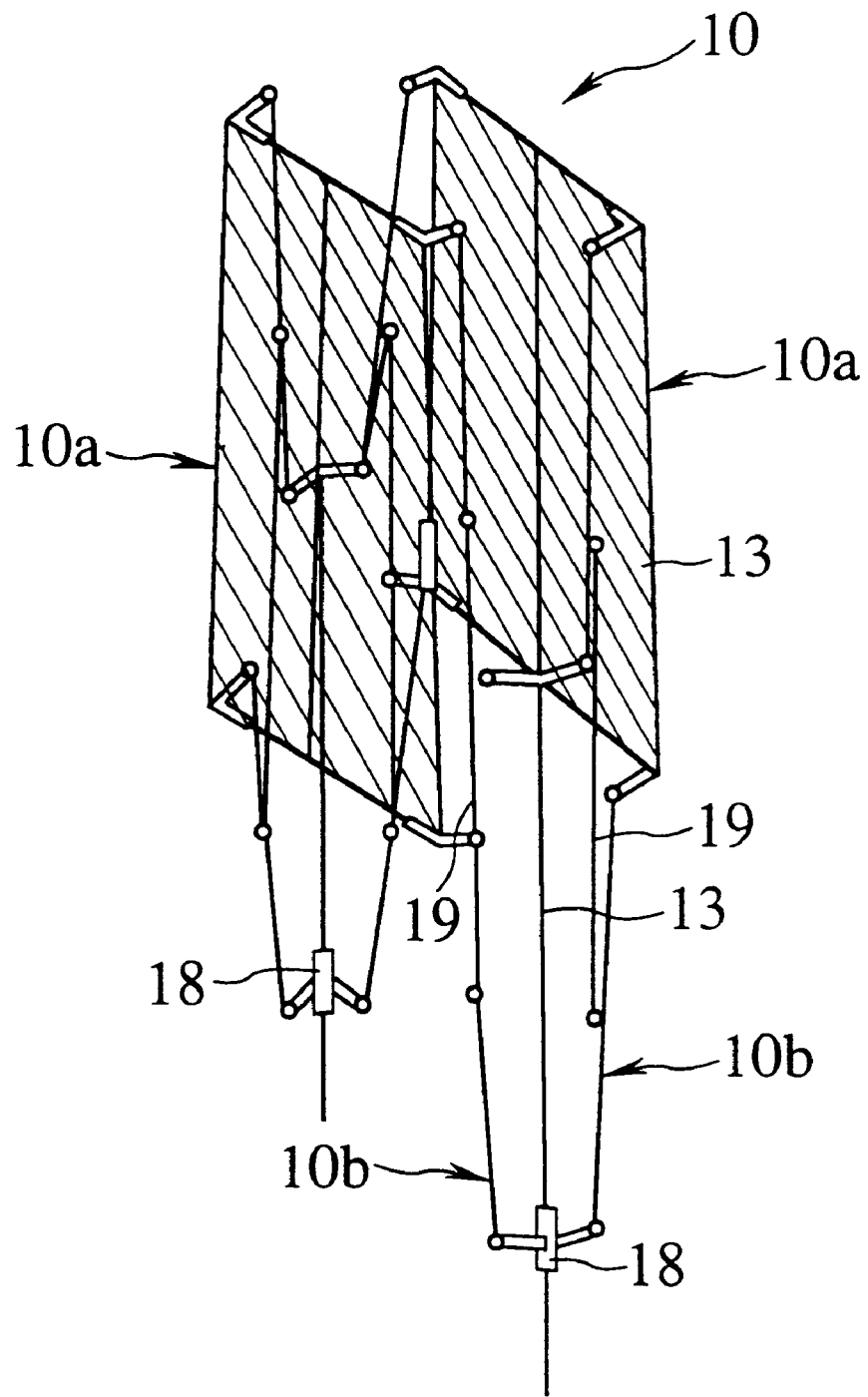

FIGS. 5 to 7 show overall movement of the plane stowage-type deployable truss 10. A longitudinal member 13 on the side of the fixed frame 10a and a longitudinal member 13 on the side of the transformable frame 10b approach by moving a slider 18 downward and the plane stowage-type deployable truss 10 is completely folded as shown in FIG. 7 after the state being folded shown in FIGS. 5 and 6 from the deployed state shown in FIG. 1. At this time, opposite fixed frames 10a approach, moving in parallel from the plane view and are almost close in a completely folded state.

Figure 8:
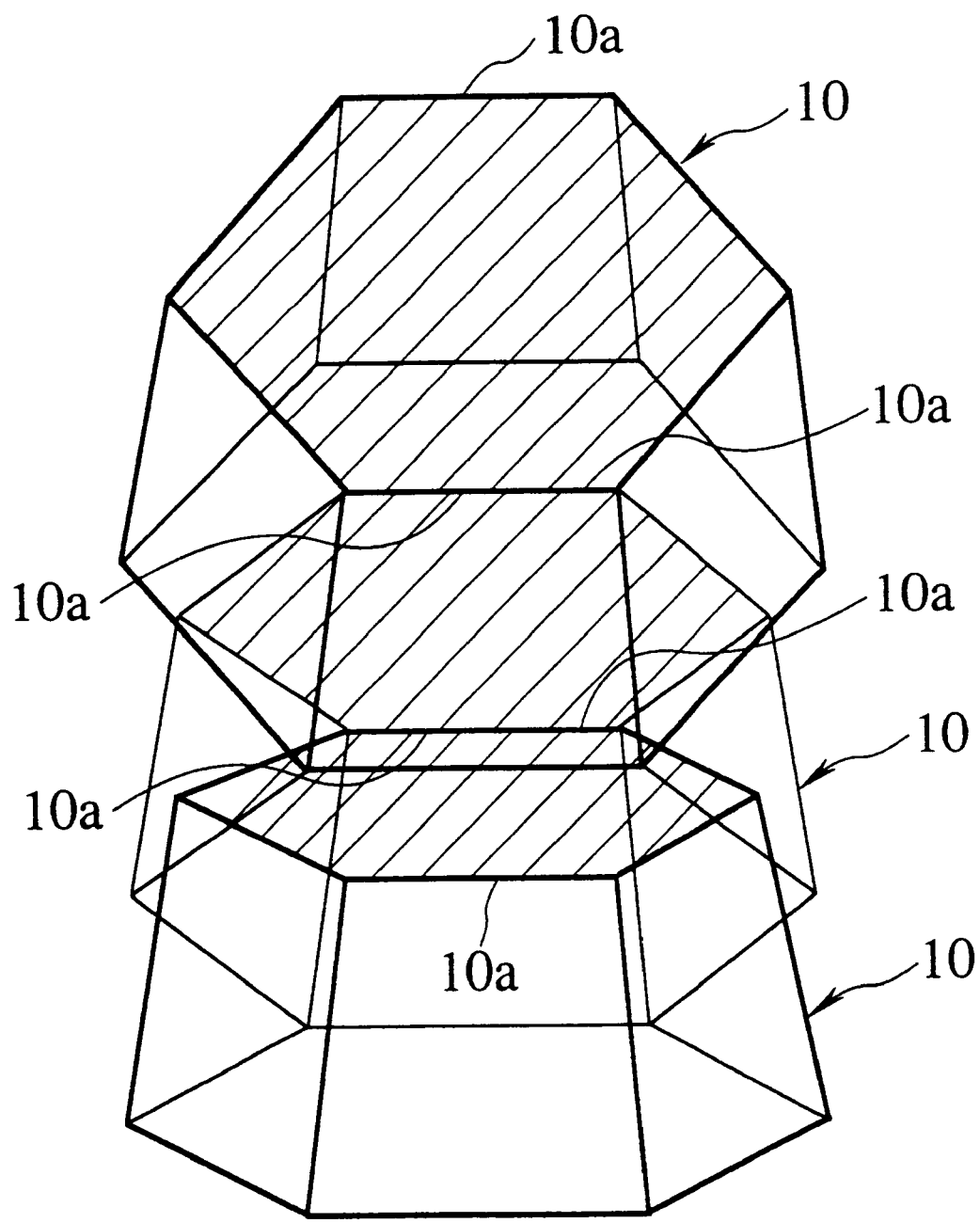
FIGS. 8 and 9 show constitution in which plural plane stowage-type trusses are coupled.
Figure 9:
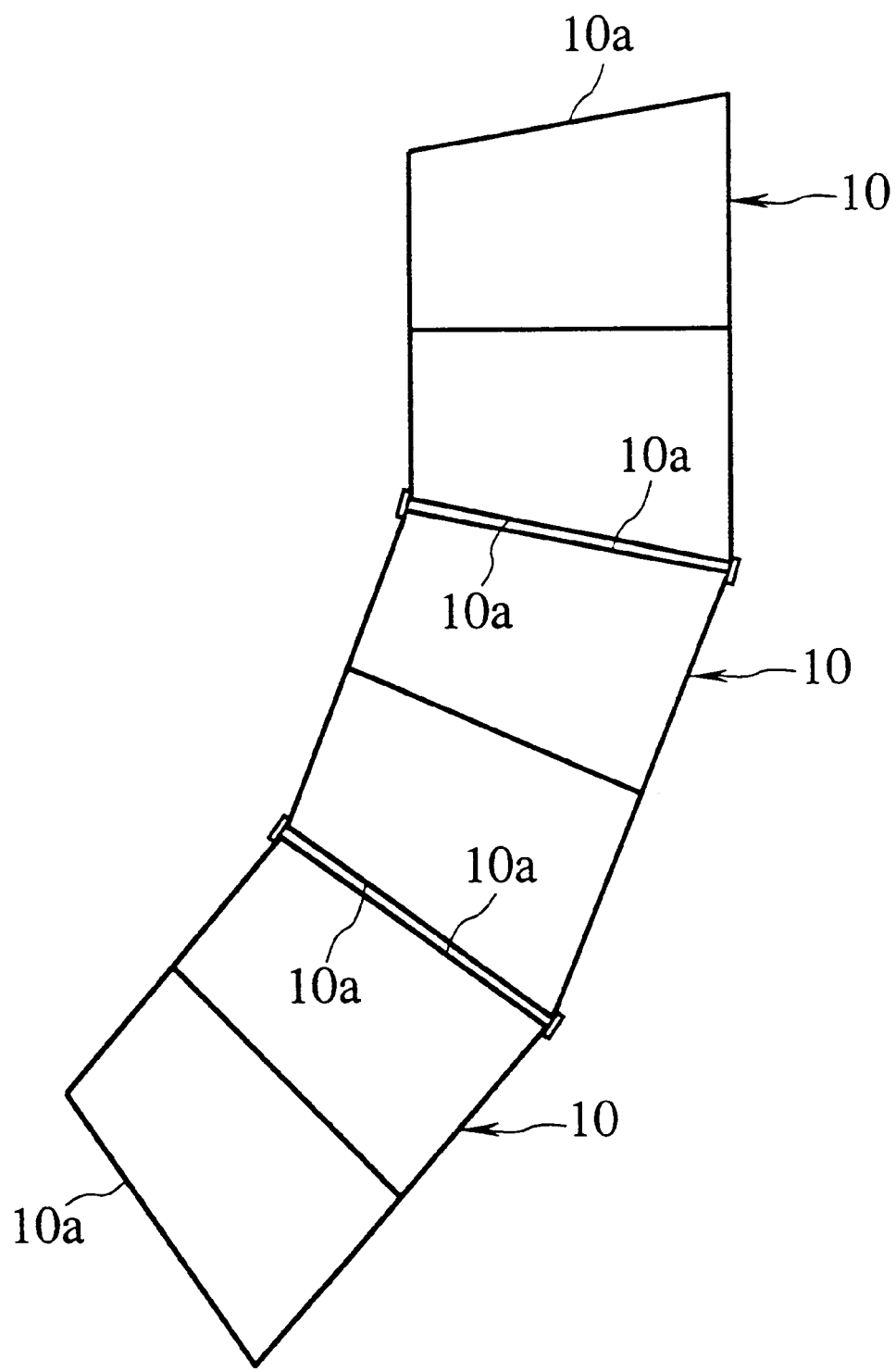

As in the plane stowage-type deployable truss 10 constituted as described above, fixed frames 10a consisting of adjacent longitudinal members 13 and the first and second horizontal members 11 and 12 are confronted, for example, mounting on the base structure can be performed readily and securely via a fixed frame 10a. That is, mounting securely on the base structure can be performed readily. In addition, as the truss is formed in the shape of a truncated hexagon, a curved expanse can be constituted readily by linking plural trusses. That is, a curved surface in a circular arc can be constituted by coupling via a fixed frame 10a as shown in FIGS. 8 and 9.

Next, referring to FIG. 10, a second embodiment of the plane stowage-type deployable truss will be described below. However, the same reference number is assigned to the same component as the one in a first embodiment shown in FIG. 1 and the description will be simplified.

Figure 10:
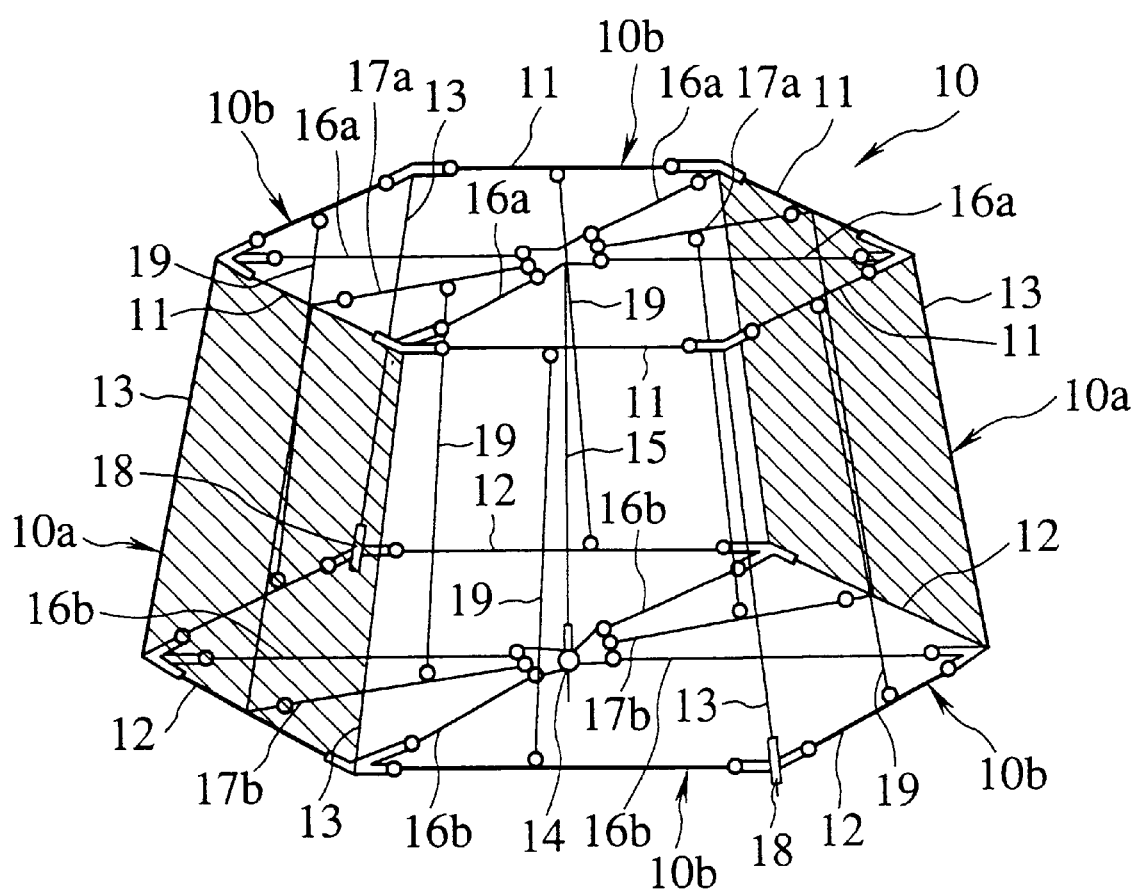
FIG. 10 is a perspective drawing showing a second embodiment of a plane stowage-type deployable truss according to the present invention.

A central longitudinal member 15 is provided piercing the center of a hexagon on one side or on the other side as shown in FIG. 10. A first radial member 16a is provided by linking the central longitudinal member 15 on one side and a longitudinal member 13 on one side located in each fixed frame 10a. A second radial member 16b is provided by linking the central longitudinal member 15 on the other side and a longitudinal member 13 on the other side located in each fixed frame 10a. Further, a central longitudinal member 15 is provided with a central slider 14 which can be moved in the direction of the axis.

The above-described first and second radial members 16a and 16b are coupled to a longitudinal member 13 and the central longitudinal member 15 along a plane including a line segment connecting the center of the first horizontal member 11 and the center of the second horizontal member 12 located in a fixed frame 10a and the central longitudinal member 15 so that they can swing. However, one end of the second radial member 16b is coupled to the central slider 14 so that it can swing and is coupled to the central longitudinal member 15 via this central slider 14. The central slider 14 may be disposed on one side (on the upper side in the drawing) of a central longitudinal member 15 and the first radial member 16a may be coupled to the central slider 14.

Further, a first intermediate radial member 17a is provided by linking the central longitudinal member 15 on one side and the center of the first horizontal member 11 located in each fixed frame 10a. A second intermediate radial member 17b is provided by linking the central longitudinal member 15 on the other side and the center of the second horizontal member 12 located in each fixed frame 10a.

The above-described first and second intermediate radial members 17a and 17b are coupled to each of the first and second horizontal members 11 and 12 and the central longitudinal member 15 along a plane including the first and second intermediate radial members 17a and 17b and the central longitudinal member 15 so that they can swing. However, one end of the second intermediate radial member 17b is coupled to the central slider 14 so that it can swing and coupled to the central longitudinal member 15 via this central slider 14. The central slider 14 may be disposed on one side (on the upper side in the drawing) of the central longitudinal member 15 and the first intermediate radial member 17a may be coupled to the central slider 14.

The first and second intermediate radial members 17a and 17b are provided with a parallel swing member 19 linking them. The parallel swing member 19 in this case is disposed in parallel to the plane forming a fixed frame 10a and is provided so that it can swing in the same direction as the first and second intermediate radial members 17a and 17b.

In the plane stowage-type deployable truss constituted as described above, a transformable frame 10b is constituted by the first and second intermediate radial members 17a and 17b, the parallel swing members 19 and the central longitudinal member 15 and it changes in the same manner as the transformable frame 10b located on a side as shown in FIGS. 2 and 3.

As each vertex of a hexagon located on the fixed frame 10a is reinforced by the first and second radial members 16a and 16b and the central longitudinal member 15, deployment and folding can be performed smoothly even if external force is applied. In addition, as opposite fixed frames 10a are coupled by the first and second radial members 16a and 16b, the first and second intermediate radial members 17a and 17b and the central longitudinal member 15 when deployed, strength of fixed frames 10a in the opposite direction can be enhanced. Therefore, many can be coupled via fixed frames 10a.

Figure 11:
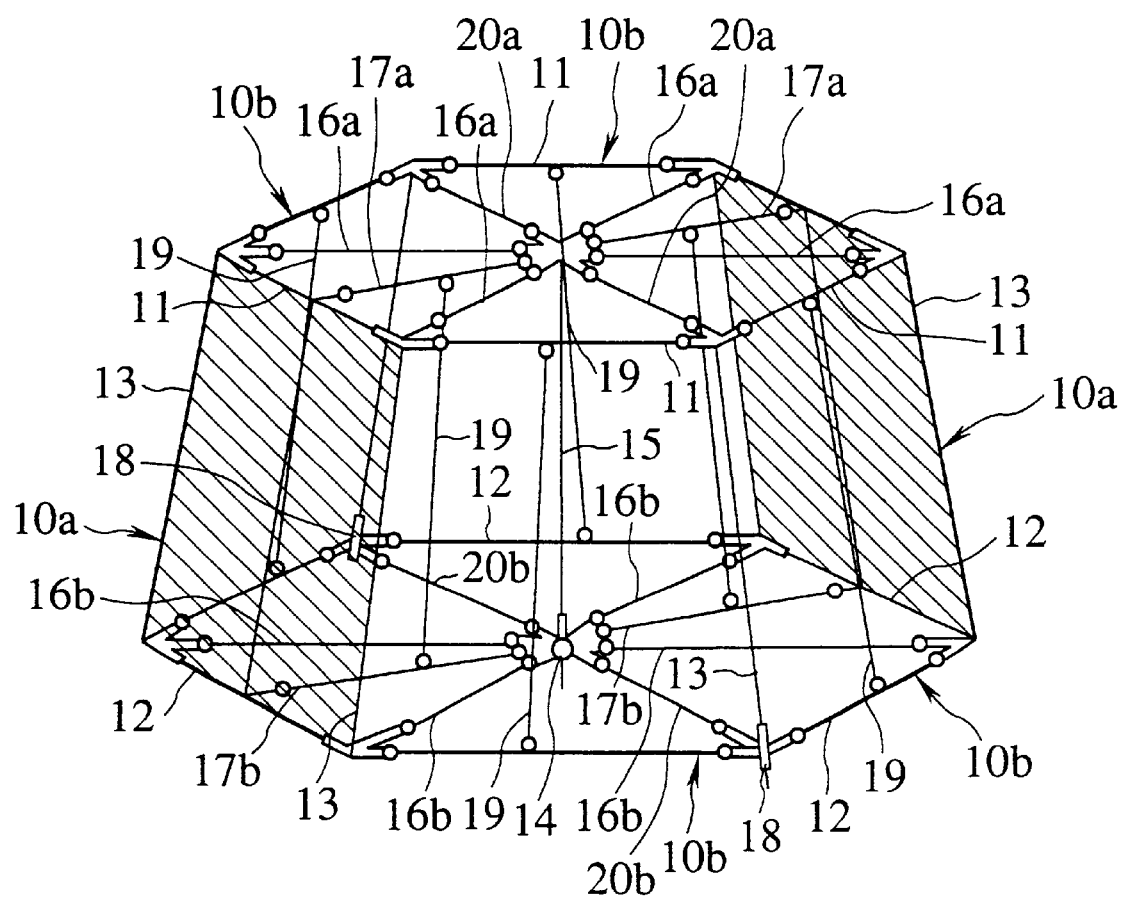
FIG. 11 is a perspective drawing showing a third embodiment of a plane stowage-type deployable truss according to the present invention.

Next, referring to FIG. 11, a third embodiment of the plane stowage-type deployable truss will be described below. However, the same reference number is assigned to the same component as the one shown in FIG. 10 and the description will be simplified. The point in which components in the third embodiment shown in FIG. 11 are different from those shown in FIG. 10 is that a first and second folding/unfolding member 20a and 20b are provided.

That is, the first folding/unfolding member 20a is provided by linking the central longitudinal member 15 on one side and each longitudinal member 13 on one side located in the center of adjacent transformable frames 10b. The second folding/unfolding member 20b is provided by linking the central longitudinal member 15 on the other side and each longitudinal member 13 on the other side located in the center of adjacent transformable frames 10a. The first and second folding/unfolding member 20a and 20b are extended straight, holding a hexagon on one side or on the other side when deployed.

The plane stowage-type deployable truss constituted as described above has an advantage that all vertexes of a hexagon on one side or on the other side can be reinforced.

Figure 12:
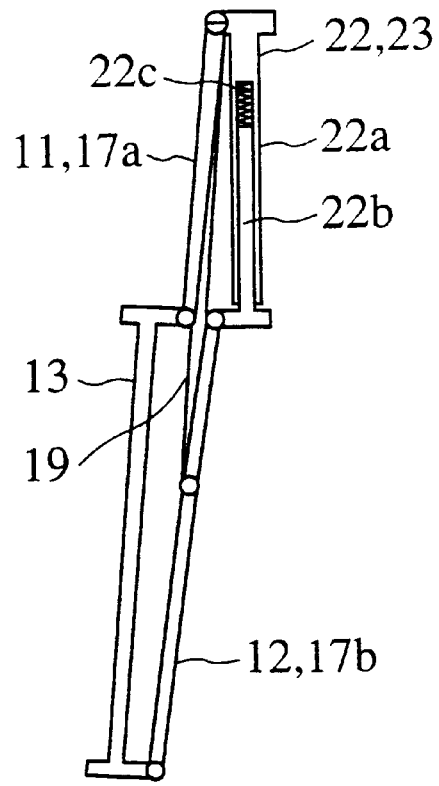
FIG. 12 shows a folded state of another transformable frame.
Figure 13:
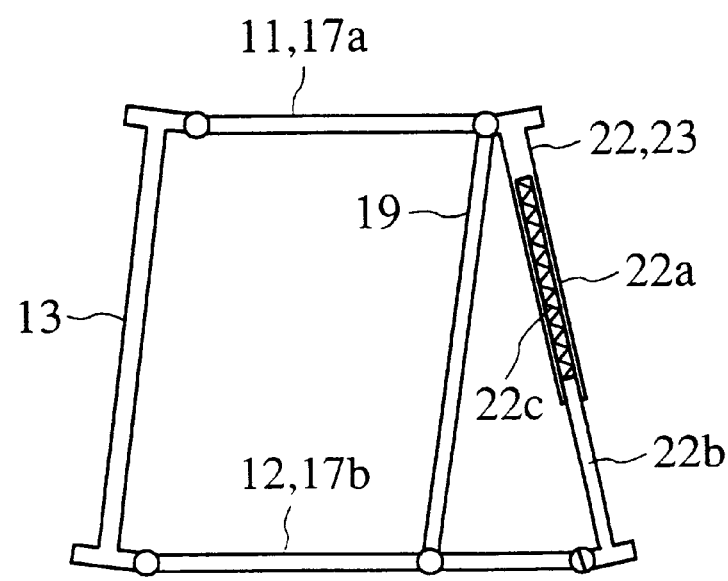
FIG. 13 shows a deployed state of another transformable frame.

An elongating/shortening longitudinal member 22 and an elongating/shortening central longitudinal member 23 may be provided as shown in FIGS. 12 and 13 in place of a combination of a longitudinal member 13 and a slider 18 and the central longitudinal member 15 and the central slider 14 provided in the above-described embodiment.

The elongating/shortening longitudinal member 22 comprises a cylindrical portion 22c, a rod-like portion 22b engaged with the cylindrical portion 22c so that it can be moved along the axis and a compression spring 22c for pushing out the rod-like portion 22b as shown in FIGS. 12 and 13. The elongating/shortening central longitudinal member 23 is also constituted in the same manner as the elongating/shortening longitudinal member 22.

The first horizontal member 11 is coupled to the cylindrical portion 22a and the second horizontal member 12 is to the rod-like portion 22b. The elongating/shortening longitudinal member 22 and elongating/shortening central longitudinal member 23 may be provided reversely on the upper and lower sides in the drawing, the second horizontal member 12 may be coupled to the cylindrical portion 22a and the first horizontal member 11 may be coupled to the rod-like portion 22c.

In the deployable truss provided with the elongating/shortening longitudinal member 22 and elongating/shortening central longitudinal member 23 constituted as described above, a stowed state can be maintained by holding in a shortened state shown in FIG. 12 by a stopper not shown. The truss can be automatically deployed with the compression spring 22c by releasing the stopper when an artificial satellite reaches space.

Also in the truss provided with the central slider 14 and sliders 18 described above, it is desirable that the central slider 14 and sliders 18 are moved by a spring and the truss can be automatically deployed.

As this plane stowage-type deployable truss is provided with opposite fixed frames and this fixed frame is constituted by adjacent longitudinal members and the first and second horizontal members, for example mounting on the base structure can be performed readily and securely via fixed frames. That is, mounting securely on the base structure can be performed readily. As the truss is formed into a truncated hexagon, a curved expanse can be readily constituted by linking plural trusses.

Figure 14:
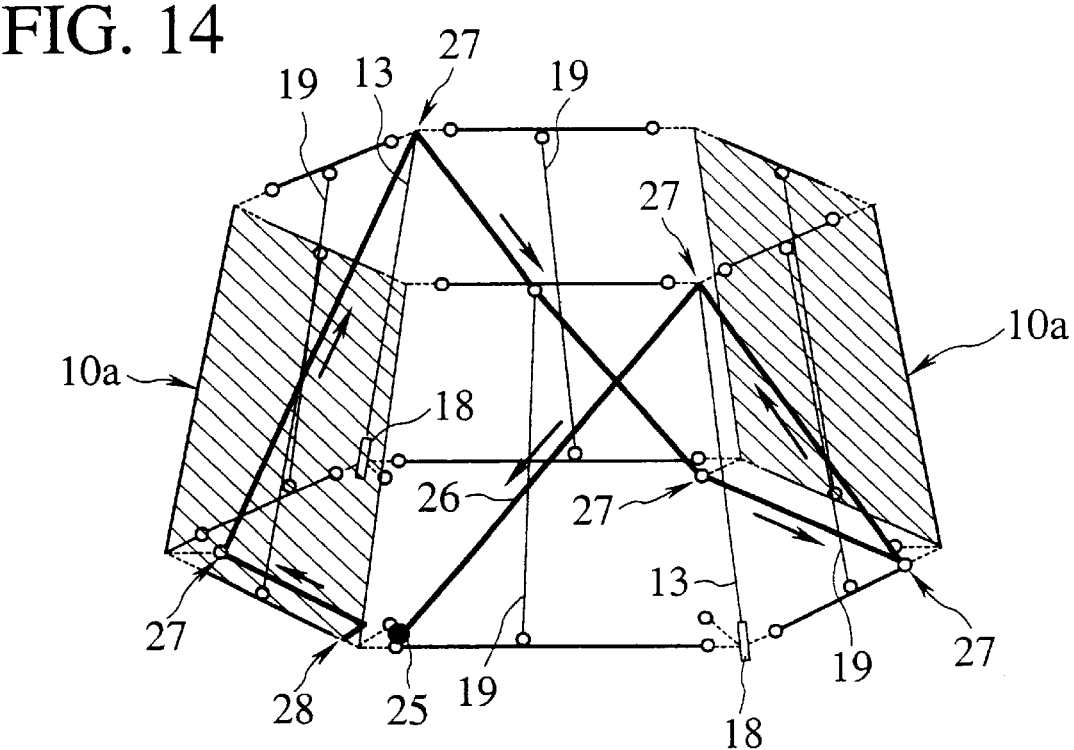
FIG. 14 is a perspective drawing showing a fourth embodiment of a plane stowage-type deployable truss according to the present invention.

FIG. 14 shows a fourth embodiment of the plane stowage-type deployable truss. A reference number 18 designates a slider for moving one end of a bottom member along a longitudinal member with a spring for deployment. A reference number 13 denotes a longitudinal member, 19 a parallel swinging longitudinal member for synchronizing with top and bottom members and 25 a motor for winding a stowing cable. A reference number 26 denotes a stowing cable, 27 a pulley through which the cable 26 passes and the pulley is mounted at one end of a longitudinal member. A reference number 28 denotes termination of the cable 26 and 10a opposite fixed frames.

The plane stowage-type deployable truss is kept in a deployed state by force of a spring mounted on a slider 18 in a natural state. The truss is stowed with the whole folded by winding the cable 26 in the direction shown by an arrow in the drawing. In shift from a stowed state to a deployed state, the motor 25 is reversely rotated and the wound cable 26 is gradually released.

Figure 15:
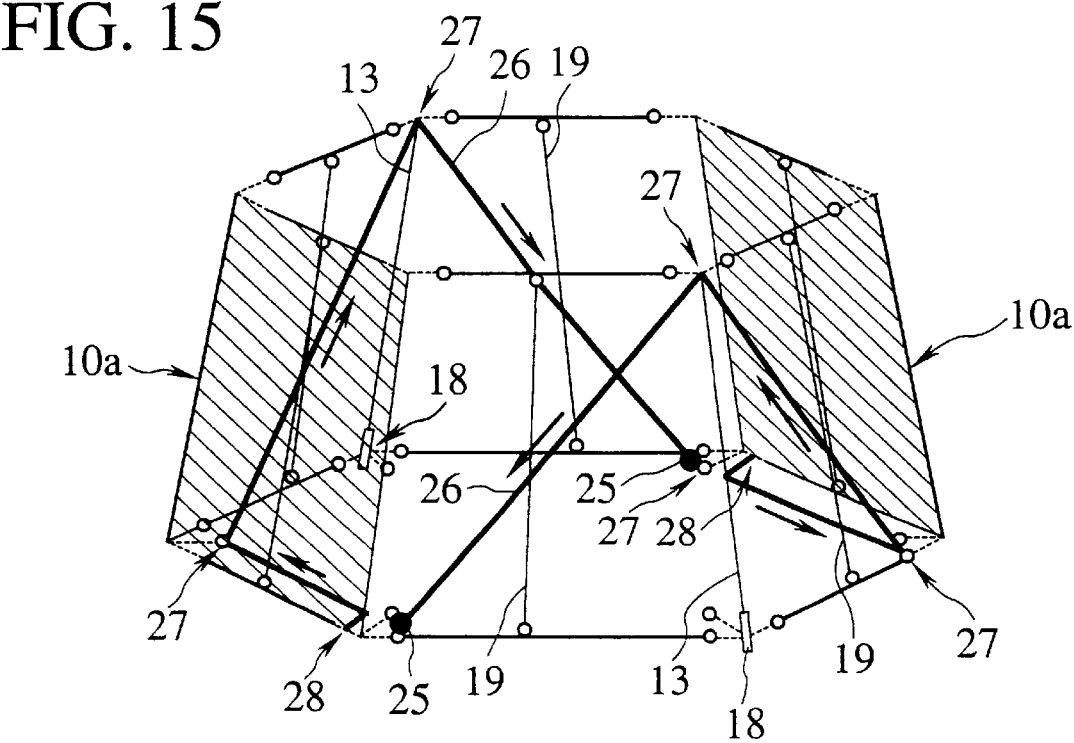
FIG. 15 is a perspective drawing showing a plane stowage-type deployable truss which is the result of the improved fourth embodiment.

FIG. 15 shows the result of the improved fourth embodiment, the stowing cable 26 is divided into two and each is wound by drive of individual motor 25. Therefore, two pulleys 27 through which each cable 26 passes are required and an effect of friction on the pulleys is reduced.

Figure 16:
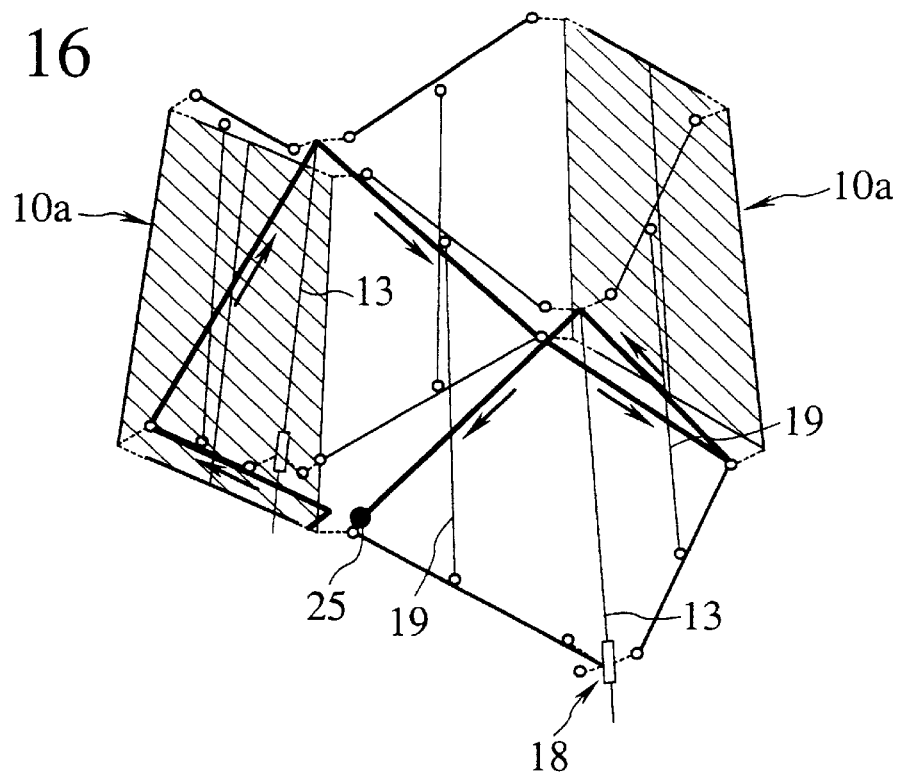
FIGS. 16 to 18 show stowing process of a plane stowage-type truss according to a fourth embodiment.
Figure 17:
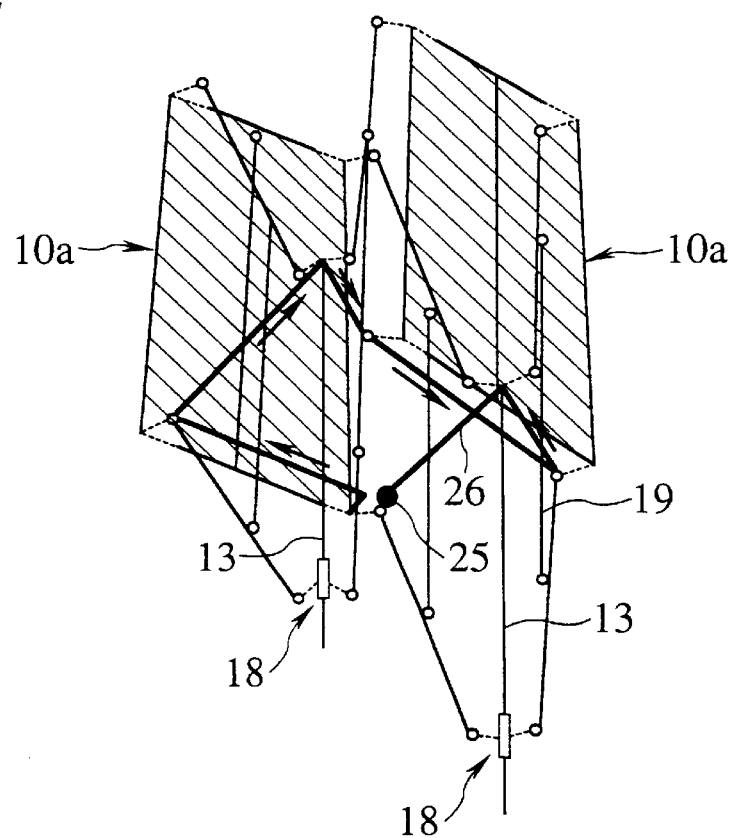
Figure 18:
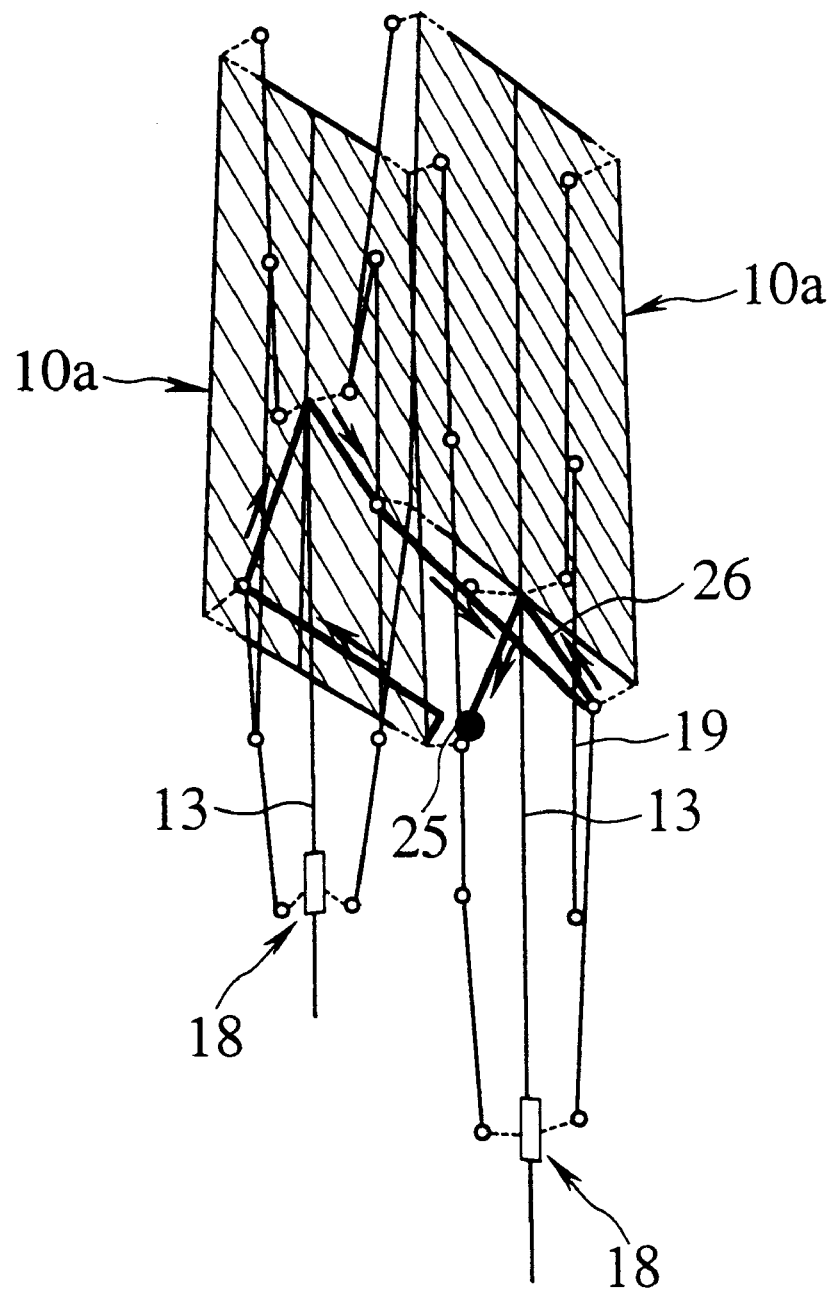

FIGS. 16 to 18 show a process of stowing of the plane stowage-type deployable truss according to a fourth embodiment and show the procedure of folding. As the stowing cable 26 is wound in the direction shown by an arrow by the motor 25, a longitudinal member 13 is pushed down relatively, opposite fixed frames 10a are pulled up relatively without changing their forms, approach and finally parallel, and stowing is completed. At that time, a slider 18 goes down along a longitudinal member 13 against force of the spring for deployment.

Figure 19:
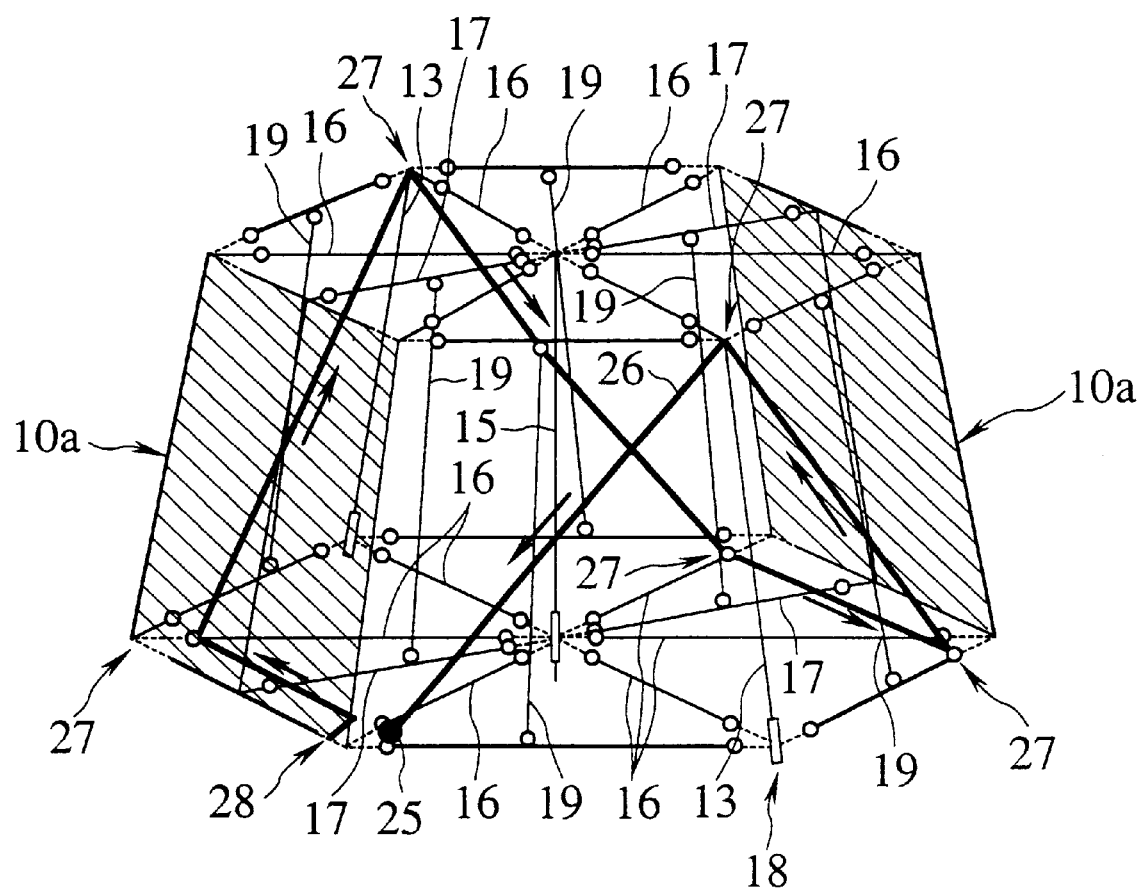
FIG. 19 is a perspective drawing showing a fifth embodiment of a plane stowage-type deployable truss according to the present invention.

FIG. 19 shows a fifth embodiment of the plane stowage-type deployable truss, and in the embodiment, a central longitudinal member 15, a radial member 16, an intermediate radial member 17 and a parallel swing member 19 which couples the upper and lower intermediate radial members 17 and is parallel to the fixed frame 10a are added to the deployable truss structure according to the above-described fourth embodiment.

In such a plane stowage-type deployable truss, as a cable disposed diagonally on a side of a truncated hexagon including slides of which one end is connected to a motor with a windable mechanism and of which the other end passes through a pulley mounted on the upper or lower end of any longitudinal member is used, a folded state with high efficiency of stowing can be realized by disposing the cable so that the longitudinal member is enclosed by the cable and winding the cable by the motor. Further, as stowing driving force is scattered by disposing the cable around, the effect that synchronous smooth stowing operation of members is enabled can be obtained.

Figure 20:
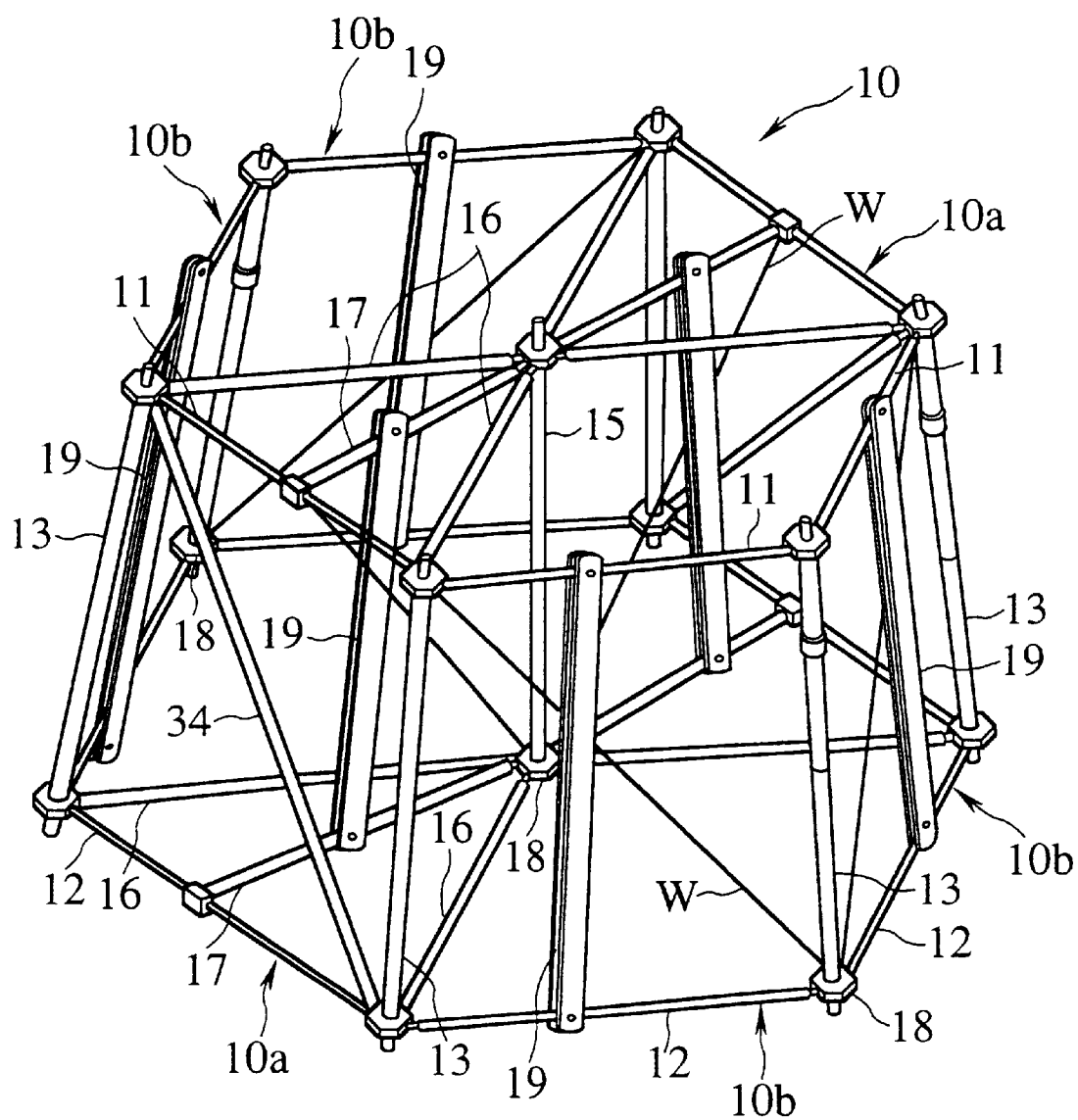
FIG. 20 is a perspective drawing showing a sixth embodiment of a plane stowage-type deployable truss according to the present invention.

FIG. 20 shows a sixth embodiment of the plane stowage-type deployable truss and in the embodiment the truss is constituted so that it is deployed in a truncated hexagon. At the corner of the hexagon, a first horizontal member 11, a second horizontal member 12 and longitudinal members 13 are disposed. That is, the upper hexagon is formed by the first horizontal member 11, the lower hexagon is formed by the second horizontal member 12 and longitudinal members 13 are disposed to couple each vertex of the upper and lower hexagons.

A set of opposite sides of the plane stowage-type deployable truss are surrounded by fixed frames 10a formed by the first and second horizontal members 11 and 12, longitudinal members 13 and a diagonal bracing member 34. In the meantime, the side between the fixed frames 10a is surrounded by a transformable frame 10b formed by the first and second horizontal members 11 and 12 which can swing each other and longitudinal members 13.

A central longitudinal member 15 is provided piercing the center of the upper and lower hexagons. A radial member 16 is provided to couple both ends of the central longitudinal member 15 and both ends of longitudinal members located on each fixed frame 10a. Further, an intermediate radial member 17 is provided to couple both ends of the central longitudinal member 15 and each center between the first and second horizontal members located on each fixed frame 10a.

The first and second horizontal members 11 and 12 forming the transformable frame 10b are coupled to longitudinal members 13 so that they can swing along a plane constituting the transformable frame 10b. The radial member 16 is coupled to a longitudinal member 13 and the central longitudinal member 15 so that it can swing along a plane constituted by the upper and lower intermediate radial members 17 and the central longitudinal member 15. Further, the intermediate radial member 17 is coupled to the first or the second horizontal member 11 or 12 and the central longitudinal member 15 so that it can swing along the plane constituted by the upper and lower intermediate radial members 17 and the central longitudinal member 15.

The central longitudinal member 15 and a longitudinal member 13 located in the center of adjacent transformable frames 10b are provided with a slider 18 so that the slider can be moved in the axial direction. Each slider 18 supports one end of the second horizontal member 12 and one end of a radial member 16 and an intermediate radial member 17 on the bottom.

Further, a parallel swing member 19 is provided to couple the first horizontal member 11 and the second horizontal member 12. This parallel swing member 19 is disposed in parallel to longitudinal members 13 located on a fixed frame 10a and coupled to the first horizontal member 11 and the second horizontal member 12 so that the parallel swing member can swing. The parallel swing member 19 also couples intermediate radial members on the top and bottom. In this case, the parallel swing member 19 is disposed in parallel to a plane forming a fixed frame 10a and coupled to intermediate radial members 17 on the top and bottom so that they can swing. "W" in FIG. 20 denotes a wire for moving a slider 18. Movement of the transformable frame 10b and the plane stowage-type deployable truss 10 are the same as those in the first embodiment shown in FIGS. 2 to 7.

Next, a line stowage-type deployable truss will be described below. FIGS. 21 to 25 are explanatory drawings of a first embodiment of a line stowage-type deployable truss.

Figure 21:
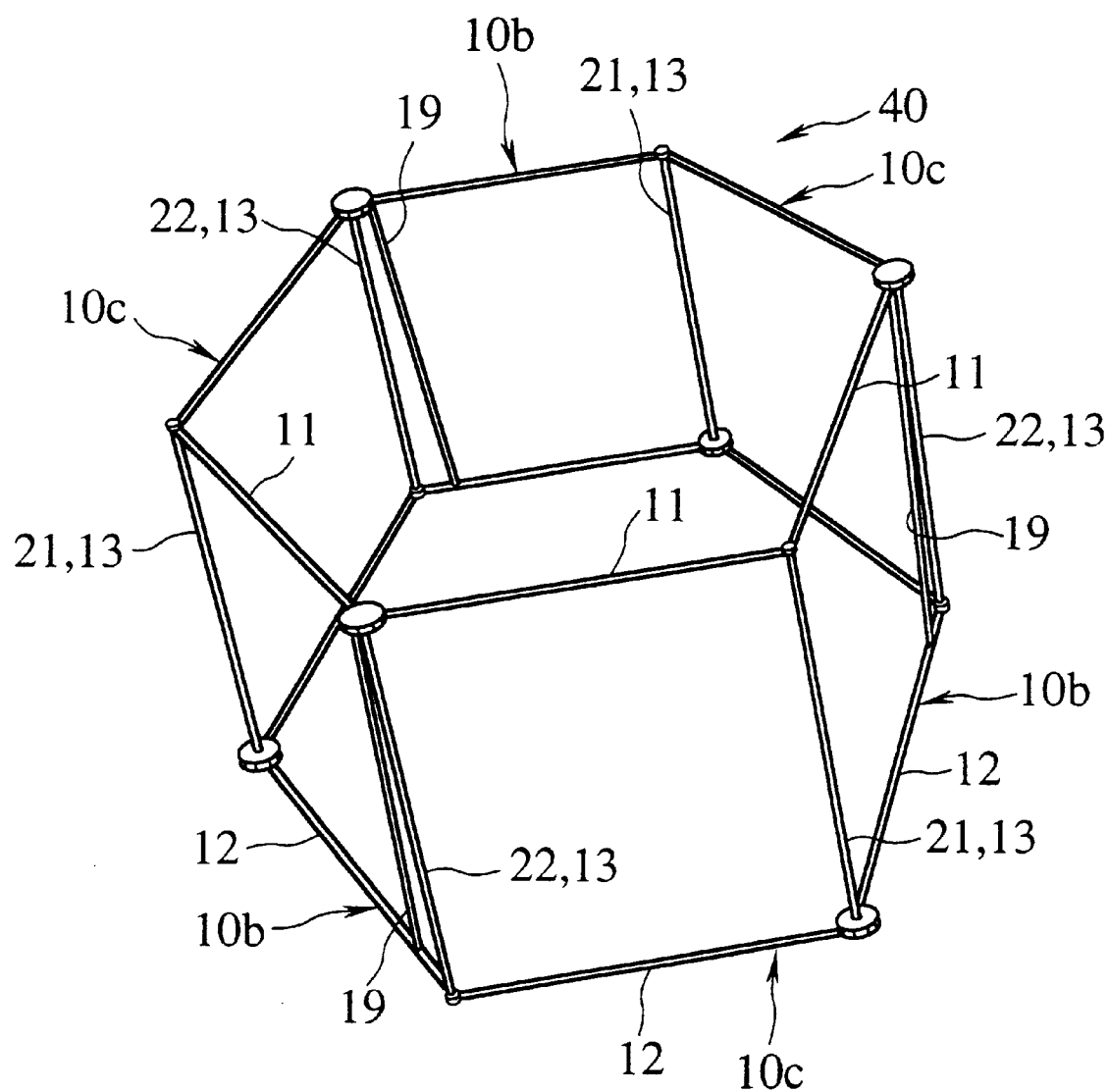
FIG. 21 is a perspective drawing showing a first embodiment of a line stowage-type deployable truss according to the present invention.

In FIG. 21, the line stowage-type deployable truss 40 is in a truncated hexagon when it is deployed. On one side (the upper side in the drawing), first six horizontal members 11 forming each side of the hexagon (even-numbered polygon) are provided and on the other side (the lower side in the drawing), second six horizontal members 12 forming each side are provided. A longitudinal member 13 is provided to couple each vertex of a hexagon on one side or on the other side. The line stowage-type deployable truss is provided with three transformable frames 10b and frames 10c formed by adjacent longitudinal members 13, first and second horizontal members 11 and 12.

The above-described first and second horizontal members 11 and 12 are coupled to one end or the other end of each longitudinal member 13 respectively so as to swing freely along each transformable frame 10b and 10c. The longitudinal member 13 comprises a fixed longitudinal member 21 for maintaining distance between the first and second horizontal members 11 and 12 fixedly and an elongating/shortening longitudinal member 22 for changing distance between the first and second horizontal members 11 and 12, and such fixed longitudinal member 21 and elongating/shortening longitudinal member 22 are disposed alternately in the circumferential direction.

Figure 22:
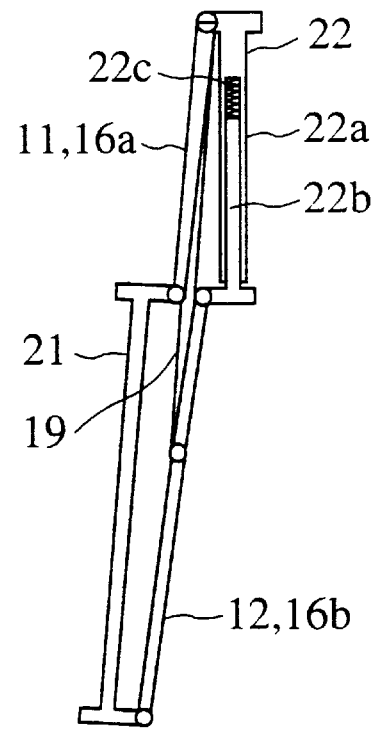
FIG. 22 shows a folded state of a transformable frame.
Figure 23:
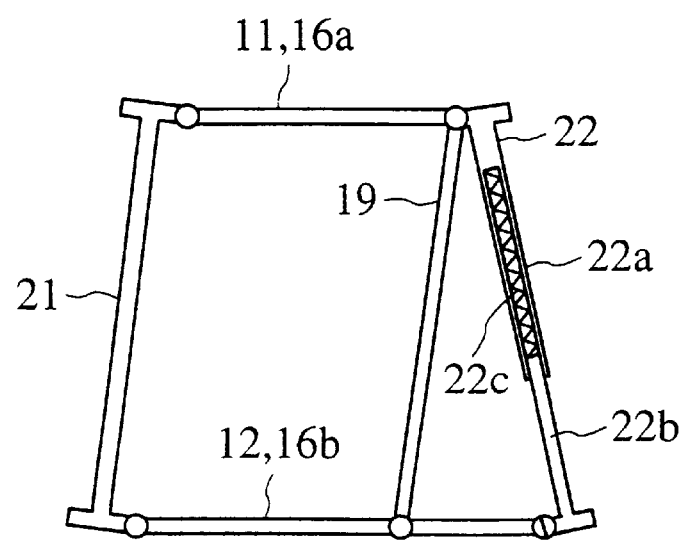
FIG. 23 shows a deployed state of a transformable frame.

The elongating/shortening longitudinal member 22 comprises a cylindrical portion 22a, a rod-like portion 22b engaged with the cylindrical portion 22a so that it can be moved in the axial direction and a compression spring 22c for pushing out the rod-like portion 22b as shown in FIGS. 22 and 23.

Further, a parallel swing member 19 is provided on one side (on the left side in the drawing) of the elongating/shortening longitudinal member 22. The parallel swing member 19 is coupled to the first and second horizontal members 11 and 12 so that it can swing on a plane of the transformable frame 10b and disposed in parallel to the fixed longitudinal member 21.

In this line stowage-type deployable truss 40, a transformable frame 10b may also be constituted in the manner shown in FIGS. 2 and 3 without an elongating/shortening longitudinal member 22.

Referring to FIGS. 21 to 25, deployment/stowage motion of the line stowage-type deployable truss 40 constituted as described above will be described below. First, movement of a transformable frame 10b will be described. FIG. 22 shows the transformable frame 10b in a folded state and FIG. 23 shows the transformable frame 10b in a deployed state. That is, when an elongating/shortening member 22 is stowed from a deployed state shown in FIG. 23, first and second horizontal members 11 and 12 approach, kept in parallel each other by a parallel by a parallel swing member 19. Then, a fixed longitudinal member 21 and an elongating/shortening longitudinal member 22 approach, swinging and they are in a folded state as shown in FIG. 22. At this time, a swinging angle of the first and second horizontal members 11 and 12 is uniquely decided depending upon the length of the elongating/shortening longitudinal member 22 in the axial direction.

A folded state is maintained by holding the state in which the elongating/shortening longitudinal member 22 is contracted with a stopper not shown, each elongating/shortening longitudinal member 22 is expanded with force produced by a compression spring 22c by removing this stopper with a wire not shown, and the truss is deployed. Further, if the length of the elongating/shortening longitudinal member 22 can be kept given by the stopper in a deployed state, the truss can be kept in a deployed state.

If the elongating/shortening longitudinal member 22 is further expanded from a deployed state shown in FIG. 23 though such a case is not shown in a drawing, the first and second horizontal members 11 and 12 also approach, kept in parallel each other and then, the fixed longitudinal member 21 and the elongating/shortening longitudinal member 22 approach, swinging. However, the elongating/shortening longitudinal member 22 is located lower in the drawing than the fixed longitudinal member 21.

Next, as from a viewpoint as a whole of the line stowage-type deployable truss 40, an elongating/shortening longitudinal member 22 and a fixed longitudinal member 21 are alternately arranged, an elongating/shortening longitudinal member 22 and a fixed longitudinal member 21 approach, shifting alternately on one side and on the other side by shortening each elongating/shortening longitudinal member 22, and as a result, all members comprising the first and second horizontal members 11 and 12, an elongating/shortening longitudinal member 22 and a fixed longitudinal member 21 stow in the center of a hexagon. That is, the truss is in a folded state in the shape of a rod as shown in FIG. 25 through a state in which the truss is being folded as shown in FIG. 24.

Figure 24:
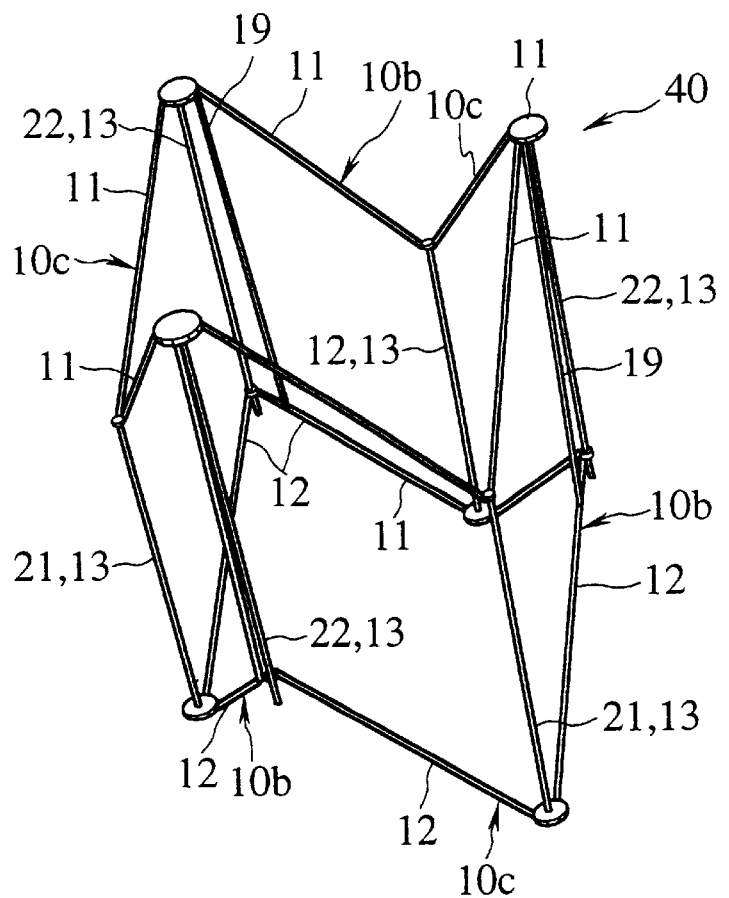
FIGS. 24 and 25 show stowing process of a line stowage-type truss according to a first embodiment.
Figure 25:
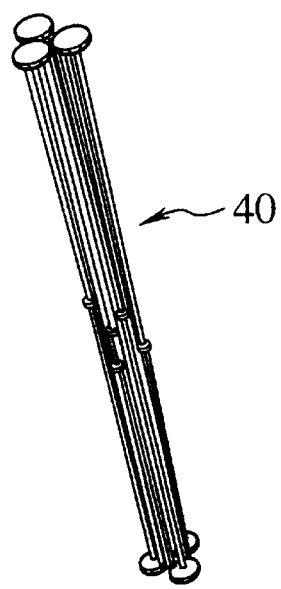

When the stopper not shown above is removed, the elongating/shortening longitudinal member 22 gradually expands naturally in the radial direction shown in FIG. 24 and the truss is in a deployed state in the shape of a truncated hexagon as shown in FIG. 21.

According to the line stowage-type deployable truss constituted as described above, as all members comprising the first and second horizontal members 11 and 12, the fixed longitudinal member 21 and the elongating/shortening longitudinal member 22 are not provided with a folding and unfolding portion inside them, deployment cannot be changeable due to failure of synchronization caused by each folding and unfolding portion and therefore, stowing and deployment can be performed smoothly. In addition, as no folding and unfolding portion exists, no lowering of strength which is liable to occur in the portion also exists and a strong truss can be obtained.

Next, referring to FIGS. 26 and 27, a second embodiment of the line stowage-type deployable truss will be described below. However, the same reference number is assigned to components common to those in the first embodiment shown in FIGS. 21 to 25 and the description is simplified.

Figure 26:
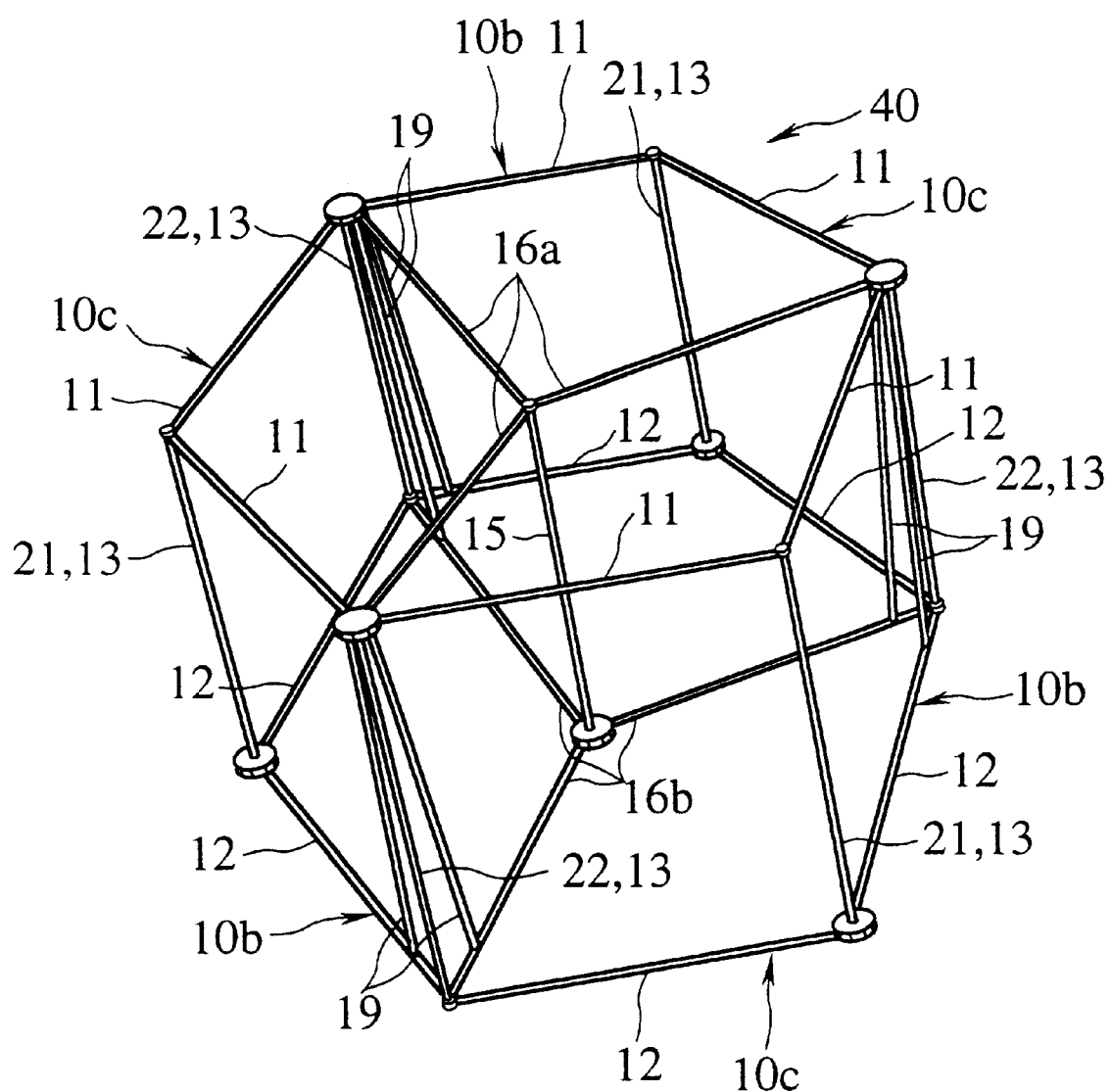
FIG. 26 is a perspective drawing showing a second embodiment of a line stowage-type deployable truss according to the present invention.
Figure 27:
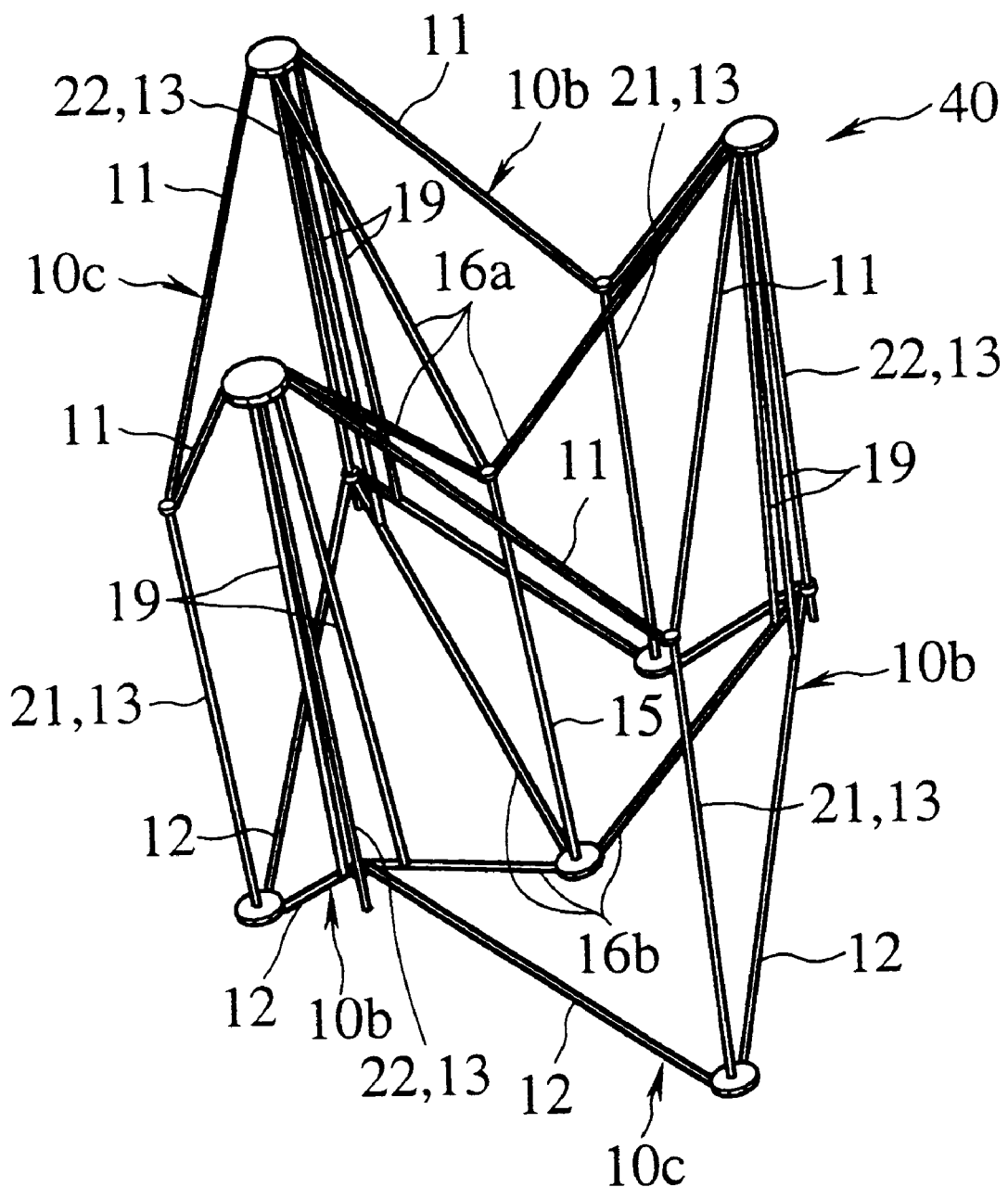
FIG. 27 shows an aspect of stowing process of a line stowage-type truss according to a second embodiment.

In this embodiment a central longitudinal member 15 is provided piercing the center of hexagons on one side and on the other side as shown in FIG. 26. A first radial member 16a coupling the central longitudinal member 15 on one side and each elongating/shortening longitudinal member 22 on one side is provided, and a second radial member 16b coupling the central longitudinal member 15 on the other side and each elongating/shortening longitudinal member 22 on the other side is provided. A parallel swing member 19 disposed in parallel to the central longitudinal member 15 is coupled to these first and second radial members 16a and 16b. These first and second radial members 16a and 16b and the parallel swing member 19 are coupled so that they can swing along at least a plane containing these.

In the line stowage-type deployable truss 40 constituted as described above, a plane containing the first and second radial members 16a and 16b is as shown in FIGS. 22 and 23. However, the central longitudinal member 15 is disposed in place of the fixed longitudinal member 21, and the first and second radial members 16a and 16b are disposed in place of the first and second horizontal members 11 and 12. Therefore, an swinging angle of the first and second radial members 16a and 16b to the central longitudinal member 15 is uniquely decided depending upon the length of the elongating/shortening member 22. The first and second radial members 16a and 16b converge in the center of a hexagon by shortening the elongating/shortening longitudinal member 22. However, as in this embodiment the central longitudinal member 15 is provided in the center of a hexagon, the truss is folded in the shape of a rod as shown in FIG. 25 with the central longitudinal member 15 in the center when folded. However, FIG. 27 shows an transient state between deployment and folding.

In a deployed state, the rigidity of a hexagon in the radial direction is enhanced by the first and second radial members 16a and 16b and the central longitudinal member 15 as shown in FIG. 26, and the whole strength can be enhanced.

Next, referring to FIGS. 28 and 29, a third embodiment of the line stowage-type deployable truss will be described below. However, the same reference number is assigned to components common to those in the second embodiment shown in FIGS. 26 and 27 and the description is simplified. This third embodiment is different from the second embodiment in that a parallel swing member 19 is provided on both sides of an elongating/shortening longitudinal member 22.

That is, the parallel swing member 19 is provided not only on one side (on the left side in the drawing) of an elongating/shortening longitudinal member 22 but on the other side (on the right side in the drawing). Therefore, a transformable frame 10b on the other side of an elongating/shortening longitudinal member 22 is also constituted as shown in FIGS. 22 and 23.

Figure 28:
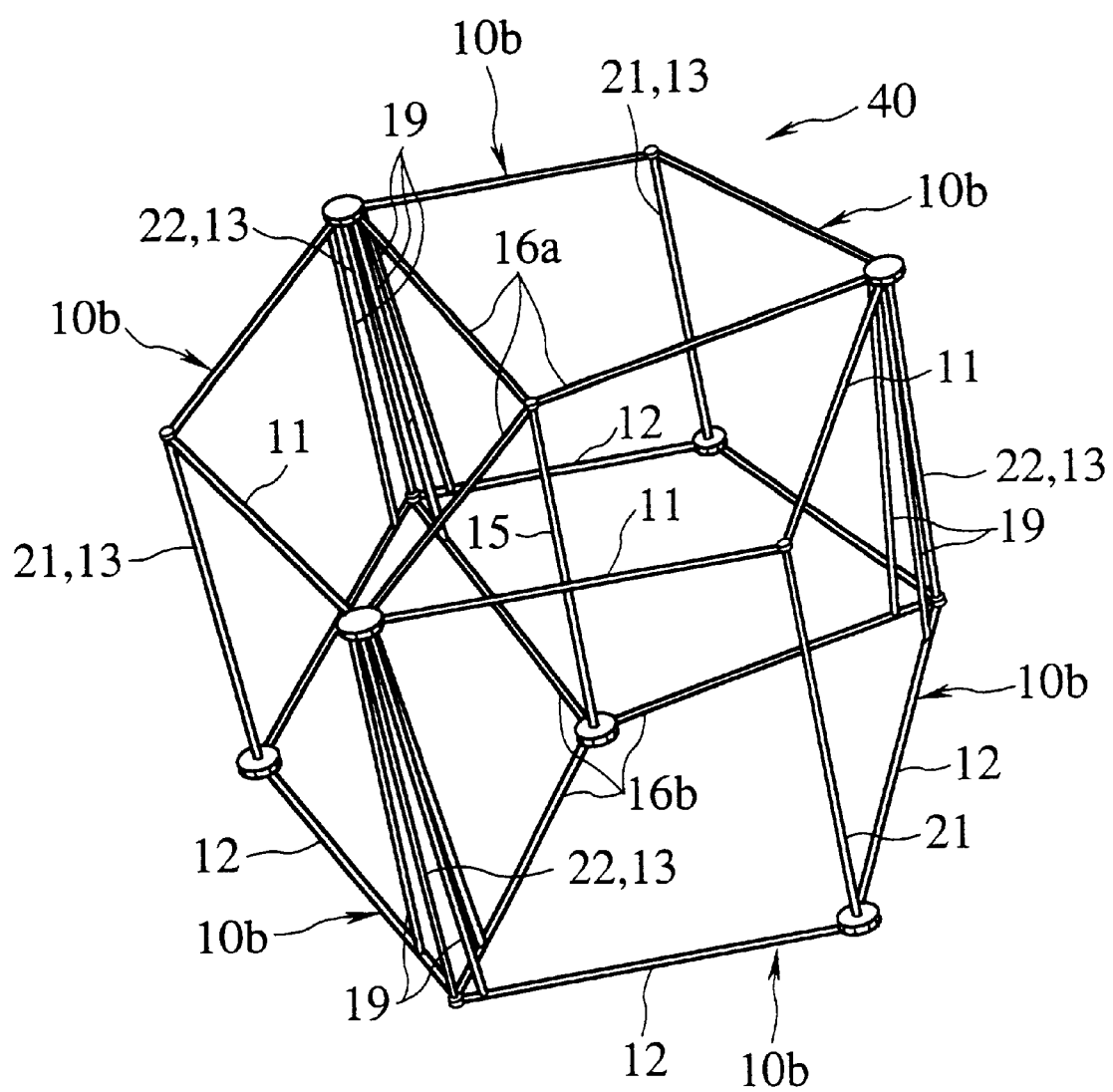
FIG. 28 is a perspective drawing showing a third embodiment of a line stowage-type deployable truss according to the present invention.
Figure 29:
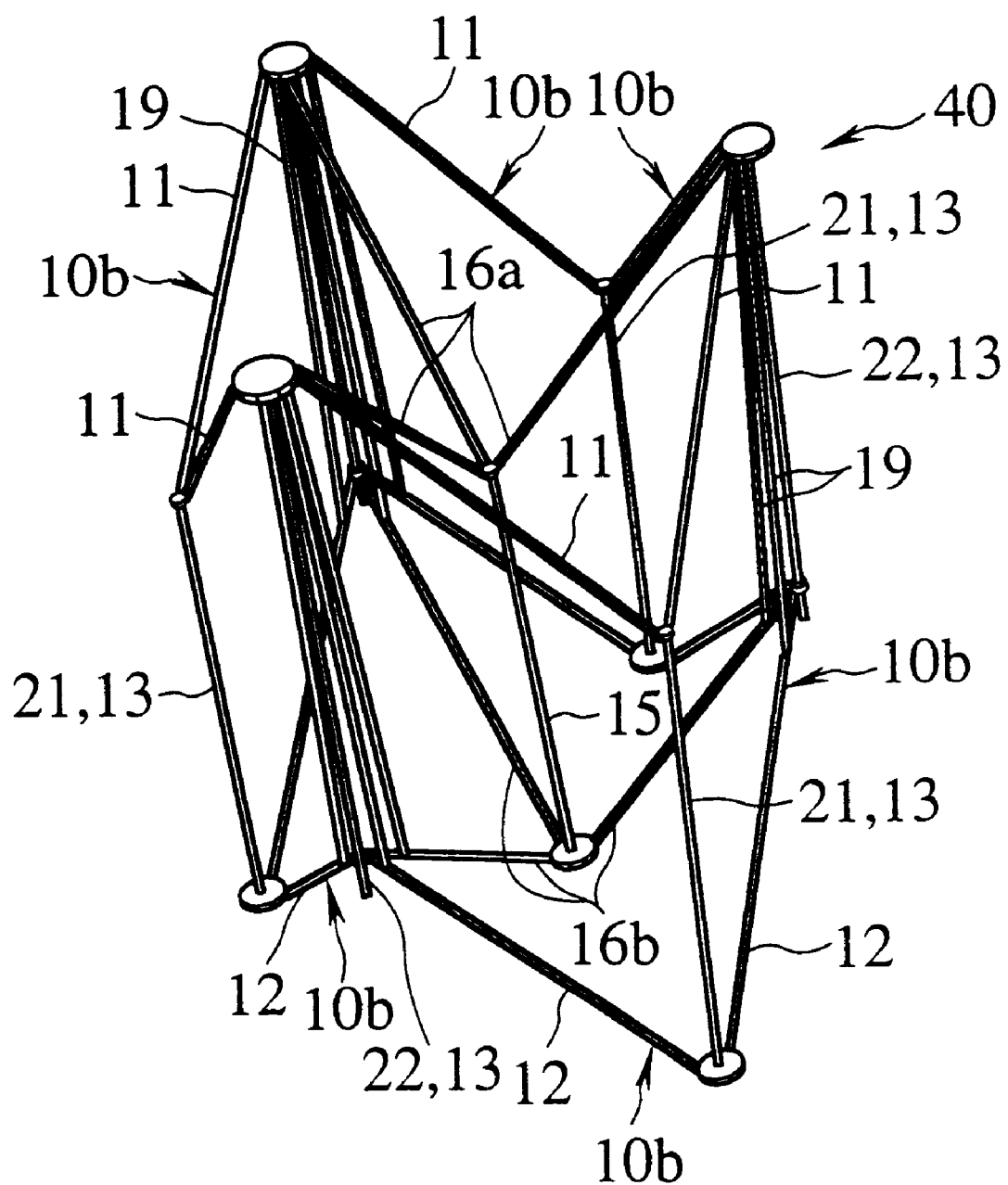
FIG. 29 shows an aspect of stowing process of a line stowage-type truss according to a third embodiment.

The line stowage-type deployable truss constituted as described above is in a stowed state as shown in FIG. 25 or in a deployed state as shown in FIG. 28 through a transient state as shown in FIG. 29 by expansion or contraction of an elongating/shortening longitudinal member 22. As deployment force occurs on all the first and second horizontal members 11 and 12 by elongation or shortening of an elongating/shortening longitudinal member 22, stowing and deployment can be performed smoothly. All transformable frames 10b is uniquely decided depending upon the length of each elongating/shortening longitudinal member 22.

In the line stowage-type deployable truss 40 according to the first embodiment shown in FIG. 21, the parallel swing member 19 may also be provided on both sides of an elongating/shortening longitudinal member 22.

Figure 30:
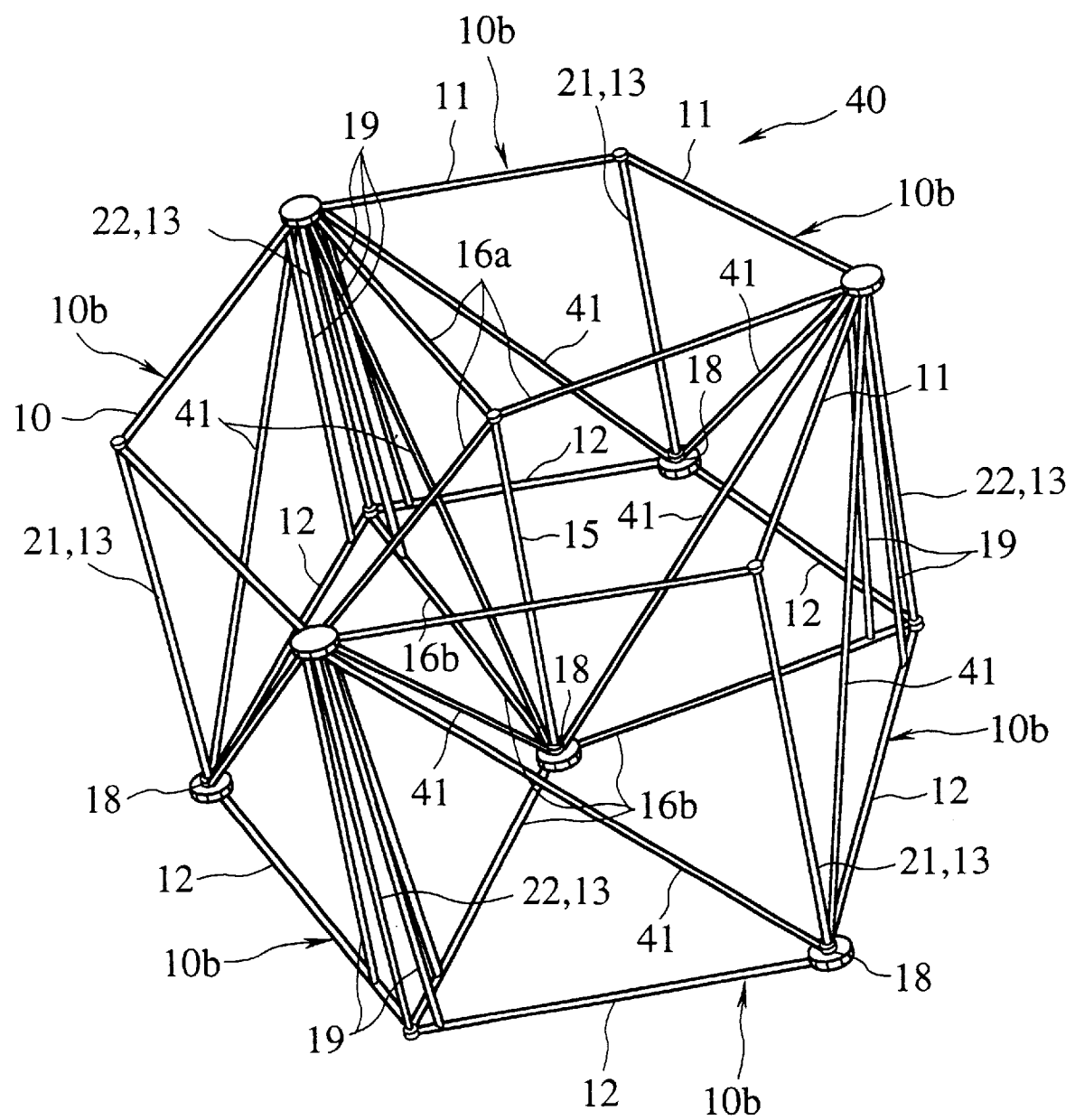
FIG. 30 is a perspective drawing showing a fourth embodiment of a line stowage-type deployable truss according to the present invention.

Next, referring to FIGS. 30 to 32, a fourth embodiment of the line stowage-type deployable truss will be described below. However, the same reference number is assigned to components common to those in the third embodiment shown in FIGS. 28 and 29 and the description is simplified.

In this embodiment, a diagonal member 41 is provided on each plane containing each transformable frame 10b and each first and second radial members 16a and 16b. One end of this diagonal member 41 is coupled to the corner of a transformable frame 10b on the side of an elongating/shortening longitudinal member 22 and the other end is coupled to a fixed longitudinal member 21 through a slider. One end of the diagonal member is coupled to the corner on the side of an elongating/shortening longitudinal member 22 on each plane containing a first and second radial members 16a and 16b and the other end is coupled to the central longitudinal member 15 through a slider 18.

Each diagonal member 41 is coupled so that it can swing on each plane containing at least a transformable frame 10b and a first and second radial members 16a and 16b, and when deployed, each diagonal member exists in the diagonal direction on a plane containing the transformable frame 10b and the above-described each plane. The slider 18 is constituted so that it can be moved along the fixed longitudinal member 21 or the central longitudinal member 15.

Figure 31:
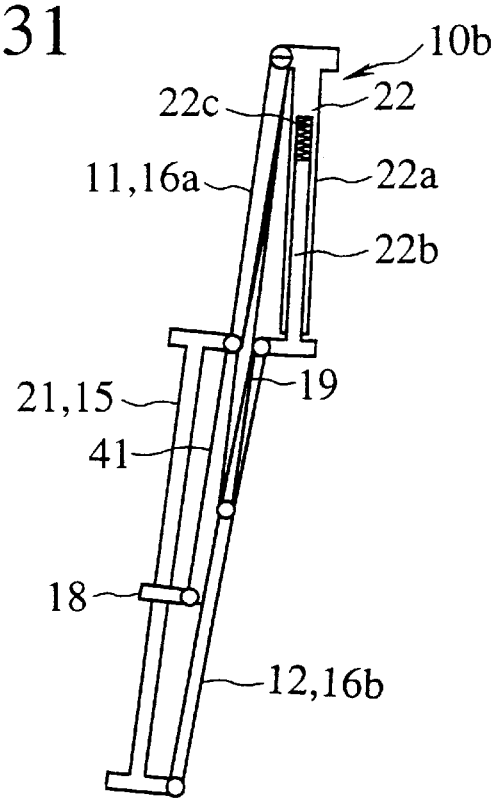
FIG. 31 shows a folded state of a transformable frame according to a fourth embodiment.
Figure 32:
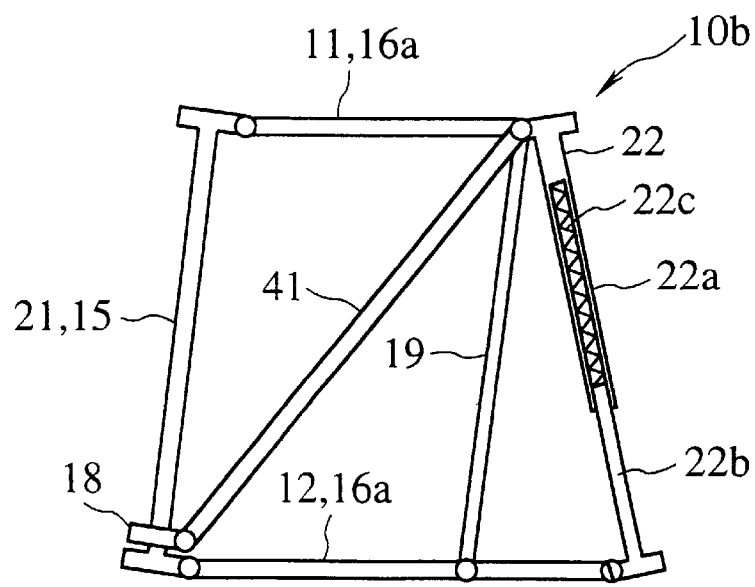
FIG. 32 shows a deployed state of a transformable frame according to a fourth embodiment.

In the line stowage-type deployable truss 40 constituted as described above, each plane containing the transformable frame 10b and the first and second radial members 16a and 16b is as shown in FIGS. 31 and 32. That is, the truss is folded as shown in FIG. 31 by contraction of the elongating/shortening longitudinal member 22. At this time, the slider 18 is moved upward in the drawing along the fixed longitudinal member 21 or the central longitudinal member 15. When the elongating/shortening longitudinal member 22 is elongated from this state, the truss is deployed as shown in FIG. 32 and the slider 18 is moved at the bottom in the drawing of the fixed longitudinal member 21 or the central longitudinal member 15.

Therefore, in the line stowage-type deployable truss 40 constituted as described above, as a diagonal member 41 functions as a diagonal beam on each plane containing a transformable frame 10b and a first and second radial members 16a and 16b, strength in a deployed state can be enhanced.

In each embodiment described above, an elongating/shortening longitudinal member 22 is constituted by a cylindrical portion 22a and a rod-like portion 22b so that it can be elongated or shortened, however, an elongating/shortening longitudinal member 22 may be constituted as shown in FIGS. 2 and 3.

In each embodiment described above, a first and second radial members 16a and 16b are coupled to the central longitudinal member 15 and an elongating/shortening longitudinal member 22, however a first and second radial members may be coupled to the central longitudinal member 15 and a fixed longitudinal member 21. However, the first and second radial members 16a and 16b coupled to the central longitudinal member 15 and a fixed longitudinal member 22 cannot be coupled to a parallel swing member 19. That is, in case a parallel swing member 19 is provided, it is required that either of a longitudinal member 13 or the central longitudinal member 15 are constituted so that it can be elongated or shortened and a parallel swing member 19 is disposed in parallel to the member which cannot be elongated or shortened.

Further, a first and second radial members 16a and 16b may be coupled to the central longitudinal member 15 and a fixed longitudinal member 21 in place of being coupled to the central longitudinal member 15 and an elongating/shortening longitudinal member 22. In this case, a parallel swing member 19 can be coupled to a first and second radial members 16a and 16b by constituting the central longitudinal member 15 so that it can be elongated or shortened.

According to the line stowage-type deployable truss, as deployment can be performed without a folding and unfolding portion in the middle of a first and second horizontal members and a longitudinal member, unstable folding or unfolding caused by incomplete synchronization in each folding and unfolding portion cannot occur, and folding and deployment can be performed smoothly. In addition, as no folding and unfolding portion exists, no lowering of strength which is liable in a folding and unfolding portion exists and a truss excellent also in strength can be obtained. Further, as the truss is deployed in the shape of a truncated hexagon, a curved expanse as a whole can be obtained readily by coupling the sides.

In the case of the truss with a first and second radial members, strength in the radial direction in a deployed state can be enhanced. That is, the rigidity of a even-numbered polygon on one side and on the other side can be enhanced and the whole strength can be enhanced.

Further, in the case of the truss with diagonal members, as such a diagonal member functions as a diagonal beam on a plane containing a first and second radial members and on each side, strength in a deployed state can be enhanced.

Figure 33:
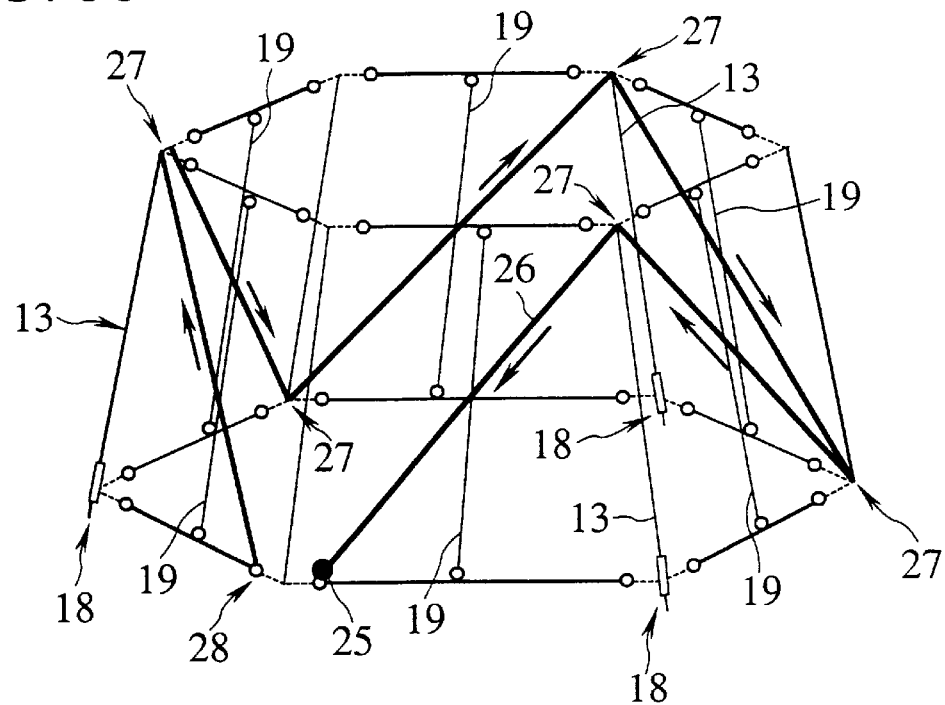
FIG. 33 is a perspective drawing showing a fifth embodiment of a line stowage-type deployable truss according to the present invention.

FIG. 33 is a schematic view showing a line stowage-type deployable truss according to the fifth embodiment of the present invention wherein reference number 18 denotes a slider for moving slidably either end of a lower surface member along a longitudinal member 13 and having a spring for the energization in the direction along which the longitudinal member deploys, 19 a parallel swing member for synchronizing the behavior of an upper surface member with that of the lower surface member, 25 a motor for furling a stowage cable 26, 27 a pulley portion through which the cable 26 passes and which is attached to an end of the longitudinal member, and 28 a terminal of the cable 26, respectively. The present deployable truss structure is in a deployed state under the natural state due to the force of the spring mounted on the slider 18. When the cable 26 is furled in the direction indicated by the arrow in the figure, the present deployable truss is stowed in a manner the whole of which is folded. In the case when the truss shifts from the stowed state to the deployed state, the furled cable 26 is gradually released by rotating reversely the motor. Though there is a fear of progressing abruptly the deployment behavior in the case where a spring which enables the deployment behavior is mounted on the slider 18, the deployment behavior can be controlled by gradually releasing the cable which has been furled.

Figure 34:
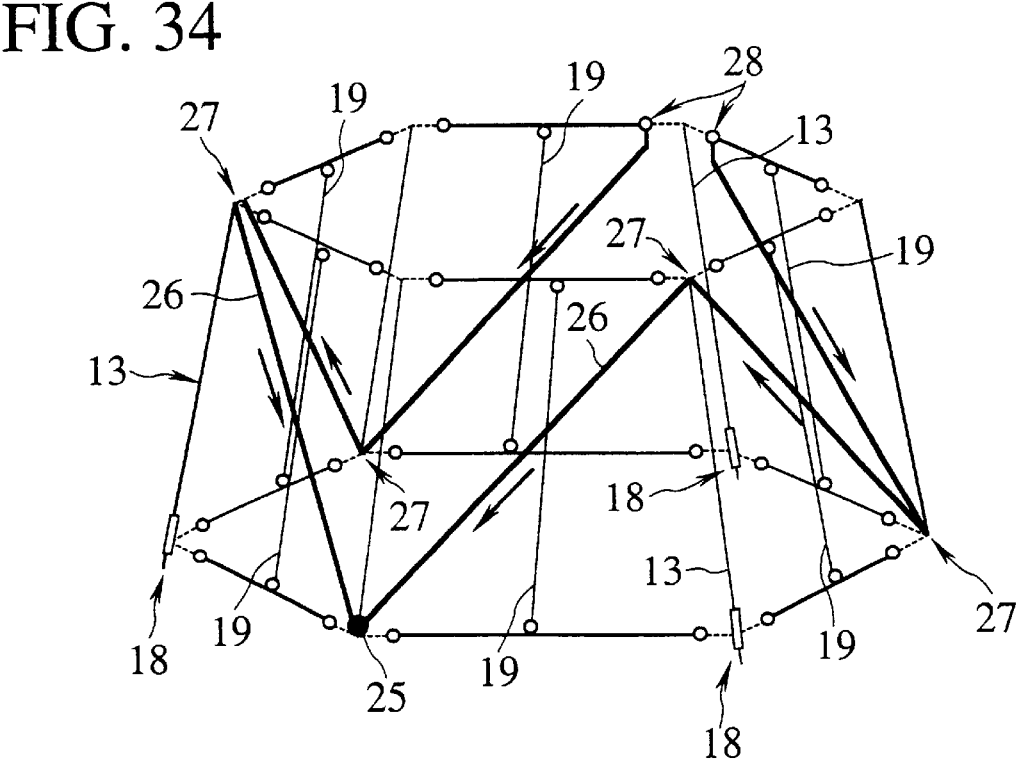
FIG. 34 is a perspective drawing showing a line stowage-type deployable truss which is the result of the improved fifth embodiment.
Figure 35:
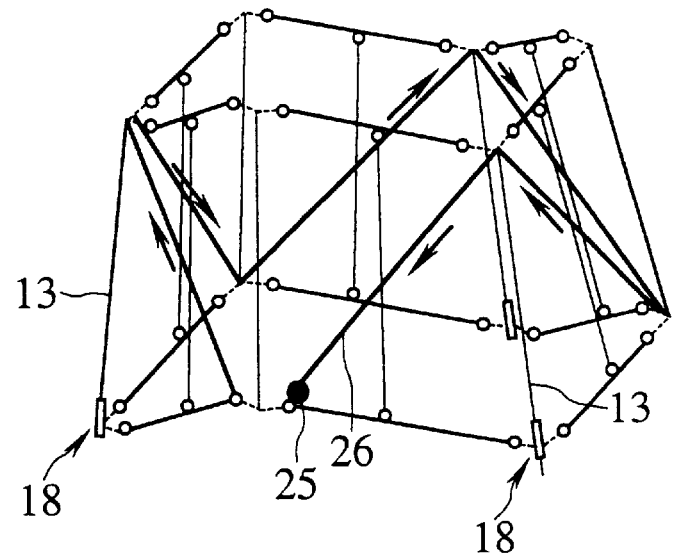
FIGS. 35 to 38 show stowed process of a line stowage-type truss according to a fifth embodiment.
Figure 36:
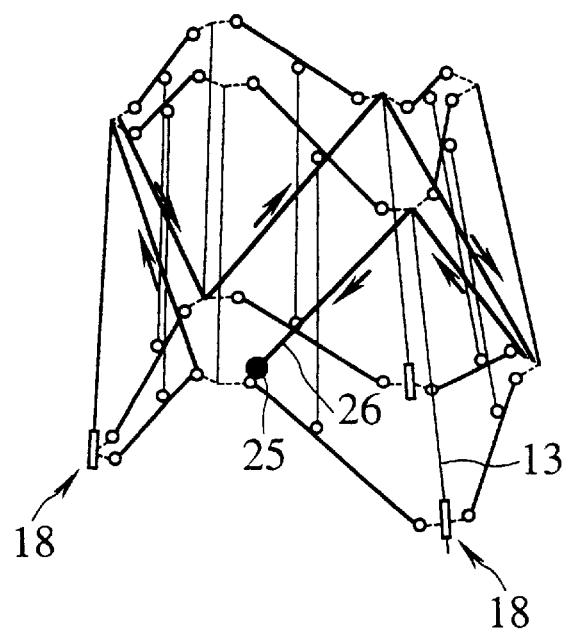
Figure 37:
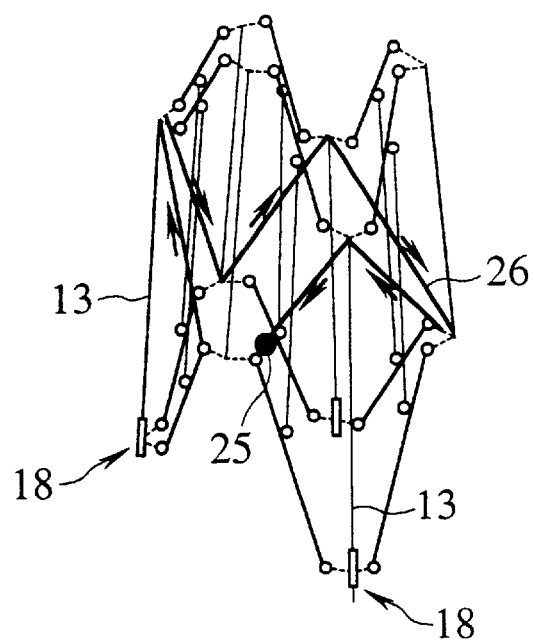
Figure 38:
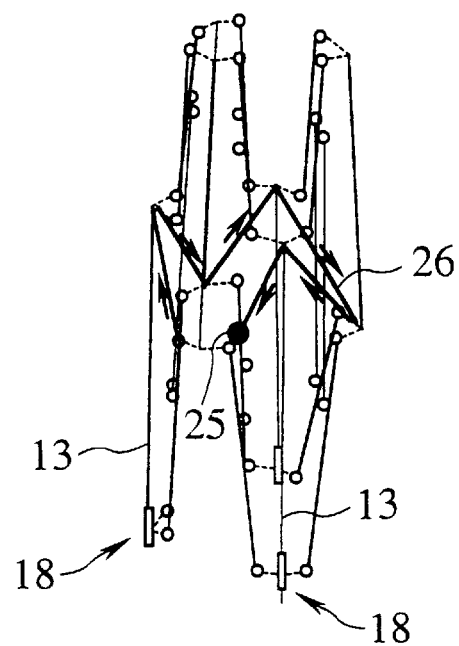
Figure 39A:
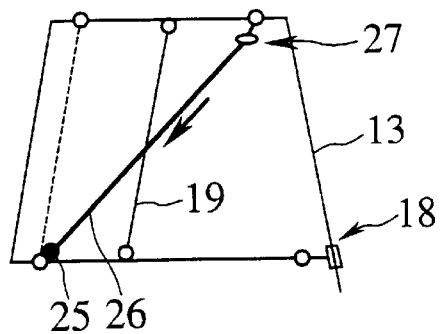
FIGS. 39A to 39E are explanatory drawings of detailed movement of a transformable frame.
Figure 39B:
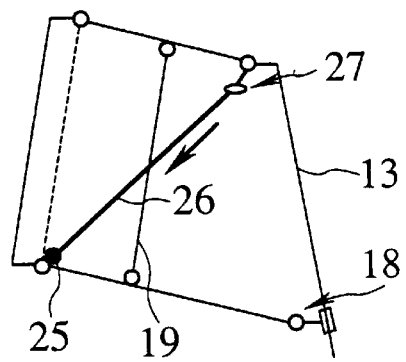
Figure 39C:
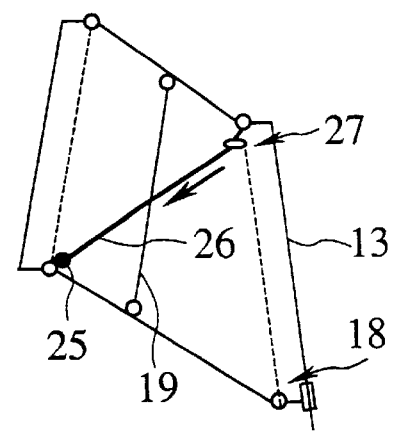
Figure 39D:
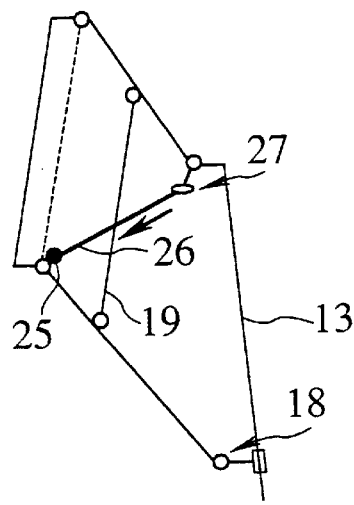
Figure 39E:
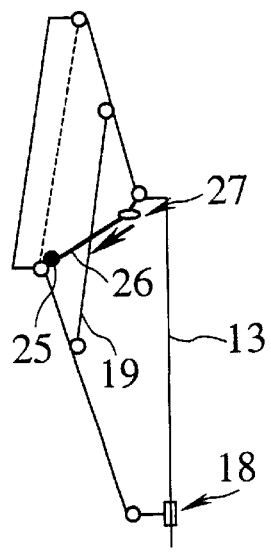

FIG. 34 illustrates an improved line stowage-type deployable truss wherein a stowing cable 26 is divided into two sections and each of which is furled by only one motor 25 in the same direction. According to such arrangement as described above, the respective cables 26, 26 pass through two pulley portions 27, 27, whereby the influence of friction in the pulley portions 27, 27 decreases, so that the synchronous behavior, in the deployment and the stowage, of the right and left truss members centering around the section of the furling motor 25 is improved.

FIGS. 35 through 38 show stowing behavior of the deployable truss structure according to the fifth embodiment illustrated in FIG. 33 wherein the respective states in which the deployable truss structure is successively folded in the order of FIGS. 35, 36, 37, and 38 are illustrated. More specifically, with furling of the stowage cable 26 in the direction of the arrow by means of the motor 25, the whole of the truss structure is folded in a such a fashion that a certain longitudinal member 13 is relatively depressed, while the adjacent longitudinal member is relatively pulled up. In this case, the slider 18 descends along the longitudinal member 13 against the force of a deploying spring.

FIGS. 39A through 39E illustrate stowing behavior of one transformable frame section of the above described deployable truss wherein the respective states in which the transformable frame section is successively folded in the order of FIGS. 39A, 39B, 39C, 39D, and 39E are illustrated. More specifically, a parallel swing member 19 keeps always a parallel relation with respect to a longitudinal member which is not provided with a slider 18 in a process wherein the slider 18 descends to thereby folding the side thereof, and as a consequence, the upper surface member corresponding to the upper side of the side of the deployable truss becomes parallel to the lower surface member corresponding to the lower side of the side of the aforesaid truss thereby making the behavior of stowage smooth, besides the rigidity of the deployable truss during the stowage thereof is elevated.

Figure 40:
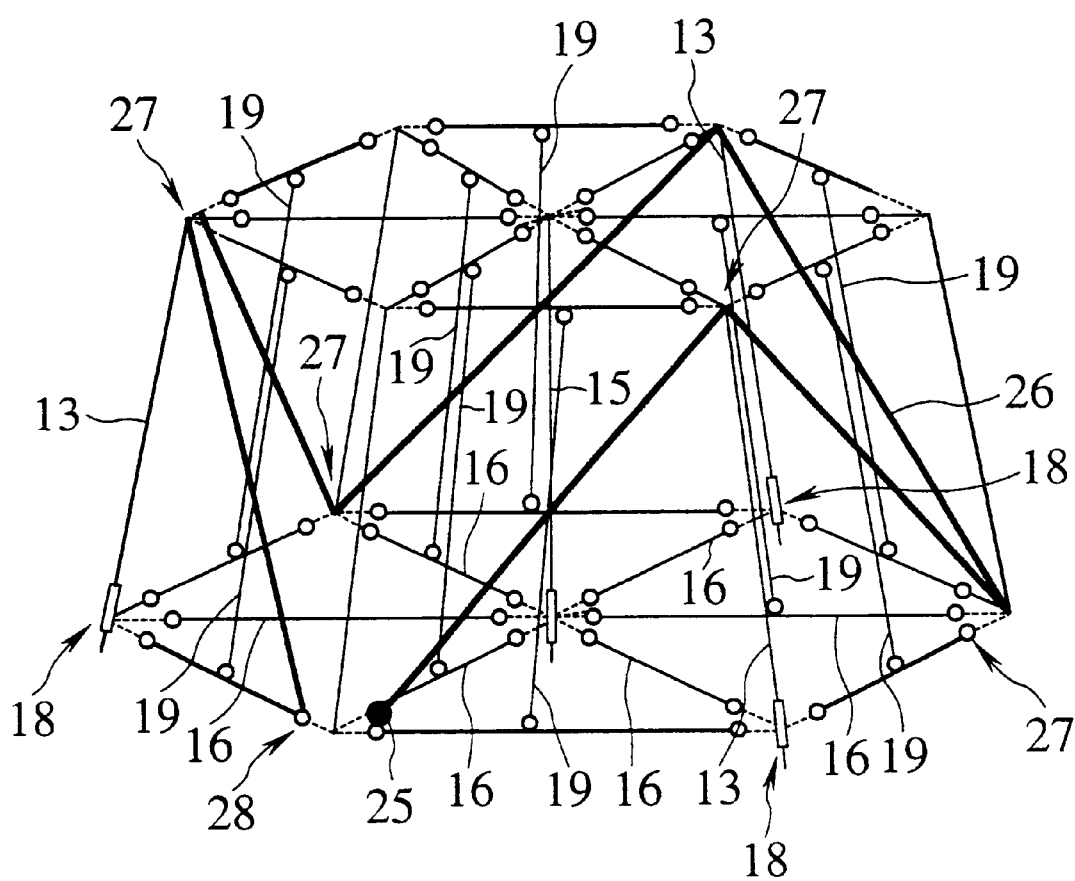
FIG. 40 is a perspective drawing showing a sixth embodiment of a line stowage-type deployable truss according to the present invention.

FIG. 40 is a schematic view illustrating the line stowage-type deployable truss according to the sixth embodiment of the present invention wherein a central longitudinal member 15, a radial member 16, and a parallel swing member 19 disposed in parallel to a longitudinal member 13 having no slider are additionally provided to the components of the above described fifth embodiment. The deployably stowing method of the truss in the sixth embodiment is essentially the same as that of the fifth embodiment.

Now, a link structure used in the transformable frame of the above-mentioned plane stowage-type deployable truss and the line stowage-type deployable truss will collectively be described hereinbelow.

Figure 41:
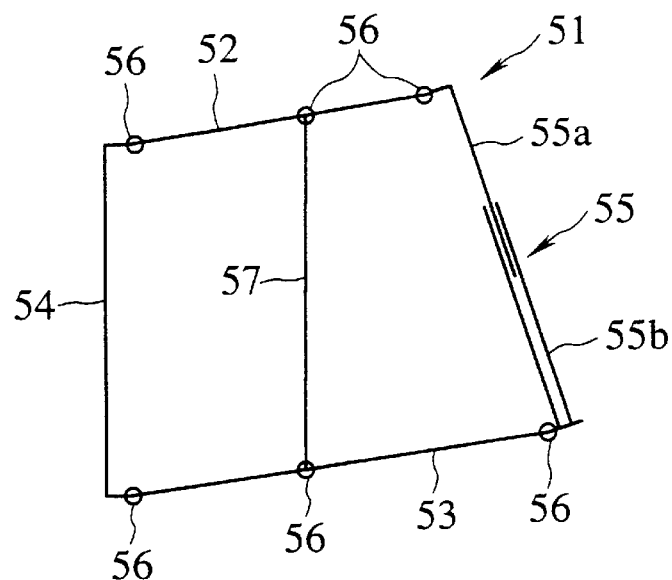
FIG. 41 show a first embodiment of a linked structure according to the present invention.

FIG. 41 and FIGS. 42A, 42B, and 42C are schematic views each showing the link structure according to the first embodiment of the present invention wherein the link structure 51 shown in FIG. 41 is characterized by the construction in which two parallel members 52 and 53 being opposed in parallel to each other are linked to two nonparallel members 54 and 55 being opposed in nonparallel to each other through hinges 56, respectively, so as to form a tetragonal configuration, and an intermediate link member 57 which is linked to the intermediate portions of the aforesaid respective parallel members 52 and 53 through hinges 56, 56, respectively, and which is disposed in parallel to the nonparallel member 54 of the aforesaid nonparallel members 54 and 55, while an distance defined between the hinges 56 and 56 on the other nonparallel member 55 is made variable. In other words, since the other nonparallel member 55 is constructed in an expandable fashion, the distance defined between the hinges 56 and 56 is variable.

The aforesaid parallel members 52, 53, nonparallel members 54, 55 and the intermediate link member 57 are disposed so as to along a plane. The aforesaid respective hinges 56 are adapted to be rotated around axis each of which extends in the direction perpendicular to the aforesaid plane. Furthermore, the other nonparallel member 55 is consisted of a rod-like body 55a and a cylindrical body 55b into which is slidably inserted the rod-like body 55a in the expandable fashion.

Figure 42A:
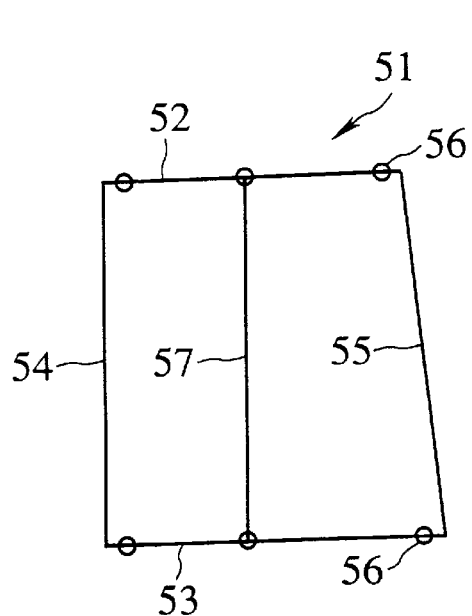
FIGS. 42A to 42C show stowed process of a linked structure according to a first embodiment.
Figure 42B:
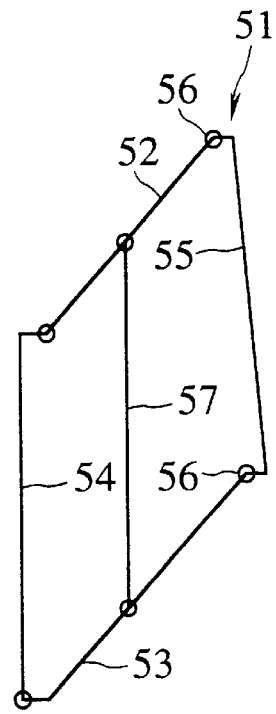
Figure 42C:
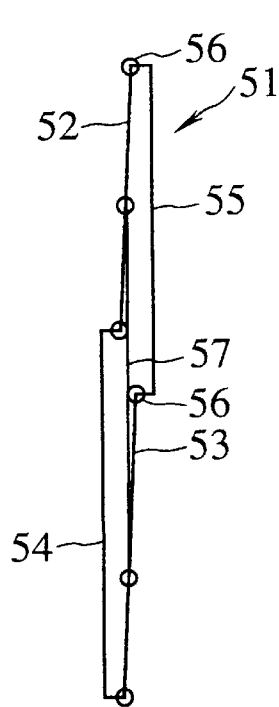

According to the link construction 51 as described above, since the intermediate link member 57 is disposed in parallel to the nonparallel member 54, two parallel members 52 and 53 are kept always parallel to each other. Due to this arrangement the trapezoid-shaped tetragonal configuration consisted of two parallel members 52, 53 and two nonparallel members 54, 55 exhibits either a symmetrical trapezoidal shape as shown in FIG. 42A, or nonsymmetrical trapezoidal shapes as shown in FIGS. 42B and 42C.

Furthermore, since two nonparallel members 54 and 55 are not in parallel to each other, two parallel members 52 and 53 are different from one another in their lengths. In this connection, for example, as shown in FIG. 42A, a state wherein the members define a symmetrical trapezoidal shape is arranged to be the deployed state. From this deployed state, two parallel members 52 and 53 are rotated around the respective hinges 56, 56 of the nonparallel members 54, as the fulcrums, respectively. In this case, as shown in FIGS. 42B and 42C, when both the parallel members 52 and 53 are rotated from the side of the longer parallel member 53 to that of the shorter parallel member 52, the extreme end of the longer parallel member 53 approaches gradually to the extreme end of the shorter parallel member 52, because the extreme end of the longer parallel member 53 has a faster speed in the circumferential direction than that of the extreme end of the shorter parallel member 52. In other words, the distance defined between the hinges 56 and 56 of the other nonparallel member 55 becomes shorter.

On the contrary to the above description, when both the parallel members 52 and 53 are rotated from the side of the shorter parallel member 52 to that of the longer parallel member 53, the extreme end of the longer parallel member 53 goes gradually away from that of the shorter parallel member 52 based on the same reason as that described above. In other words, the distance defined between the hinges 56 and 56 of the other nonparallel member 55 becomes longer.

Accordingly, when the distance between the hinges 56 and 56 is varied, the rotational directions and the rotational positions of two parallel members 52 and 53 can be controlled. Furthermore, in either the state where the distance defined between the hinges 56 and 56 is allowed to be the shortest, or the state where the distance is allowed to be the longest, two parallel members 52 and 53 come to be in the closest state, and in this case, two nonparallel members 54 and 55 come also to be in the closest state, so that the members become one rod-shaped folded state as a whole. FIG. 42C illustrates the state where the distance defined between the hinges 56 and 56 of the other nonparallel member 55 is shortened to be the shortest, whereby the whole members are stowed in a rod-like state.

To obtain a structure having a certain curvature, nonparallel members 54 and 55 of the respective link structures 51 are linked to each other. In this case, since two nonparallel members 54 and 55 are not in parallel to each other, a structure having a configuration close to a circular arc can easily be constructed by means of the respective parallel members 52 and 53. In such a case, it is sufficient to prepare link structures each having the same configuration one another as the respective link structures 51 and accordingly, the manufacturing efficiency can be elevated. Moreover, in this case, when the state of a symmetrical trapezoidal shape of the members has been defined to be a deployed state, since each of the link structures 51 is in a stable trapezoidal shape, besides a distance between two parallel members 52 and 53 are also sufficiently broad, the link structures which are structurally tough can be constructed. It is to be noted that a distance between two parallel members 52 and 53 becomes the maximum in the case when these two parallel members 52 and 53 meet the nonparallel member 54 at right angles. As a consequence, the state where the distance between two parallel members 52 and 53 becomes the maximum as described above is adapted to be the deployed state, whereby it may be intended to strengthen a structure having a certain curvature.

In the present embodiment, since such a member which might be folded during operations is not used, the structure of the present embodiment is simply manufactured, besides parallel members 52, 53, nonparallel members 54, 55, and the intermediate link member 57 can be smoothly actuated.

Furthermore, it is possible that the above described link structures 51 are placed tetragonally to compose a tetragonal truncated pyramid-shaped deployable structure, or the link structures 51 are placed hexagonally to compose a hexagonal truncated pyramid-shaped deployable structure, respectively. In even such tetragonal or hexagonal truncated pyramid-shaped deployable structures, the respective sides thereof may tend to be a folded state in a single rod-shape, so that it is also possible to stow the respective link structures in a single rod-shaped folded state as a whole. In addition, when these tetragonal or hexagonal truncated pyramid-shaped deployable structures are linked to each other, a structure having a curved surface which is permitted to compose the one being approximate to a cylindrical curved surface or the one being approximate to a spherical curved surface can easily be constituted.

Figure 43:
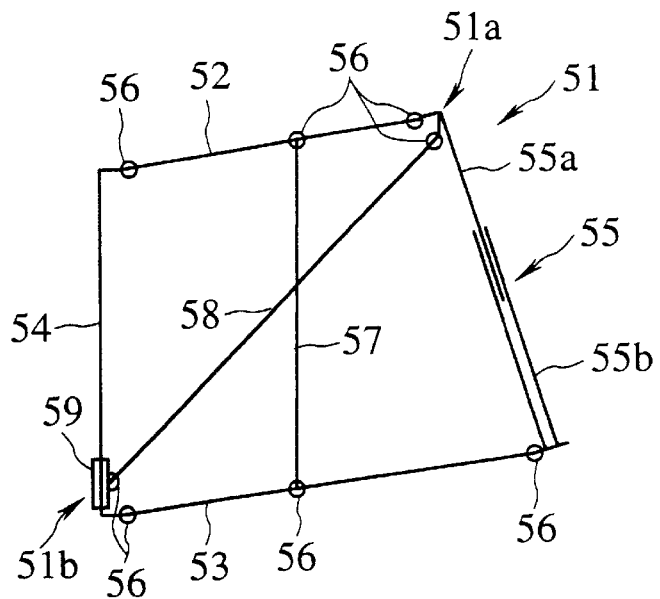
FIG. 43 shows a second embodiment of a linked structure according to the present invention.

The link structure according to the second embodiment of the present invention will be described hereinbelow by referring to FIG. 43 as well as FIGS. 44A through 44C wherein the components being common to those of the first embodiment are designated by the same reference numbers, respectively, and the explanation therefor will be simplified. The second embodiment differs from the first embodiment in that a diagonal member 58 is further added to the essential components.

More specifically, one end of the diagonal member 58 is movably connected to a nonparallel member 54 through a hinge and a slider 59, while the other end of the diagonal member 58 is connected to a corner 51a on the side of a rod-shaped body 55a through another hinge 56. A length of the diagonal member 58 in the deployed state is set in such that one end of the diagonal member provided with the slider 59 positions at a corner 51b opposite to the aforesaid corner 51a. It is to be noted that in the deployable structure according to the present embodiment, the case where the structure comes to be in the symmetrical trapezoidal configuration is adapted to be the deployed state. Furthermore, the diagonal member 58 is disposed in parallel to the plane along which an intermediate link member 57 and the like extend so as to avoid the contact with the intermediate link member 57.

Figure 44A:
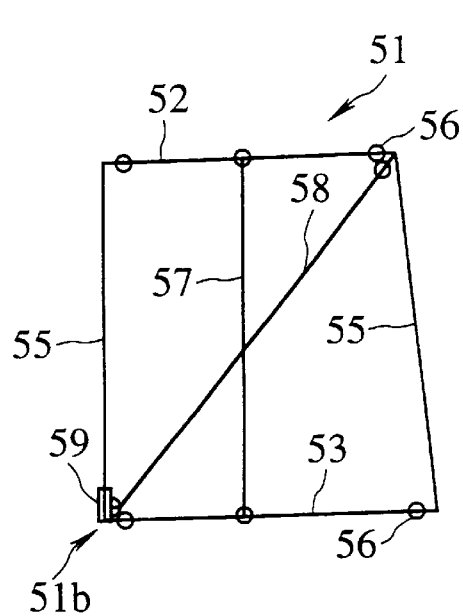
FIGS. 44A to 44C show stowed process of a linked structure according to a second embodiment.
Figure 44B:
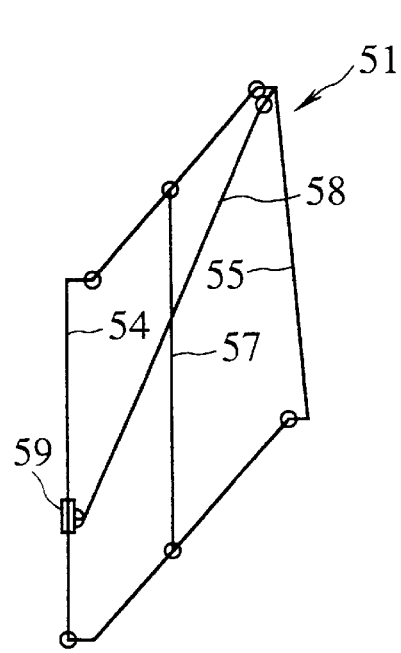
Figure 44C:
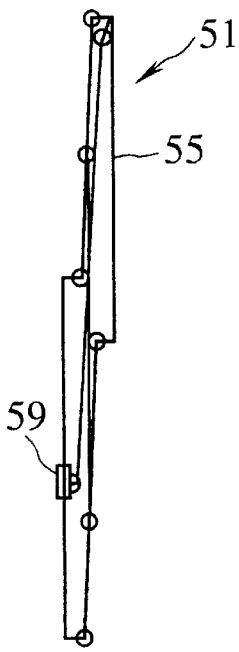

In the link structure 51 constructed as described above, when an distance defined between the hinges 56 and 56 is reduced by shortening a length of another nonparallel member 55 from the deployed state shown in FIG. 44A, the link structure is transformed to be stowed in the folded state of a single rod-shape as shown in FIGS. 44B and 44C. On the other hand, in the deployed state, the slider 59 moves to the corner 51b, so that the diagonal member 58 extends in the opposite direction of the trapezoid. Thus, the strength of the link structure 51 in case of deployment can be elevated, besides the link structure according to the present embodiment attains the same functions and advantages as those of the first embodiment.

Figure 45:
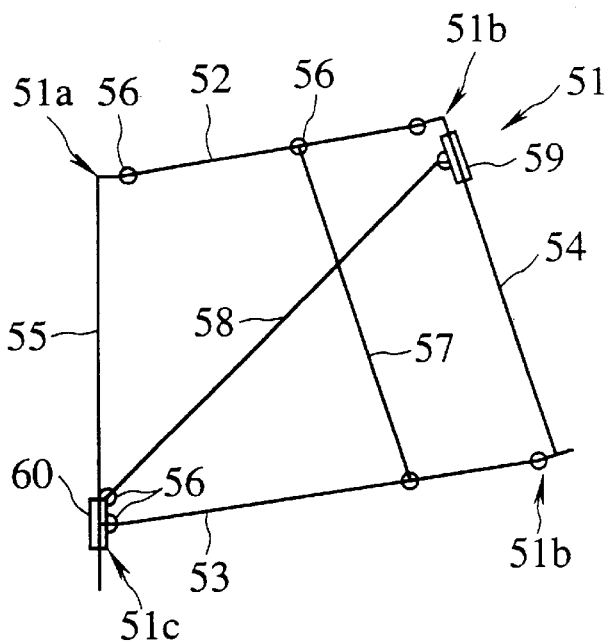
FIG. 45 shows a third embodiment of a linked structure according to the present invention.
Figure 46A:
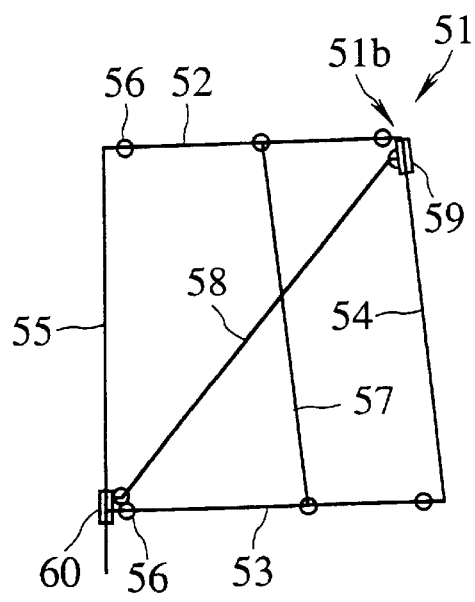
FIGS. 46A to 46C show stowed process of a lined structure according to a third embodiment.
Figure 46B:
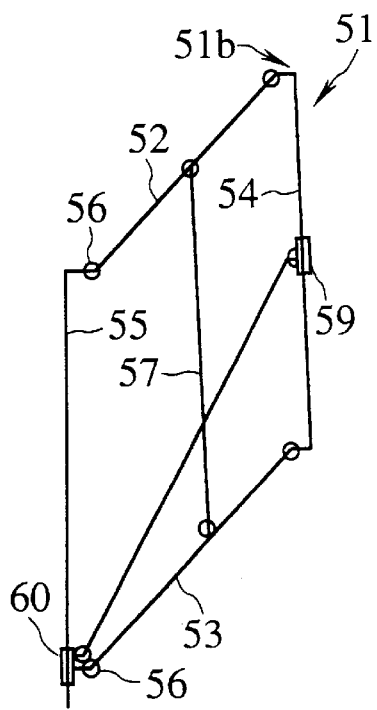
Figure 46C:
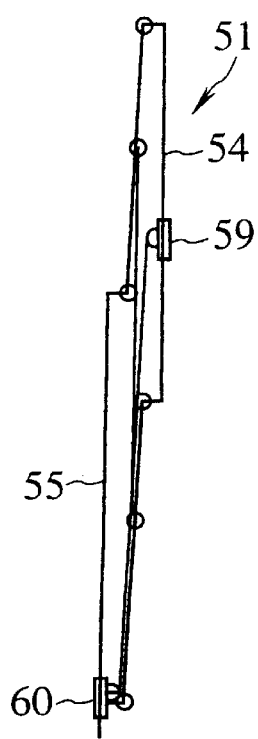

The link structure according to the third embodiment of the present invention will be described hereinbelow by referring to FIG. 45 as well as FIGS. 46A through 46C wherein the components being common to those of the first and second embodiments shown in FIGS. 41 and 43 as well as FIGS. 42A through 42C and FIGS. 44A through 44C are designated by the same reference numbers, respectively, and the explanation therefor will be simplified. The third embodiment differs principally from the first and second embodiments in that the position of a nonparallel member 54 is replaced by that of another nonparallel member 55 as shown in FIG. 45 as well as FIGS. 46A through 46C and that the other nonparallel member 55 is not expandable, but the distance defined between hinges 56 and 56 on the side of the other nonparallel member 55 is variable by means of a slider 60.

More specifically, the length of the other nonparallel member 55 is fixed, and to which is attached movably the slider 60. To the slider 60 is linked a longer parallel member 53 through a hinge 56 and at the same time, is linked a diagonal member 58 through another hinge 56, respectively.

One end of the diagonal member 58 is connected to another slider 59 through another hinge 56, while the other end of which is connected to the slider 60 as described above. The slider 59 is disposed so as to move along the nonparallel member 54. Moreover, the length of the diagonal member 58 is set in such that in the deployed state of the deployable structure, the diagonal member 58 extends from a corner 51c at which the slider positions to a corner 51d opposite to the corner 51c. In this arrangement, the slider 59 moves from the corner 51d along the nonparallel member 54 in the third embodiment.

In the link structure 51 constituted as described above, when the slider 60 moves, the distance between the hinges 56 and 56 on the side of the other nonparallel member 55 varies, whereby the link structure is deployed and stowed. For instance, when the slider 60 is moved downwardly from the deployed state shown in FIG. 46A, the distance between the hinges 56 and 56 on the other nonparallel member 55 is extended to deform the same as shown in FIGS. 46B and 46C, so that the link structure is deformed in a single rod-shape. In this case, the slider 59 moves also along the other nonparallel member 54 with the movement of the slider 60.

Furthermore, in the deployed state of the link structure of the third embodiment, the whole of the link structure exhibits a symmetrical trapezoidal configuration as shown in FIG. 45, and the diagonal member 58 extends in the opposite direction, so that the elevation of the strength of link structure can be intended as in the above described second embodiment. Besides, the same functions and advantages are attained as in the first and the second embodiments.

In the third embodiment, while the example wherein the diagonal member 58 and the slider 59 are provided has been described, the diagonal member 58 and the slider 59 may be omitted as a matter of course. It is, however, preferable to provide these members for the sake of elevating the strength of the link structure.

According to the link structure as mentioned above, when the distance defined between the hinges on the other nonparallel member is varied, the link structure can be transformed into the one having a symmetrical trapezoidal configuration or the ones having the other trapezoidal configurations. Moreover, in either the state where the above described distance between both the hinges is the shortest, or the state where the distance is the longest, two parallel members exhibit a state where they are in the closest positions, and in this case two nonparallel members come also to be in the closest state, so that the link structure can be folded in a single rod-shaped configuration as a whole.

Furthermore, when the respective link structures are linked to each other at the portions of the nonparallel members, a structure having a certain curvature can easily be constituted. In this case, it is sufficient to prepare the link structures each having the same configuration one another, so that the manufacturing efficiency can be elevated. When a symmetrical trapezoidal configuration of the link structure is adapted to be the deployed state and a further structure having a certain curvature is constituted while keeping this deployed state, each of the link structures exhibits a stable trapezoidal configuration, besides a distance between two parallel members is sufficiently wide, and as a consequence the deployable structure which is structurally tough can be constituted. The distance between two parallel members becomes the maximum in the case when these two parallel members meet at right angles with one nonparallel member. Accordingly, the state where the distance between two parallel members becomes the maximum is adapted to be the deployed state and in this state, a structure having a certain curvature may be constituted.

Moreover, since no member which is bent during operations is used in this embodiment, the deployable structure has the simple construction and in which the parallel members, nonparallel members, and the intermediate link member can be smoothly operated to effect the deployment and the stowage thereof.

In the following, a deployable diagonal structure which is applicable between two opposite longitudinal members of the plane stowage-type deployable truss and the line stowage-type deployable truss will be described.

FIGS. 47 through 54 are schematic views each illustrating the deployable diagonal structure according to the first embodiment of the present invention.

Figure 47:
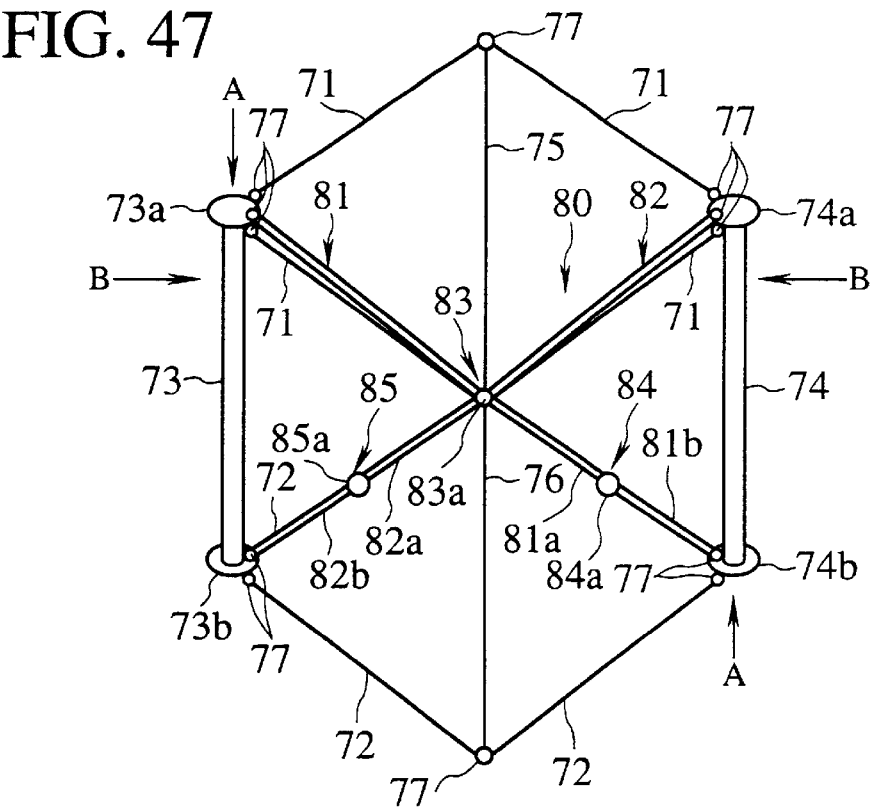
FIG. 47 shows a first embodiment of a deployable diagonal structure according to the present invention.

In FIG. 47, a deployable structure is provided with a deployable diagonal structure 80 which is consisted of two diagonal members 81 extending over opposite points between 73a and 74b and 82 extending over opposite points between 73b and 74a wherein the distance between two adjacent points 73a and 73b among the aforesaid four points 73a, 73b, 74a, and 74b is held at constant and at the same time, the distance between the other two points 74a and 74b being opposite to the former two points, respectively, is also held at constant. While keeping both the distances constant, respectively, when the part defined by the other latter two points 74a and 74b is moved relatively away from or close to the direction with respect to the part defined by the former two points 73a and 73b, the deployable diagonal structure can be deployed and stowed. The deployable diagonal structure of the present embodiment is characterized by that two diagonal members 81 and 82 are rotatably linked at the intersection 83 to each other, and the aforesaid respective diagonal members 81 and 82 have folding and unfolding portions 84 and 85 on at least one side of the aforesaid intersection 83, respectively.

More specifically, an end of the diagonal member 81 is rotatably connected to the point 73a being an end of a first longitudinal member 73 through a hinge 77 and the other end of the diagonal member 81 is rotatably connected to the point 74b being an end of another first longitudinal member 74 through another hinge 77, while an end of the other diagonal member 82 is rotatably connected to the point 73b being the other end of the first longitudinal member 73 through a hinge 77 and the other end of the diagonal member 82 is rotatably connected to the point 74a being the other end of the other first longitudinal member 74 through another hinge 77, respectively.

At the intersection 83, two diagonal members 81 and 82 are rotatably linked to each other by means of an intersection rotatable hinge 83a. The intersection rotatable hinge 83a is arranged to be rotatable along a plane containing two intersected diagonal members 81 and 82. The folding and unfolding portions 84 and 85 are arranged to be rotatable by means of foldably and unfoldably rotating hinges 84a and 85a, respectively. Further more, these foldably and unfoldably rotating hinges 84a and 85a are arranged to be rotatable along a plane containing the intersected two diagonal members 81 and 82.

Figure 50:
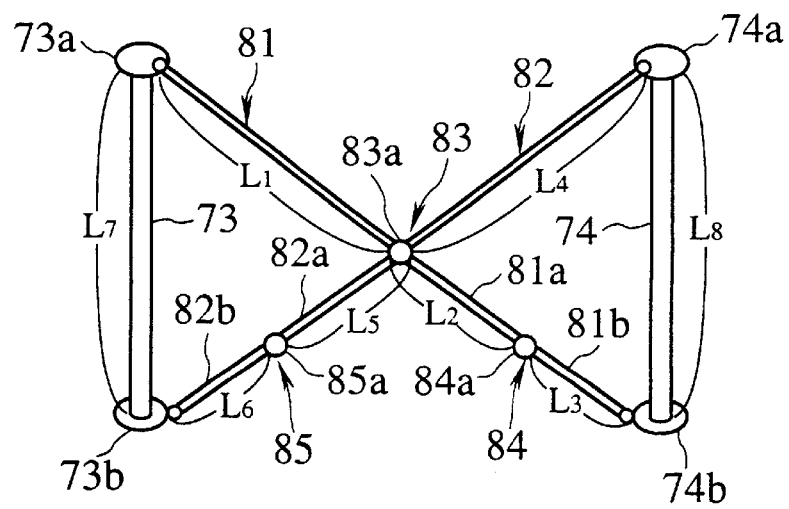
FIG. 50 is an explanatory drawing of the necessary condition of stowage of a deployable diagonal structure according to a first embodiment.

The diagonal members 81 and 82 have such dimensions satisfying the deployment states expressed by the following equations (1) and (2), respectively.

$$L7=L1+L5-L6 \quad (1)$$

$$L8=L4+L2-L3 \quad (2)$$

where in the diagonal member 81, as shown in FIG. 50, L1 is the length extending from the point 73a to the intersection 83, L2 is the length extending from the intersection 83 to the folding and unfolding portion 84, and L3 is the length extending from the folding and unfolding portion 84 to the point 74b, while in the other diagonal member 82, L4 is the length extending from the point 74a to the intersection 83, L5 is the length extending from the intersection 83 to the other folding and unfolding portion 85, L6 is the length extending from the other folding and unfolding portion 85 to the point 73b, further L7 is the length extending over the points 73a and 73b being the opposite ends of the first longitudinal member 73, and L8 is the length extending over the points 74a and 74b being the opposite ends of the other first longitudinal member 74.

Figure 48:
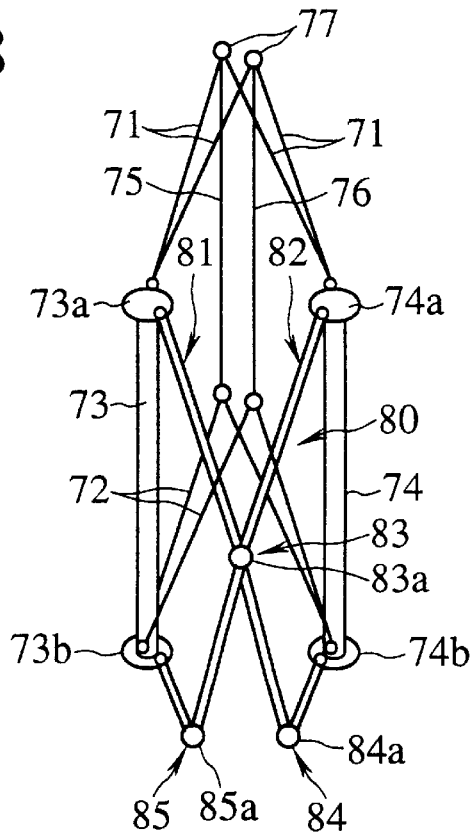
FIGS. 48 and 49 show stowing process of a deployable diagonal structure according to a first embodiment.
Figure 49:
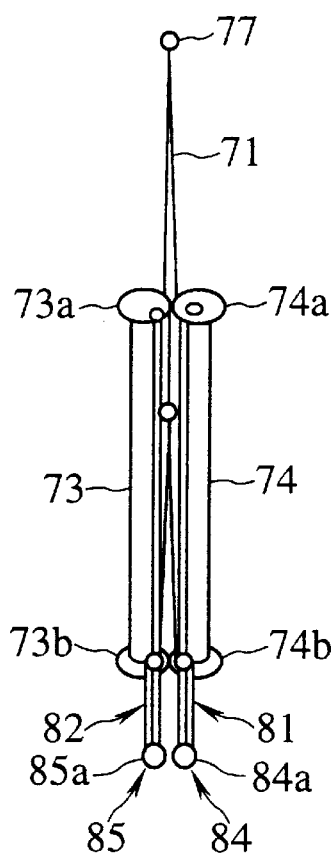

The deployable structure constructed as described above changes from the deployed state shown in FIG. 47 to the state where the structure is folded into a single rod-shaped configuration, i.e. to the stowage state shown in FIG. 49 via the state where the structure is in the course of deployment shown in FIG. 48, and the present deployable structure changes freely from this stowage state to the deployed state vice versa. In the deployed state, the folding and unfolding portions 84 and 85 are in the extended straight state, respectively, so that a triangle is formed by the first longitudinal member 73, a part of the diagonal member 81 defined between the point 73a and the intersection 83, and a part of the other diagonal member 82 defined between the intersection 83 and the point 73b, while another triangle is formed by the other first longitudinal member 74, a part of the other diagonal member 82 defined between the point 74a and the intersection 83, and a part of the diagonal member 81 defined between the intersection 83 and the point 74b. For this reason, even if shearing force A, compression force B, or the force in the other directions acts on either of the first longitudinal members 73 and 74, the configurations of the above-mentioned triangles do not change, so that the deployable structure can positively be strengthened.

Moreover, a triangle is also formed by the upper surface section consisted of upper horizontal members 71, the diagonal member 81, and the other first longitudinal member 74. Another triangle is formed by the aforesaid upper surface section, the other diagonal member 82, and the first longitudinal member 73. A still further triangle is formed by the aforesaid upper surface section as well as both the diagonal members 81 and 82 being positioned on the upper side from the intersection 83, respectively. In addition to the above, further triangles including the lower surface section consisted of lower horizontal members 72 are also formed as described above. Thus, the deployable structure according to the present embodiment is extremely highly rigid and excellent in the strength in the deployed state.

Then, when the deployable structure is folded from the deployed state, the folding and unfolding portions 84 and 85 are slightly bent, for example, the force in the directions of the compression force B is applied from both the sides. As a result, folding moment generates at the respective folding and unfolding portions 84 and 85 by means of the force in the compression direction acting on a position between the intersection 83 and the point 73b as well as on a position between the intersection 83 and the point 74b. Consequently, the diagonal members 81 and 82 are folded at the folding and unfolding portions 84 and 85, respectively. Since the distance extending over two points between 73a and 73b as well as the distance extending over the other two points between 74a and 74b are constant, respectively, the diagonal members 81 and 82 are folded at the folding and unfolding portions 84 and 85, respectively, so as to fold them back, so that the opposite first longitudinal members 73 and 74 approach to each other to come to be in the state where the members are stowed in a rod-shaped configuration (see FIG. 49).

Figure 51:
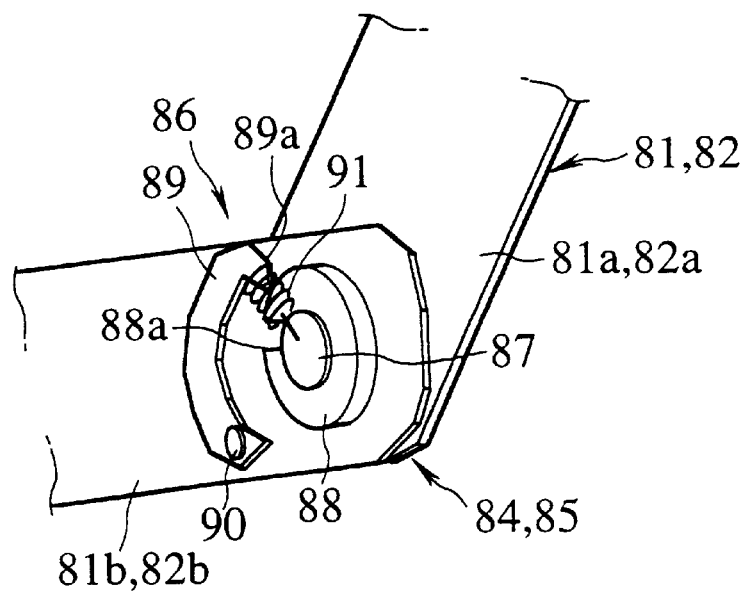
FIG. 51 shows an example of a foldable and unfoldable rotating hinge of a deployable diagonal structure.

In the following, another example of the above described respective foldably and unfoldably rotating hinges 84a and 85a will be described. Namely, in the deployed state, when the respective folding and unfolding portions 84 and 85 are in the straight state, no folding moment acts on the folding and unfolding portions 84 and 85 even if the force in the compression direction acts on a position between the intersection 83 and the point 73b as well as on a position between the intersection 83 and the point 74b, so that the respective folding and unfolding portions 84 and 85 remain held straight. In other words, when the respective folding and unfolding portions 84 and 85 are in the straight state, the deployed state can be maintained. It is, however, preferred from a viewpoint of maintaining the stability in the deployed state that the folding and unfolding portions 84 and 85 are provided with stoppers, respectively, so as not to produce folding in the respective folding and stretching portions 84 and 85 even if oscillation or the like occurs. More specifically, it is preferred that each of the folding and unfolding portions 84 and 85 is provided with a foldably and unfoldably rotating hinge 86 with a stopper as shown in FIG. 51 in place of the ordinary rotating-type hinges 84a and 85a described above.

The explanation will be made herein on the basis of the arrangement wherein the folding and unfolding portion 84 is provided with the foldably and unfoldably rotating hinge 86. In the diagonal member 81, the side including the intersection 83 is made to be a longer diagonal member 81a, while the extreme end side of the folding and unfolding portion 84 is made to be a shorter diagonal member 81b.

The foldably and unfoldably rotating hinge 86 is provided with a hinge shaft 87, a latch disk 88, a latch lever 89, a securing pin 90, and a latch spring 91. The hinge shaft 87 is secured to the longer diagonal member 81, while to the hinge shaft 87 is rotatably connected to the shorter diagonal member 81*b*. The latch disk 88 is secured to the hinge shaft 87 so as to prevent from falling off of the shorter diagonal member 81*b* from the hinge shaft 87. The latch lever 89 is formed into a circular arc shape so as to along the periphery of the latch disk 88, and the basic end portion of the latch lever is rotatably attached to the shorter diagonal member 81*b* through the securing pin 90.

Moreover, the extreme end of the latch lever 89 is provided with a locking projection 89*a*, while a locking concavity 88*a* into which is fitted the locking projection 89*a* is defined on the latch disk 88. The positions of these locking projection 89*a* and the locking concavity 88*a* are arranged in such that when both the longer diagonal member 81*a* and the shorter diagonal member 81*b* come to be in the straight state, the locking projection 89*a* fits in the locking concavity 88*a*. Furthermore, the latch spring 91 is mounteo so as to always draw the extreme end of the latch lever 89 nearer towards the side of the latch disk 88. As a consequence, the locking projection 89*a* is in the state where it is always pressed against the circumferential surface of the latch disk 88, so that when both the longer diagonal 81*a* and the shorter diagonal member 81 come to be in the straight state, the locking projection 89*a* fits automatically in the locking concave 88*a*.

In the foldably and unfoldably rotating hinge 86 constituted as described above, since a stopper for keeping the folding and unfolding portion 84 straight is consisted of the latch lever 89 and the latch disk 88, the deployed state of the structure can positively be maintained. It is to be noted that when the foldably and unfoldably rotating hinge 86 is mounted on the other folding and unfolding portion 85, the longer diagonal member 81*a* becomes the longer diagonal member 82*a*, while the shorter diagonal member 81*b* becomes the shorter diagonal member 82*b* in FIG. 51.

Figure 52:
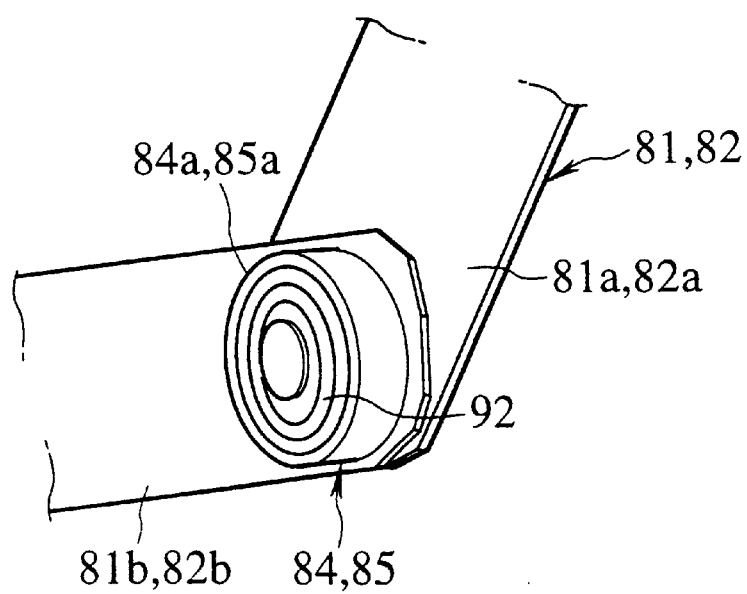
FIG. 52 shows another example of a foldable and unfoldable rotating hinge of a deployable diagonal structure.
Figure 53:
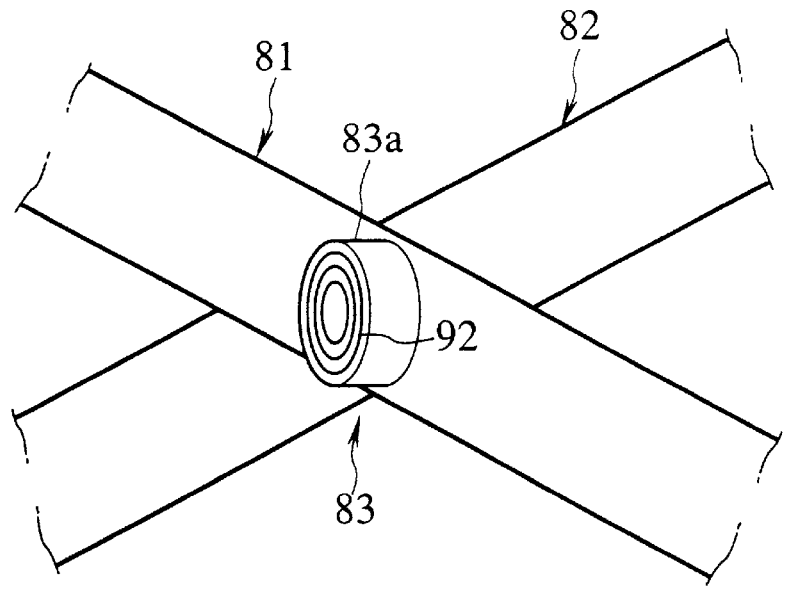
FIG. 53 shows an example of a crossing rotary hinge of a deployable diagonal structure.
Figure 54:
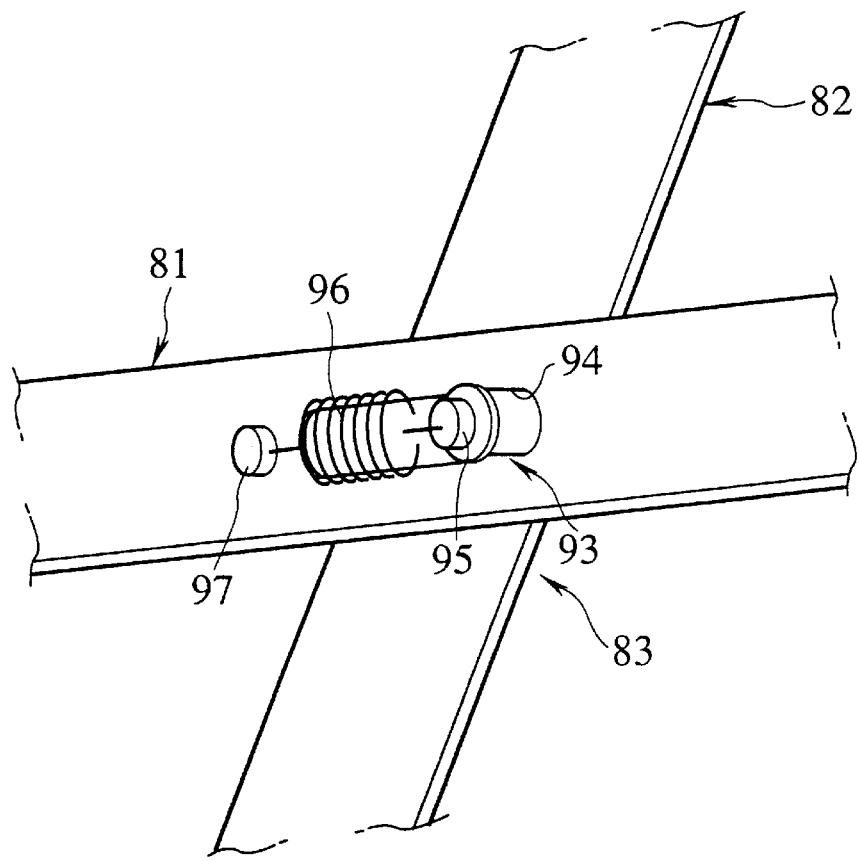
FIG. 54 shows another example of a crossing rotary hinge of a deployable diagonal structure.

In the following, another example of the above described foldably and unfoldably rotating hinges 84*a* and 85*a* as well as of the intersection rotating hinge 83*a* will be described. Namely, a spiral spring 92 (rotation driving means) for affording torque in the deploying direction is mounted on the foldably and unfoldably rotating hinges 84*a* and 85*a* as well as on the intersection rotating hinge 83*a* as shown in FIGS. 52 and 53, respectively. The spiral spring 92 is mounted for such reason that elastic energy has been stored in the spiral spring in the case where the deployable structure has been folded, and the respective diagonal members 81 and 82 or the like are deployed up to the perfect deployed state by the use of the energy thus stored.

The spiral spring 92 may be mounted so as to produce torque in the direction of folding the structure. Furthermore, it may be formed in such that the respective diagonal members 81 and 82 or the like are deployed or stowed by means of a rotation driving means such as a motor and the like in place of the spiral spring 92. Moreover, it may be formed in such that a rotation driving means such as the spiral spring 92, a motor and the like is mounted on the foldably and unfoldably rotating hinge 86 provided with the stopper shown in FIG. 51.

In the following, another example of the above described intersection rotating hinge 83*a* will be described. Namely, the intersection rotating hinge 93 shown in FIG. 54 will be described hereinbelow. A long slot 94 is defined on the diagonal member 81, and a hinge shaft 95 of the intersection rotating hinge 93 is fitted movably along the long slot 94. The long slot 94 is defined on the diagonal member 81 with a certain length along the longitudinal direction thereof, and the hinge shaft 95 is secured to the other diagonal member 82. Furthermore, a tension spring 96 is provided for unfolding always the hinge shaft 95 along the longitudinal direction of the long slot 94. One end of the tension spring 96 is fixed to the hinge shaft 95, while the other end thereof is secured to the diagonal member 81 through a securing pin 97.

In the intersection rotating hinge 93 constituted as described above, even in such a case where unnatural force is forced to the hinge section such as the foldably and unfoldably rotating hinges 84*a* and 85*b* or the like due to the influence of dimensional tolerance in the diagonal members 81 and 82 or the other members, an amount of such dimensional tolerance can be cancelled, since the hinge shaft 95 moves along the long slot 94. Therefore, there is no case where unnatural force is applied to the foldably and unfoldably rotating hinges 84*a* and 85*a* or the like, so that the deployment and the stowage of the deployable structure can smoothly be carried out. It is preferred to design in such that the hinge shaft 95 is positioned at the substantially midpoint of the long slot 94 in the longitudinal direction thereof for the sake of absorbing a variety of dimensional tolerances.

In FIG. 47, while an example wherein both the folding and unfolding portions 84 and 85 are placed on the under side from the intersection 83 has been illustrated, it may be formed that both the folding and unfolding portions 84 and 85 are placed on the upper side from the intersection 83. Furthermore, it may be formed that the folding and unfolding portion 84 is placed on the under side of the intersection 83, while the other folding and unfolding portion 85 is placed on the upper side of the intersection 83, and vice versa. In addition, it may be also formed that the folding and unfolding portions 84 and 85 are disposed on the opposite sides of the intersection 83.

According to the deployable diagonal structure of the present embodiment, since the folding and unfolding portions of the diagonal members are folded, the structure can be folded into a single rod-shaped configuration. Moreover, since the folding and unfolding portions extend straight at the time of completing the deployment, a triangle can be formed by the intersection and one of the diagonal members extending over the respective two points, and further another triangle can also be formed by the intersection and the other diagonal member extending over the respective two points. Consequently, even if shearing force and the external force applied from the direction other than that of the shearing force act upon the deployable diagonal structure, the reaction force can be produced against the external force by means of the above described respective triangles, whereby the improvement in the strength of the structure can be intended.

In the deployable diagonal structure constituted in such that the intersection is rotatable by means of the intersection rotating hinge, the folding and unfolding portion is rotatable by means of the foldably and unfoldably rotating hinge, and a rotation driving means for affording torque to either or both of these intersection rotating hinge and the foldably and unfoldably rotating hinge in the deployed or the stowage direction with respect to diagonal members is provided, the deployment or the stowage of the structure can automatically be carried out by means of the rotation driving force produced by the rotation driving means.

In the deployable diagonal structure constituted in such that the intersection is movable along one of the diagonal members, even in such a case where the deployment or the stowage is not smoothly carried out, for example, there is an error or the like in the length of a diagonal member, such error or the like can be absorbed in the intersection, so that the deployment and the stowage of the structure can be smoothly effected.

FIGS. 55 through 58 are schematic views each illustrating the deployable diagonal structure according to the second embodiment of the present invention.

In FIG. 55, the deployable structure is provided with a deployable diagonal module 80 being consisted of opposite two first longitudinal members 73 and 74 as well as two diagonal members 81 and 82 linked to the first longitudinal members 73 and 74 so as to intersect with each other. The deployable diagonal module 80 can be deployed or stowed by making the aforesaid two first longitudinal members 73 and 74 away from or close to each other. The present deployable diagonal module 80 is characterized by that the aforesaid respective diagonal members 81 and 82 are rotatably connected to the respective first longitudinal members 73 and 74, respectively, and at the same time two diagonal members 81 and 82 are rotatably linked to the intersection 83, and that the diagonal member 81 extends from the first longitudinal member 73 to the other first longitudinal member 74 through the intersection 83, and a folding and unfolding portion 84 is disposed at the position between the intersection 83 and the other first longitudinal member 74, while the other diagonal member 82 extends from the other first longitudinal member 74 to the first longitudinal member 73 through the intersection 83, and the other diagonal member 82 is movably connected to the first longitudinal member 73 in the axial direction thereof.

More specifically, the diagonal member 81 is connected rotatably to an upper connecting portion 73a of the first longitudinal member 73 and to a lower connecting portion 74b of the other first longitudinal member 74 through each of rotating hinges 77, 77. Furthermore, the other diagonal member 82 is connected rotatably to an upper connecting portion 74a of the other first longitudinal member 74 and to a slider 98 which moves lower than the position of a lower connecting portion 73b on the first longitudinal member 73 through each of rotating hinges 77, 77. The distance between the upper connecting portion 73a and the lower connecting portion 73b is equal to the one between the upper connecting portion 74a and the lower connecting portion 74b. To these connecting portions 73a, 73b, 74a, and 74b are connected to upper horizontal members 71, 71 and lower horizontal members 72, 72, respectively.

Furthermore, the first longitudinal member 73 has a sliding portion 73c which extends further downwardly from the lower connecting portion 73b, and the slider 98 is mounted movably in the axial direction to the sliding portion 73c. To the slider 98 is connected the second diagonal member 82 through a rotating hinge 77. Moreover, the slider 98 abuts upon the lower connecting portion 73b in the state of completing the deployment shown in FIG. 55, at this position the slider has a stopper (not shown) to be secured to the sliding portion 73c.

On the intersection 83 at which the respective diagonal members 81 and 82 intersect with each other is mounted an intersection rotating hinge 83a. The intersection rotating hinge 83a is arranged so as to rotatably connect both the diagonal members 81 and 82 to each other along the plane including two intersecting diagonal members 81 and 82.

A folding and unfolding portion 84 is rotatable by means of a foldably and unfoldably rotating hinge 84a. Further, the foldably and unfoldably rotating hinge 84a is arranged to be rotatable along the plane including the intersecting two diagonal members 81 and 82.

Figure 58:
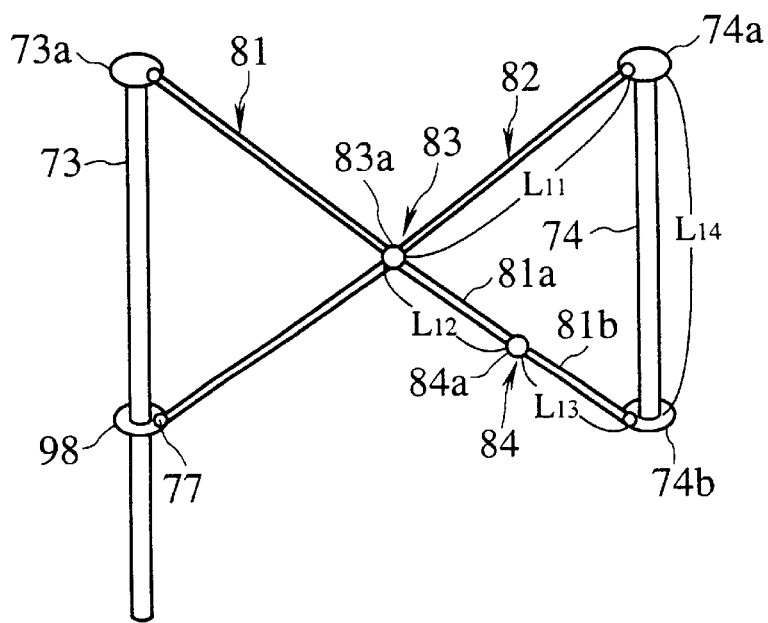
FIG. 58 is an explanatory drawing of the necessary condition of stowage of a deployable diagonal structure according to a second embodiment.

The respective diagonal members 81 and 82 are arranged to have each of dimensions satisfying the deployment state expressed by the following equation (3)

$$L14=L11+L12-L13 \qquad (3)$$

where as shown in FIG. 58, L11 is the length extending from the upper connecting portion 74a to the intersection 83, L12 is the length extending from the intersection to the folding and unfolding portion, L13 is the length extending from the folding and unfolding portion 84 to the lower connecting portion 74b, and L14 is the length extending from the upper connecting portion 74a to the lower connecting portion 74b.

Figure 57:
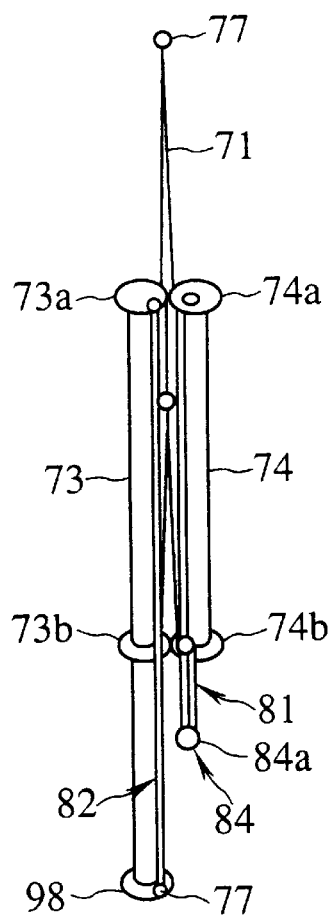

The deployable structure constructed as described above changes from the deployed state shown in FIG. 55 to the state where the structure is folded into a single rod-shaped configuration, i.e. to the stowage state shown in FIG. 57 via the state where the structure is in the course of deployment shown in FIG. 56, and the present deployable structure changes freely from this stowage state to the deployed state vice versa. In the deployed state, the folding and unfolding portion 84 is in the extended straight state, at the same time, the slider 98 moves to the position of the lower connecting portion 73b, and the slider 98 becomes in the state where it has been fixed to the first longitudinal member 73 by means of the stopper (not shown), so that a triangle is formed by the first longitudinal member 73, the diagonal member 81 defined between the upper connecting portion 73a and the intersection 83, and the other diagonal member 82 defined between the intersection 83 and the slider 98, while another triangle is formed by the other first longitudinal member 74, the other diagonal member 82 defined between the upper connecting portion 74a and the intersection 83, and the diagonal member 81 defined between the intersection 83 and the lower connecting portion 74b. For this reason, even if shearing force A, compression force B, or the force in the other directions acts on either of the first longitudinal members 73 and 74, the configurations of the above-mentioned triangles do not change, so that the deployable structure can positively be strengthened.

Moreover, a triangle is also formed by the upper surface section consisted of upper horizontal members 71, the diagonal member 81, and the other first longitudinal member 74. Another triangle is formed by the aforesaid upper surface section, the other diagonal member 82, and the first longitudinal member 73. A still further triangle is formed by the aforesaid upper surface section as well as both the diagonal members 81 and 82 being positioned on the upper side from the intersection 83, respectively. In addition to the above, further triangles including the lower surface section consisted of lower horizontal members 72, are also formed as described above. Thus, the deployable structure according to the present embodiment is extremely highly rigid and excellent in the strength in the deployed state.

Then, when the deployable structure is folded from the deployed state, the stopper (not shown) of the slider 98 is disengaged and at the same time, the folding and unfolding portion 84 is slightly folded, and then, for example, the force in the directions of the compression force B is applied from both the sides. As a result, the slider 98 moves towards the direction away from the lower connecting portion 73b by the compression force acting upon a part defined between the upper connecting portion 74a and the slider 98 and at the same time, folding moment acts upon the folding and unfolding portion 84 by the compression force acting upon a part defined between the intersection 83 and the lower connecting portion 74b. Consequently, the folding and unfolding portion 84 comes to be folded, while the diagonal member 81 is folded at the folding and unfolding portion 84 so as to fold it back, so that the other diagonal member 81 approaches to the first longitudinal member 73 with the movement of the slider 98. As a result, both the first longitudinal members 73 and 74 approach also to each other to come to be in the state where the members are stowed in a rod-shaped configuration as a whole (see FIG. 57).

In also the present embodiment, as the foldably and unfoldably rotating hinges, those shown in FIGS. 51 and 52 may be used as in the first embodiment. Moreover, as the intersection rotating hinges, those shown in FIGS. 53 and 54 may be utilized.

Furthermore, while the slider 98 has been provided with the stopper for securing the same to the longitudinal member 73 at the time of completing the deployment, if the stopper is not provided, a triangle containing the intersection 83, the upper connecting portion 74a, and the lower connecting portion 74b as the apexes can be composed, so that the force such as the compression force B and the like can be maintained. It is, however, preferred to provide the stopper for the sake of elevating the strength of the structure, since the triangle containing the intersection 83, the upper connecting portion 73a, and the lower connecting portion 73b as the apexes is formed due to the provision of the stopper.

According to the deployable diagonal structure of the present embodiment, since one of the diagonal members is folded at the folding and unfolding portion, while the other diagonal member moves along the former longitudinal member, the whole of the structure can be folded into a single rod-shaped configuration. Moreover, since the folding and unfolding portion extends straight at the time of completing the deployment, a triangle is formed by the other latter longitudinal member, the diagonal member extending from this latter longitudinal member to the intersection, and the other diagonal member extending from the other latter longitudinal member to the intersection. Consequently, even if shearing force and the external force in the direction other than that of the shearing force act upon the structure, the reaction force can be produced against the external force by means of the above described triangle, so that the improvement in the strength of the structure can be intended.

In the deployable diagonal structure constituted in such that the intersection is rotatable by means of the intersection rotating hinge, the folding and unfolding portion is rotatable by means of the foldably and unfoldably rotating hinge, and a rotation driving means for affording torque to either or both of these intersection rotating hinge and the foldably and unfoldably rotating hinge in the deployed or the stowage direction with respect to diagonal members is provided, the deployment or the stowage of the structure can automatically be carried out by means of the rotation driving force produced by the rotation driving means.

In the deployable diagonal structure constituted in such that the intersection is movable along one of the diagonal members, even in such a case where the deployment or the stowage is not smoothly carried out, for example, there is an error or the like in the length of a diagonal member, such error or the like can be absorbed in the intersection, so that the deployment and the stowage of the structure can be smoothly effected.

Based on the above-mentioned first and second embodiments, such an embodiment wherein an end of each of two diagonal members is movably connected, in the axial direction thereof, to each of two longitudinal members can easily be considered.

The explanation for the deployable truss according to the present invention has been completed as described above.

Now, a modular deployable antenna containing the above described deployable trusses as the basic modules will be described hereinbelow.

First, a approximate spherical structure being the concept for forming the curved surface of an antenna with high precision will be described.

Figure 59:
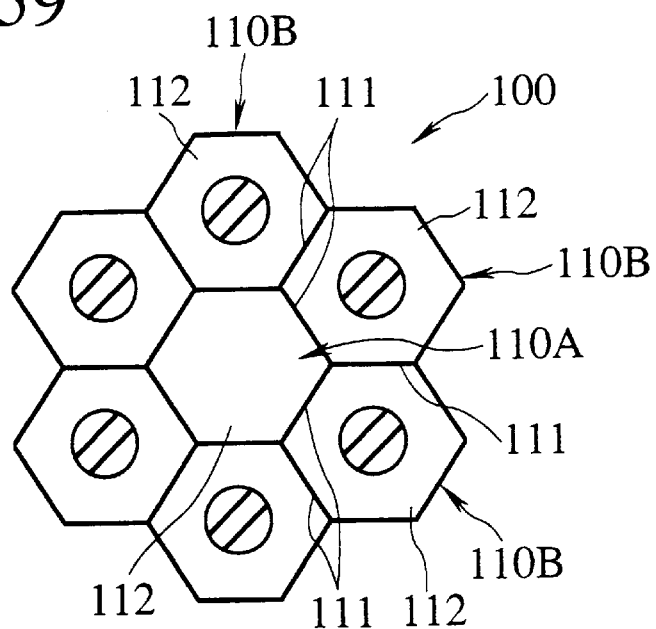
FIG. 59 shows a first embodiment of an approximate spherical structure according to the present invention.

FIG. 59 is a schematic view illustrating the approximate spherical structure according to the first embodiment of the present invention wherein the approximate spherical structure 100 is constituted by combining plural modules 110, each having a shape of hexagonal truncated pyramid with each other in each side surface 111 thereof to be approximate spherically along either or both of the upper surface 112 and the lower surface 113 of each module 110. The approximate spherical structure is characterized by providing one basic module 110A formed into the shape of a regular hexagonal truncated pyramid from among the aforesaid structures 100, and radially located modules 110B each having the same shape so as to approximate the same spherical surface and being connected radially from the respective side surfaces 111 of the basic module 110A as the modules 110. However, it is to be noted that in the present embodiment, the modules approximate a spherical surface on the side of upper surfaces 112, and in this connection, FIG. 59 is a top planar view viewed from the side of the upper surfaces 112 of the respective modules 110. In case of this embodiment, the modular structure 100 is consisted of individual modules 110 in a modulated state wherein the modules 110 are combined with each other through members on the respective side surfaces 111 of the modules 110.

Figure 60:
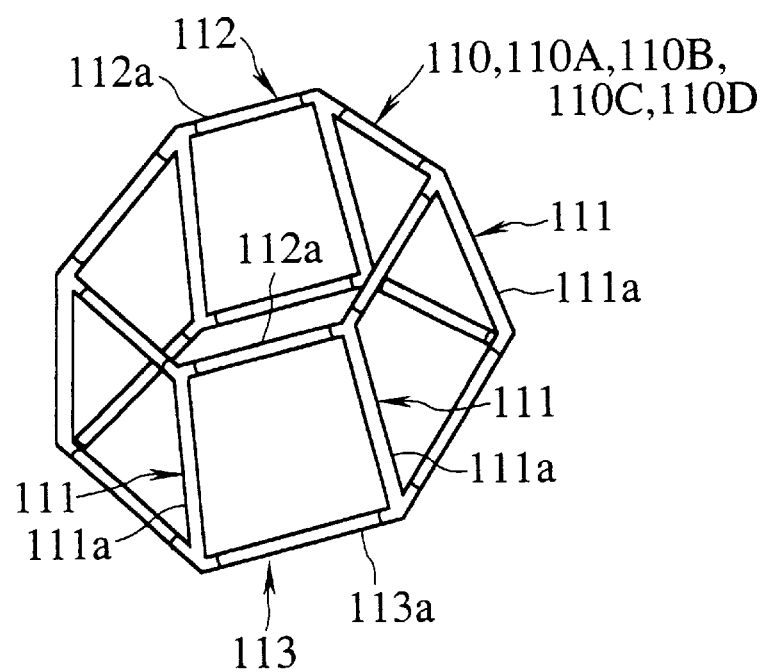
FIG. 60 is a perspective drawing showing a structure which is a module of an approximate spherical structure.

More specifically, the module 110 is composed by means of framed structures forming a hexagonal truncated pyramid as shown in FIG. 60 wherein an upper horizontal member 112a forms the upper surface 112 having the form of hexagon, while a lower horizontal member 113a forms the lower surface 113 having the form of hexagon, the respective vertexes of these upper surface 112 and the lower surface 113 are linked to each other by means of a longitudinal member 111a, and each of the side surfaces 111 is constituted by opposite two longitudinal members 111a, 111a as well as by the upper horizontal member 112a and the lower horizontal member 113a each extending between the opposite longitudinal members 111a and 111a.

The basic module 110A is composed by the longitudinal members 111a, the upper horizontal members 112a, and the lower horizontal members 113a forming a regular hexagonal truncated pyramid wherein the upper surfaces 112 and the lower surfaces 113 compose a regular hexagonal shape, and the respective side surfaces 111 are configured into the same trapezoidal shapes. Moreover, each of the radially located modules 110B is composed by the longitudinal members 111a, the upper horizontal members 112a, and the lower horizontal members 113a forming a hexagonal truncated pyramid. In the state where the radially located modules 110B have been linked to the respective side surfaces 111 of the basic module 110A, the radially located modules 110B are formed in such that the respective vertexes of the upper surfaces 112 position on the same spherical surface. In each of the radially located modules 110B, the lengths of the upper horizontal member 112a and the lower horizontal member 113a are the same as those of the basic module 110A. Furthermore, the length of the longitudinal member 111a in each of the radially located modules 110B is the same as that of the longitudinal member 111a corresponding thereto in the basic module 110A.

The approximate spherical structure 100 constructed as described above, since a spherical surface can be approximated by two types of structural patterns. i.e. the basic module 110A and the radially located module 110B, the efficiency in the design and the manufacture of the structure can be improved.

Figure 61:
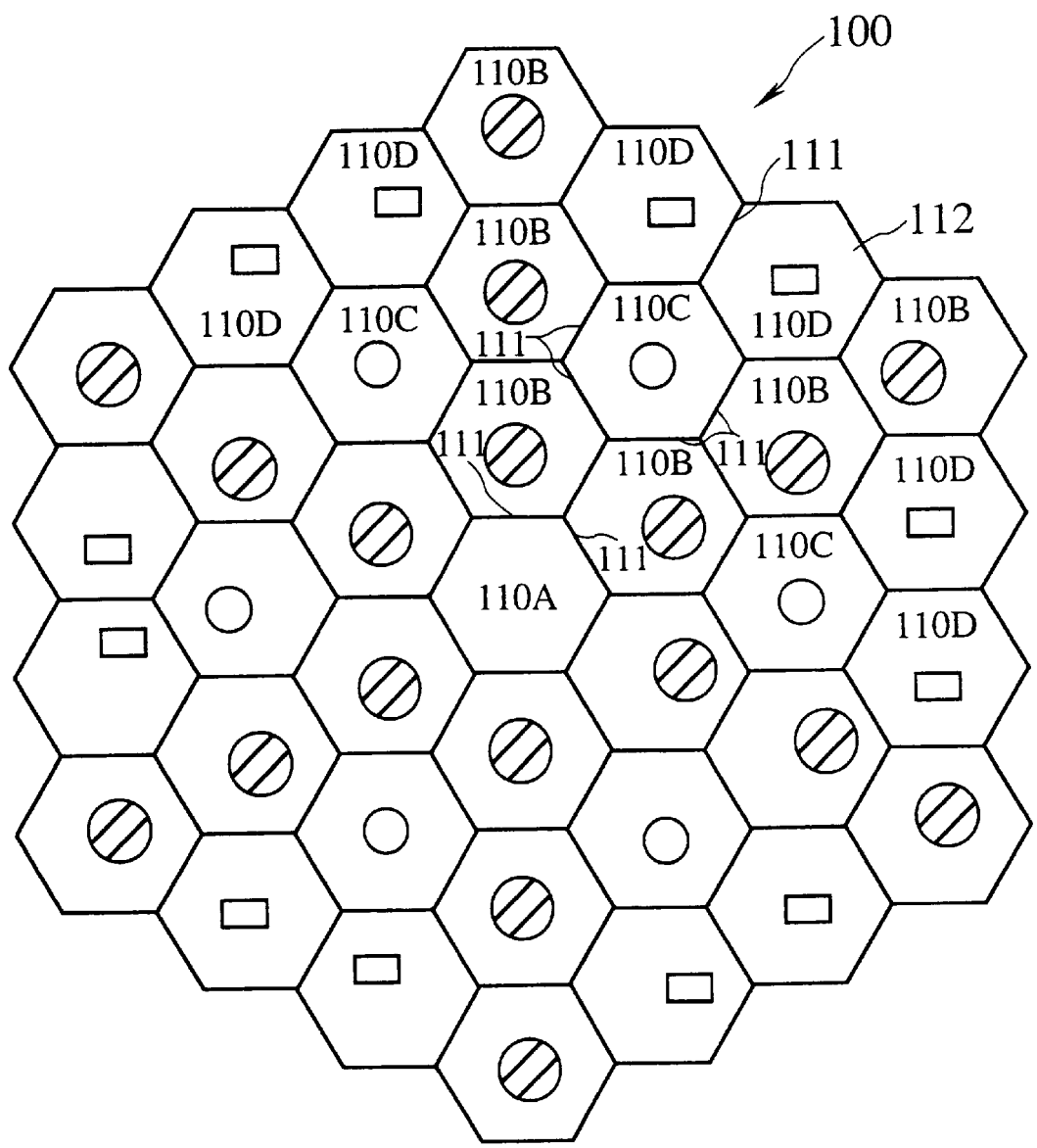
FIG. 61 shows a second embodiment of an approximate spherical structure according to the present invention.

In the following, the approximate spherically structure according to the second embodiment of the present invention will be described by referring to FIG. 61 wherein the same components as that of the first embodiment illustrated in FIGS. 59 and 60 are designated by the same reference numbers and the explanation therefor will be simplified. The present second embodiment differs from the first embodiment in that the radially located modules 110B are increased by the amount corresponding to two layers, and the other first and second modules 110C and 110D are provided in such that these other modules 110C and 110D are held between the respective radially located modules 110B. FIG. 61 is a planar view viewed from the side of the upper surface 112 in each of the modules 110 wherein the module 110 with no mark means the basic module 110A, the module with the circular mark plus oblique lines means the radially located module 110B, the module with the circular mark means the other first module 110C, and the module with the tetragonal mark means the other second module 110D, respectively.

As shown in FIG. 61, three each of the radially located modules 110B, 110B and 110B are linked to each side surface 111 of the basic module 110A towards the radial directions thereof. In other words, three layers of the radially located modules 110B are disposed around the basic module 110A. Further, the respective radially located modules 110B are formed symmetrically with respect to the line extending radially from the center of the basic module 110A through each center of the side surfaces 111 of the same basic module 110A. On the other hand, at the position sandwiched by the radially located modules 110B of the second layer, one of the other first modules 110C is disposed, while at the position sandwiched by the radially located modules 110B of the third layer, two of the other second modules 110D and 110D are disposed.

In the other first module 110C, as shown in FIGS. 60 and 61, four side surfaces 111, 111, 111 and 111 thereof have the same shapes as those of the respective side surfaces 111 of the radially located modules 110B and 110B positioned on the right and left sides of the other first module 110C, besides the respective vertexes of the upper surfaces 112 of the former module 110C are formed to position on the spherical surface. Thus, the other first modules 110C are symmetrical with respect to each of the lines extending radially from the center of the basic module 110A, so that all the former first modules 110C are formed in the same construction with each other.

Furthermore, as shown in FIGS. 60 and 61, two of the other second modules 110D and 110D are disposed adjacent to each other in the state where they are held between the radially located modules 110B and 110B, and each of the side surfaces 111 being in contact with each other positions on any of the lines extending radially from the center of the basic module 110A. As a consequence, these other second modules 110D are symmetrical with respect to the adjacent side surfaces 111 and 111, so that all the other second modules 110D are the same with each other, when they are considered to be the same with the inclusion of this symmetricalness.

In the approximate spherical module 100 constructed as described above, all the radially located modules 110B may be the ones having the same structure, so that even in the case where the radially located modules 110B are formed into two or more layers, only one pattern of the module 110 to be newly designed increases per one layer, and thus the elevation of the design and the manufacturing efficiencies of the module 110 can be intended.

In the above described embodiment, while the modular structure has been constructed in such that the module 110 as shown in FIG. 60 has been fabricated at first, and these modules 110 are linked to each other on the side surfaces 111, thereof, it may be formed so as to link the respective modules 110 one another with constituting the members positioned on the side surface 111, e.g. the longitudinal member 111a, the upper horizontal member 112a, and the lower horizontal member 113 so as to hold them common.

As the whole modular structure 110, it is formed to be possible to fold the respective side surfaces 111 into a single rod-shaped configuration, whereby the whole modular structure 110 may be composed to fold the same so as to bundle into a single rod-shaped configuration. In this case, when the respective modules 110 are folded, the approximate spherically module 100 can be folded into plural rod-shaped members in the bundled state. Moreover, the approximate spherically module 100 can also be deployed in a spherical-shaped configuration from the folded state thereof.

While it has been formed in such that the respective modules 110 approximate a spherical surface on the side of the upper surfaces 112 in the above described embodiment, it may be formed in such that the respective modules 110 approximate the spherical surface on the side of the lower surfaces 113, besides it may be formed in such that the respective modules 110 approximate spherical surfaces on both the sides of the upper surfaces 112 and the lower surfaces 113, respectively.

According to the approximate spherically modules of the present embodiment, each of the radially located modules extending from the basic module in six directions has the same construction one another, besides it is sufficient that there is the small number of types of different other modules in their constructions from those of the basic module and the radially located module, so that the improvement of the design and the manufacturing efficiencies of the modules can be intended.

In the following, a specific deployable modular antenna in which the concept of the above described approximate spherically modules is applied thereto will be described.

FIGS. 62 through 65 are schematic views each showing a plane/line stowage truss structure in the deployable modular antenna.

Figure 62:
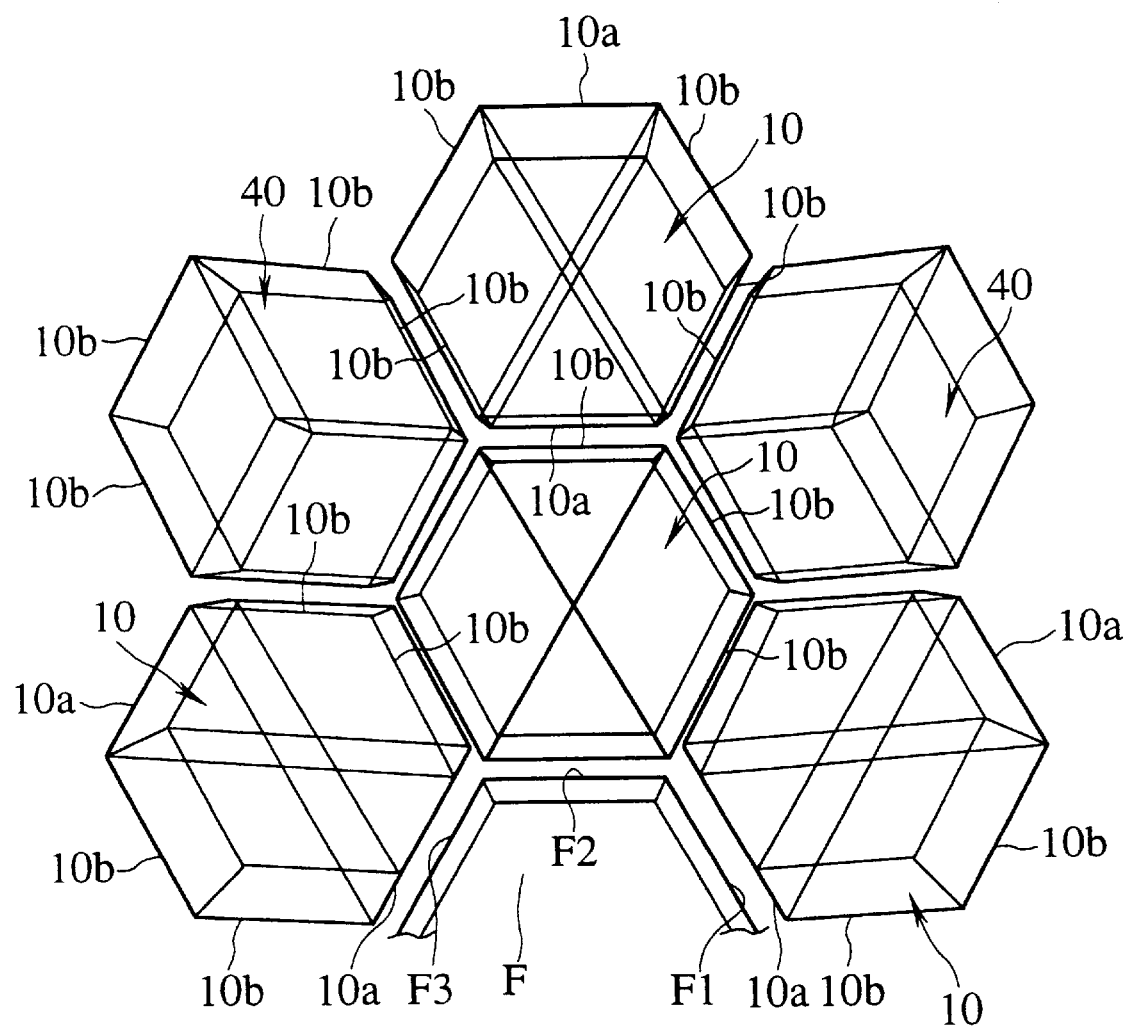
FIG. 62 is a plane drawing of an embodiment of a plane/line stowage truss structure according to the present invention.

In FIG. 62, reference character $\overline{F}$ denotes a basic module for sustaining a plane/line stowage truss structure wherein the basic module $\overline{F}$ is provided with three attachment surfaces F1, F2, and F3 for mounting the plane/line stowage truss structure to the basic module $\overline{F}$ in which these attachment surfaces F1, F2, and F3 are shaped so as to correspond to the respective side surfaces of a regular hexagonal truncated pyramid, and the adjacent attachment surfaces intersect with each other at the angle of 120 degrees.

The plane/line stowage truss structure is consisted of plane stowage-type deployable trusses 10 and line stowage-type trusses 40. Each of the plane stowage-type deployable trusses 10 is linked to the attachment surfaces F1, F2, and F3 through a fixed frame 10a, respectively. Further, the line stowage-type deployable truss 40 is linked to the plane stowage-type deployable trusses 10 wherein the plane stowage-type deployable trusses 10 and the line stowage-type deployable trusses 40 are disposed so as to fill in parts which cannot occupy with each other in the planar view.

Figure 63:
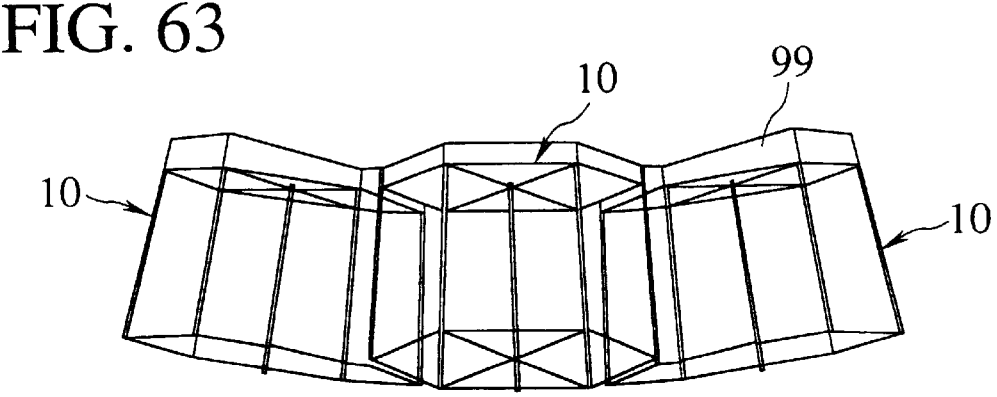
FIG. 63 is a front view drawing a plane/line stowage truss structure.

FIG. 63 is a front view showing such plane/line stowage truss as described above.

In the following, operations of a deployable framed structure constructed by the plane stowage-type deployable trusses 10 and the line stowage-type deployable trusses 40, as described above will be described.

Figure 64:
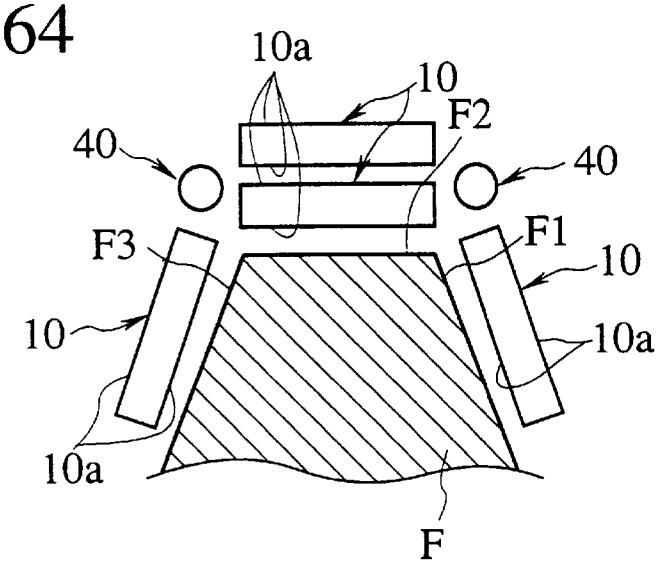
FIGS. 64 and 65 show a stowed state of a plane/line stowage truss structure.
Figure 65:
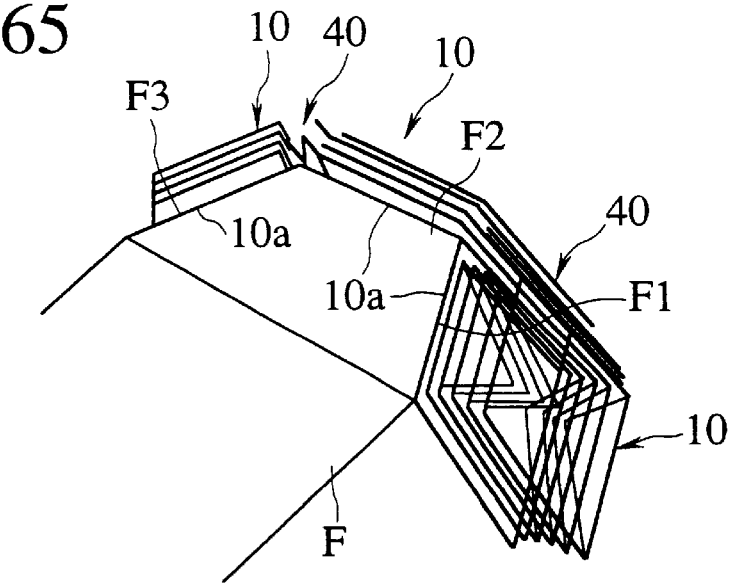

FIGS. 64 and 65 illustrate the state where the plane/line stowage truss structure is stowed around the basic module $\overline{F}$ being a satellite in this case. Namely, the respective plane stowage-type deployable trusses 10 are folded in such that the fixed frames 10a are allowed to be closely contact with each other, while the respective line stowage-type deployable trusses 40 are folded into rodshaped configuration so as to concentrate them at a single axis, whereby the trusses are in the state where they are stowed in a narrow space. At the time when the satellite reaches outer space, the plane stowage-type deployable trusses 10 and the line stowage-type deployable trusses 40 are deployed and it exhibits the state shown in FIGS. 62 and 63. In this case, since the respective plane stowage-type deployable trusses 10 and the line stowage-type deployable trusses 40 form configurations of a hexagonal truncated pyramid, surfaces obtained by linking hexagonal profiles to each other define a spherical surface. In FIG. 63, reference number 99 designates a metallic mesh reflecting radio wave, and a deployable modular antenna is constituted with inclusion of such metallic mesh.

According to the plane/line stowage truss structure constructed as described above, the plane stowage-type deployable trusses 10 can be connected to the basic module $\overline{F}$ through the parts of the fixed frames 10a with stable and sufficient strength. Thus, a plurality of the other plural plane stowage-type deployable trusses 10 and the other line stowage-type deployable trusses 40 can be disposed so as to be in continuous with the initial plane stowage-type deployable trusses 10, whereby a curved surface having a wide area can be constituted. Besides, since the line stowage-type deployable trusses 40 are disposed on such a space which cannot be covered with only the plane stowage-type deployable trusses 10, a minute curved surface can be constituted as a whole. Particularly, since each of the plane stowage-type deployable trusses 10 and the line stowage-type deployable trusses 40 has the upper and the lower surfaces each having a hexagonal shape, the respective plane stowage-type deployable trusses 10 and the respective line stowage-type deployable trusses 40 can be placed closely one another.

While an example wherein the respective plane stowage-type deployable trusses 10 and the respective line stowage-type deployable trusses 40 have been formed into a hexagonal truncated pyramid, they may be formed into a hexagonal pyramid. In this latter case, however, the combination of only a planar extension can be obtained, even if the resulting configurations of the hexagonal pyramid are combined with each other.

Moreover, the plane stowage-type deployable truss 10 as well as the line stowage-type deployable truss 40 may be formed into an even-numbered polygonal truncated pyramid or an even-numbered polygonal pyramid other than a hexagonal truncated pyramid or a hexagonal pyramid. In this case, it is required that an opposite set of frames are formed by fixed frames with respect to the plane stowage-type deployable truss.

Since the plane/line stowage truss structure of the present embodiment is consisted of the plane stowage-type deployable trusses which can be deployed in the direction wherein the fixed frames opposite to each other go away from one another, the plane stowage-type deployable trusses can positively be fixed, for example, to the circumferential surface of the basic module through the fixed frames, respectively. In other words, since the plane stowage-type deployable trusses can be attached to the basic module with each of the fixed frames which is formed into not a single rod-shaped configuration, but a frame-shaped configuration, the plane stowage-type deployable trusses can be attached to the basic module with a stable and sufficient strength. Hence, when the other plane stowage-type deployable trusses are linked to the plane stowage-type deployable truss which has been attached to the basic module, a structure having wide extension can easily be constructed. There is, however, a case where a gap defined between the adjacent plane stowage-type deployable trusses increases with leaving the basic module. In other words, since a part which cannot be occupied in the plane by only the plane stowage-type trusses appears, when the line stowage-type deployable trusses are disposed in such parts as described above, surfaces each having planar extension can be uniformly constituted.

In a structure composed with the plane stowage-type deployable trusses and the line stowage-type deployable trusses into a polygonal prism configuration, when these structures are combined with each other, a surface having single planar extension can be constituted, while in a structure composed with these trusses into a polygonal truncated pyramid configuration, when these structures are combined with each other, a surface having single curved surface extension can be constituted.

Furthermore, in either of a structure composed with the plane stowage-type deployable trusses and the line stowage-type deployable trusses into a hexagonal prism configuration, or a structure composed with these trusses into a hexagonal truncated pyramid configuration, these structures can be combined compactly in the plane with each other, so that either a surface having the most minute planar extension or a surface having the most minute curved surface extension can be obtained.

In the structures described above, the plane stowage-type deployable trusses and the line stowage-type deployable trusses in all the above-mentioned modes can be employed.

In the following, a deployable modular antenna in which not the basic module, but a truss of a fixed structure is employed will be described on the basis of FIGS. 66A and 66B.

Figure 66A:
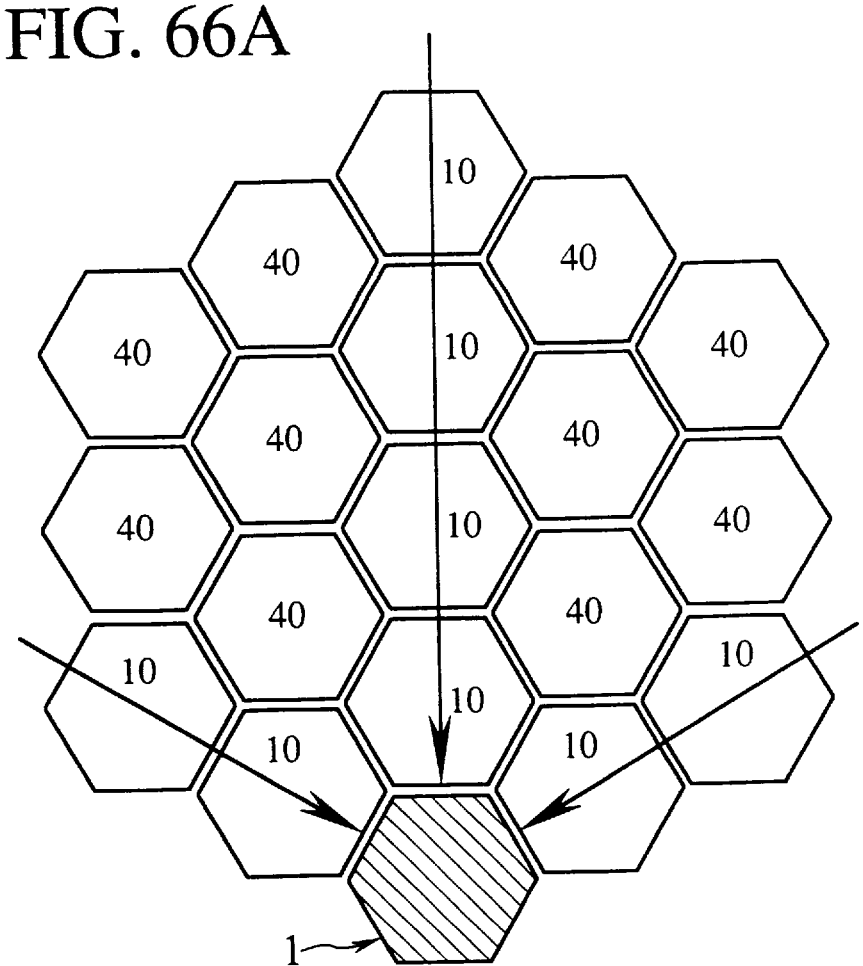
FIGS. 66A and 66B are plane drawings a modular deployable antenna according to the present invention adopting a truss of a fixed structure.
Figure 66B:
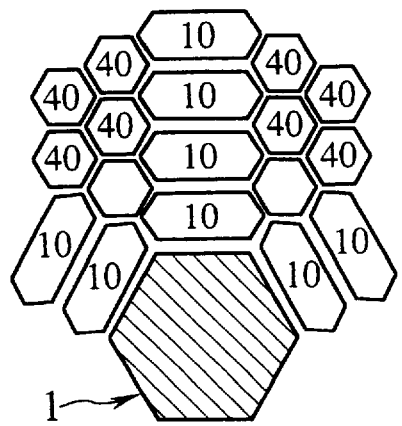

As shown in FIGS. 66A and 66B, the plane/line stowage truss structure in the present deployable modular antenna is consisted of three types of antenna reflector components wherein one of the components contains the truss of a fixed structure, another component contains plane stowage-type deployable trusses, and the rest contains line stowage-type deployable trusses. In FIG. 66A, truss portions among antenna reflectors are principally illustrated.

Around the fixed reflector 1 provided with the fixed truss are disposed the plane stowage-type deployable trusses 10 and the line stowage-type deployable trusses 40, respectively. FIG. 66A shows the state where the plane/line stowage truss structure has been deployed, while FIG. 66B shows the state where the plane/line stowage truss structure has been stowed wherein the plane stowage-type deployable trusses 10 being contiguous to the fixed reflector 1 are stowed in the plane, and the line stowage-type deployable trusses 40 are stowed linearly in the gaps defined between these plane stowage-type deployable trusses 10 which have been stowed.

The fixed reflector 1 is not required to have a structure which is foldable, so that a truss of a fixed structure is used therein. The fixed structure truss is fabricated firmly which can sustain the whole antenna reflector. A metallic mesh is fixedly stretched on the fixed structure truss to compose an antenna reflector part.

Meanwhile, in the deployable modular antenna having the above described construction, the fixed reflector 1 maintains always a reflector state of a constant curvature irrespective of the deployed state or the stowed state of the plane stowage-type deployable trusses 10 and the line stowage-type deployable trusses 40. Accordingly, even if the deployment operation is imperfect, the space of the minimum fixed part is maintained as the antenna reflector.

Moreover, since the curved surface of the whole structure obtained by integrating the fixed reflector 1, the plane stowage-type deployable trusses 10, and the line stowage-type deployable trusses 40 forms the same parabolic surface, even if radio waves having different frequencies are irradiated on the part of the fixed reflector 1 and the other reflector parts, the radio waves are reflected in the same direction. Accordingly, when the fixed part of the fixed reflector 1 is made to be possible to respond a higher frequency than that of the other parts by improving the accuracy due to such an arrangement that, for example, the fixed part of the fixed reflector 1 is consisted of a solid reflector, such reflector part can also be allocated to the radio wave for line control.

According to the present deployable modular antenna, since deployment and stowage are not required for the fixed part being a part of the supporting structure for sustaining a large antenna reflector derived from plural linking of deployable trusses, it is possible to construct an antenna reflector having structurally more precise form than that of the deployable antenna reflector part, so that it becomes possible to additionally use a radio wave having a higher frequency.

Furthermore, since only a part of the antenna reflector maintains always the form as a reflector in the deployment process of the whole antenna reflector, even in the worst case where the deployment has been imperfectly completed, the improvement of reliability is expected in the point to the effect that the function as the antenna reflector does not become completely lost.

Moreover, according to the deployable modular antenna, there are two types of deployable trusses used, i.e. the plane stowage-type trusses and the line stowage-type trusses, no gap is produced between trusses one another in the stowage state, so that compact stowage can be realized.

Finally, a module coupling mechanism for coupling mutually the above-mentioned respective deployable trusses, and a holding and releasing mechanism for effecting smoothly the operations from the stowage to the deployment in the deployable trusses will be described.

First, the module coupling mechanism will be explained.

FIGS. 67 through 71 are schematic views each showing the module coupling mechanism according to the first embodiment of the present invention.

The module coupling mechanism 120 is the one for coupling mutually basic modules $\overline{M}$ to compose a structure consisted of plural modules $\overline{M}$ as shown in FIGS. 67 through 71. These module coupling mechanisms 120 are disposed at the opposite positions in the modules $\overline{M}$ and $\overline{M}$, respectively. The module coupling mechanism 120 is consisted of a coupled member 130 the extreme end of which is a free end 130a, and a coupling member 140 which encloses opposingly united coupled members 130 and 130 from the side of the free ends 130a, 130a of the united coupled members. The module coupling mechanism 120 is characterized by that a coupling hole 130b is defined on the coupled member 130 at the position corresponding to that of the coupling member 140, while the coupling member 140 is provided with a lock member 141 having a coupling projection 142 to be fitted in the coupling hole 130b, and at the same time the coupling member 140 is provided with a stopper member 143 for stopping the mutual movement of the coupled member 130 and the coupling member 140 by abutting upon the free end 130a of the coupled member 130 under the state where the coupling projection 142 has been fitted in the coupling hole 130b.

The above described module $\overline{M}$ is the basic structural element in the case where, for example, a supporting structure for an antenna is constructed, and which is consisted of truss modules and the like.

Figure 67:
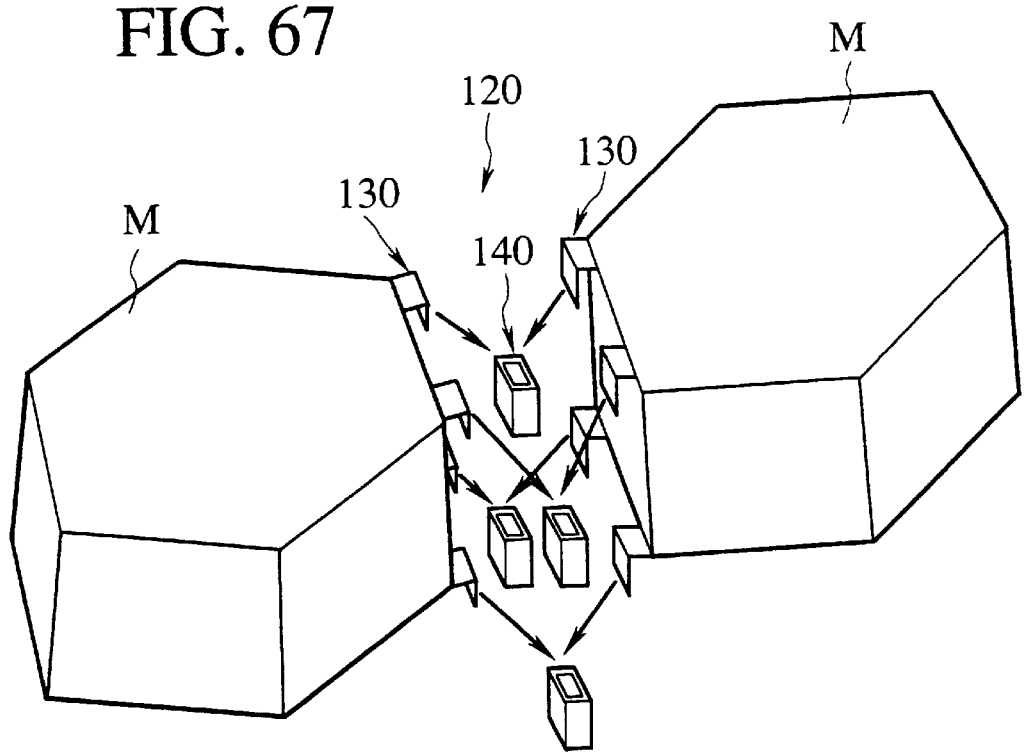
FIG. 67 is a perspective drawing showing a first embodiment of a module linkage mechanism according to the present invention.
Figure 68:
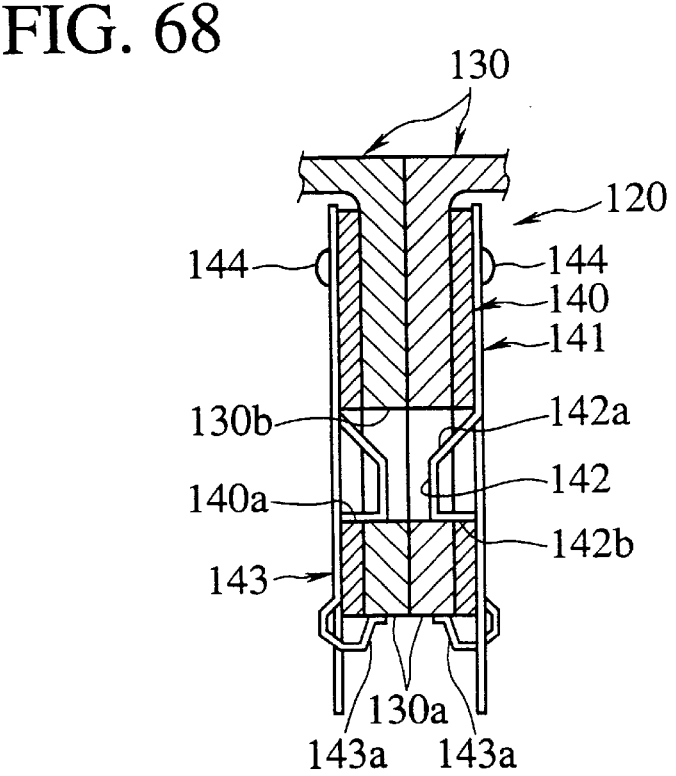
FIG. 68 is an explanatory drawing of a coupled member of a module linkage mechanism according to a first embodiment.
Figure 69:
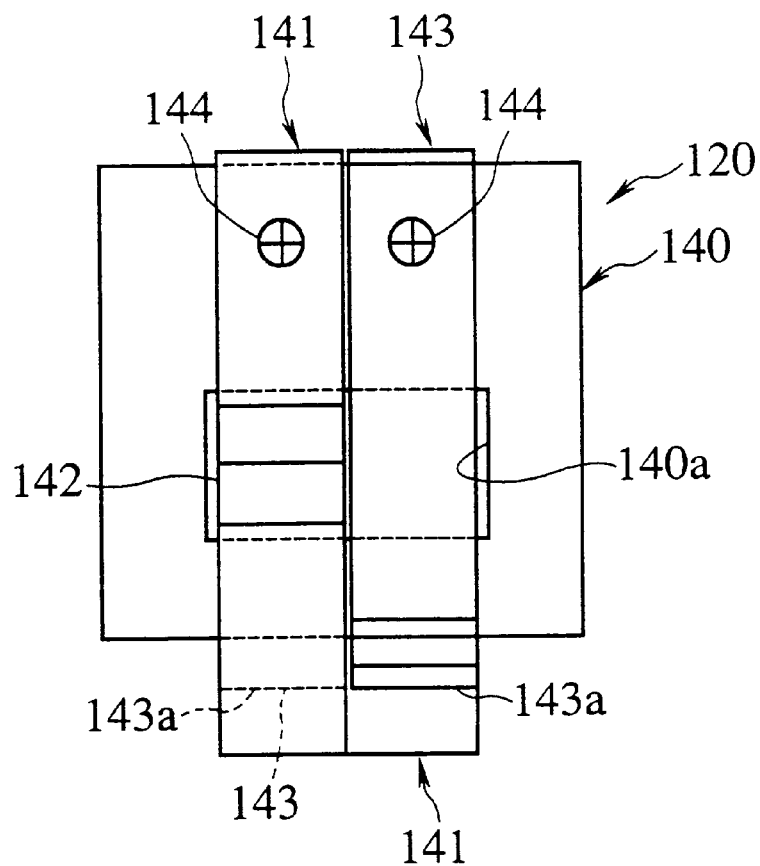
FIGS. 69 and 70 are explanatory drawings of a coupling member of a module linkage mechanism according to a first embodiment.

The coupled member 130 is a member obtained by forming a plate-like member into an L-shaped member as shown in FIGS. 67 and 68, and the proximal end of which is to be secured to the module $\overline{M}$, while the distal end of which is the free end 130a. These coupled members 130 are disposed at the corresponding positions on the respective modules $\overline{M}$ and $\overline{M}$ opposed to one another so as to face with each other. Consequently, the parts on the sides of the free ends 130a and 130a of the respective coupled members 130 and 130 are in coincident with each other so as to overlap themselves. Further, the coupling hole 130b is defined on the coupled member 130 so as to pass through the same with a tetragonal contour as shown in FIGS. 68 and 69.

The coupling member 140 is formed into a tetragonal frame-shaped as shown in FIGS. 67 through 70, and which encloses opposingly united coupled members 130 and 130 from the side of the free ends 130a, 130a of the united coupled members to thereby coupling these coupled members 130 and 130. A through hole 140a having the same shape as that of the coupling hole 130b is defined on the coupling member 140 at the position corresponding to that of the coupling hole 130b of the coupled member 130.

Figure 70:
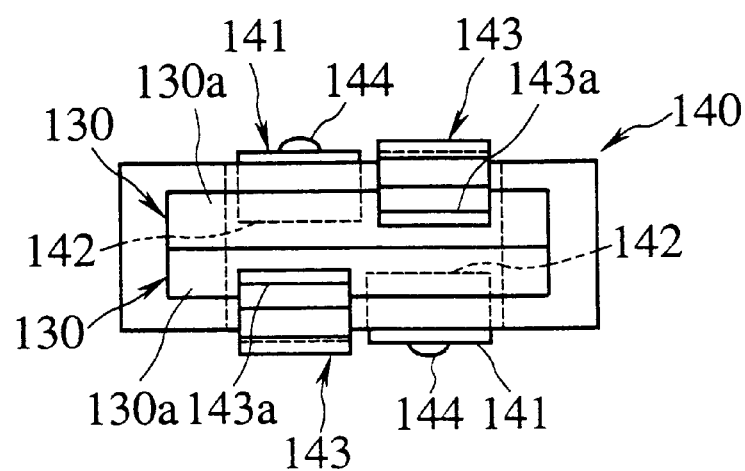

On the side on which the through hole 140a of the coupling member 140 has been defined, the lock member 141 and the stopper member 143 are mounted, respectively. These lock member 141 and the stopper member 143 are fabricated from a rectangular plate-like material, as shown in FIGS. 68 through 70, wherein the proximal ends thereof are secured to the coupling member 140 with screws 144 and 144 in such that the lock member 141 is parallel to the stopper member 143. In the state where the lock member 141 and the stopper member 143 are placed opposingly with putting the coupling member 140 between them, and the stopper member 143 is disposed alternately with respect to the lock member 141 so as to be opposed to the lock member. In addition, these lock member 141 and the stopper member 143 are arranged to elastically fold at the proximal ends thereof, as the fulcrum, which have been secured with the screws 144 and 144.

To one of the lock members 141 and 141 is formed the coupling projection 142 which extends from a through hole 140b to the coupling hole 130b on one of the coupled members 130 and 130 and which fits in the coupling hole 130b, while to the other of the lock members 141 and 141 is formed the coupling projection 142 which extends from the through hole 140b to the coupling hole 130b on the other of the coupled members 130 and 130 and which fits in the coupling hole 130b. The coupling projection 142 is formed from the plate-like lock member 141 by means of a press, one side of the coupling projection 142 is formed into an introducing surface 142a, while the other side thereof is formed into a locking surface 142b as shown in FIG. 68. More specifically, the introducing surface 142a is obliquely formed in such that the coupled member 130 is easily introduced into the coupling member 140, while the locking surface 142b is in contact with the coupling hole 130b in parallel to each other so as to prevent from the disengagement of the coupling projection 142 with the coupling hole 130b.

The stopper 143a which abuts upon the free end 130a of the coupled member 130 is formed on the extreme end of each of the opposed stopper members 143 and 143. The stopper 143 abuts upon the free end 130a of the coupled member 130 so as to maintain the state where the locking surface 142b of the coupling projection 142 abuts upon the coupling hole 130b of the coupled member 130.

Figure 71A:
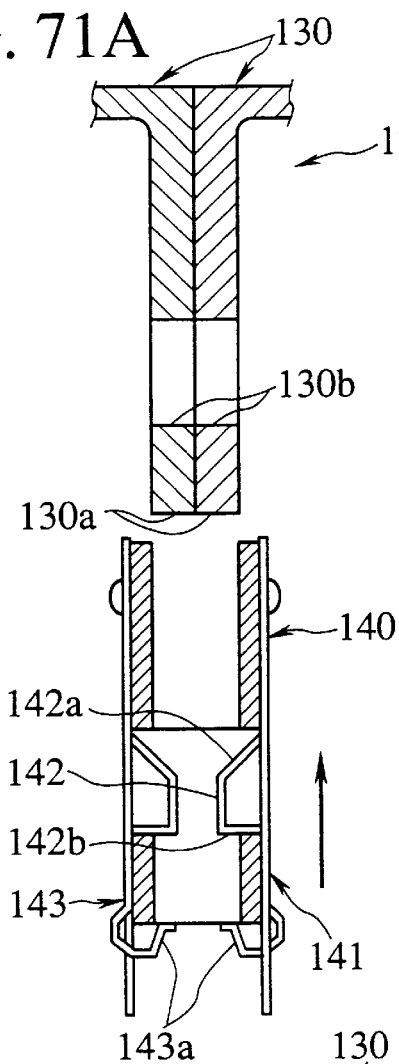
FIGS. 71A to 71D show coupling process of a module linkage mechanism according to a first embodiment.
Figure 71B:
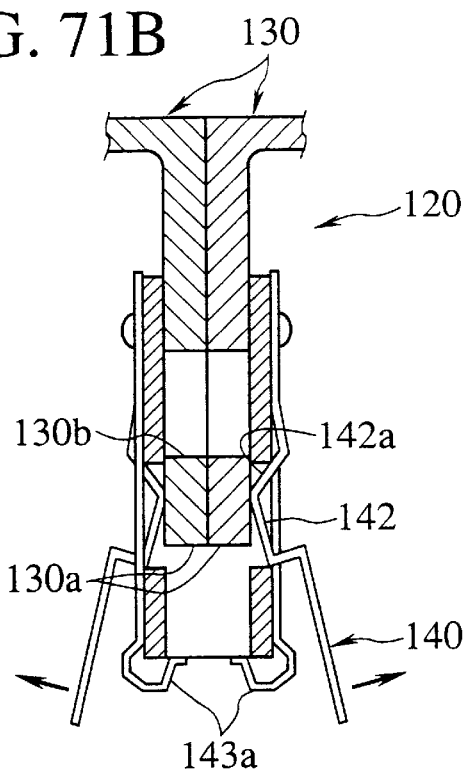
Figure 71C:
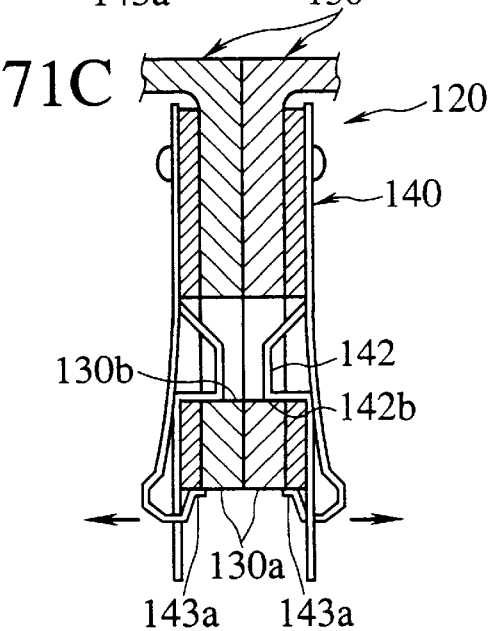
Figure 71D:
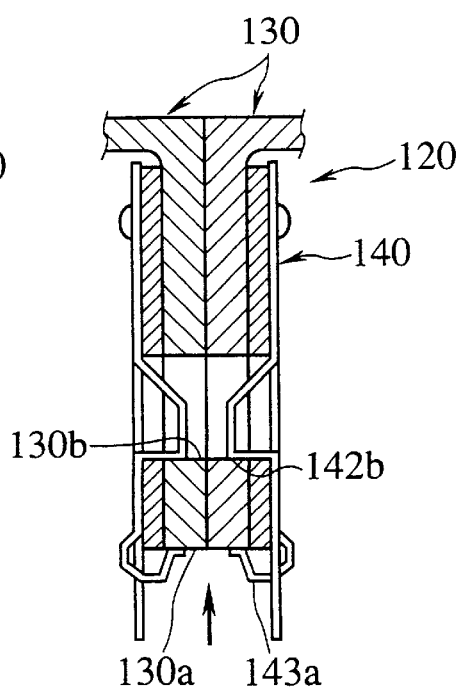

In the module coupling mechanism 120 constructed as described above, when the respective modules $\overline{M}$ and $\overline{M}$ to be coupled are disposed opposingly, the parts on the sides of the free ends 130a of the coupled members 130 in the respective modules $\overline{M}$ and $\overline{M}$ become a state where they are in consistent with each other so as to overlap one another. In these circumstances, the opposed coupled members 130 and 130 are inserted into the coupling member 140 from the side of the free ends 130a and 130a of the coupled members 130 and 130 as shown in FIG. 71A, then the coupling projections 142 and 142 are pushed out from the inside of the coupling member 140 by means of the parts of the free ends 130a and 130a of the coupled members 130 and 130 as shown in FIG. 71B, and these parts on the sides of the free ends 130a and 130a move relatively towards the stoppers 143a and 143a. Thereafter, when the coupling projections 142 and 142 reach the positions of the coupling holes 130b and 130b, the lock members 141 and 141 return resiliently, so that the coupling projections 142 and 142 fit in the coupling holes 130b and 130b, respectively, as shown in FIG. 71C. When the movement of the coupled members 130 and 130 is continued further from the present state, the free ends 130a and 130a abut upon the stoppers 143a and 143a, so that the coupled members 130 and 130 are pushed back to the position where each of the coupling holes 130b and 130b is in contact with each of the locking surfaces 142b and 142b of the coupling projections 142 and 142, i.e. all the components are in the state shown in FIG. 71D. In this state, each of the free ends 130a and 130a as well as each of the coupling holes 130b and 130b are forcibly held by each of the locking surfaces 142b as well as each of the stoppers 143a and 143a to secure the coupled members 130 and 130.

In the case of separating the respective modules $\overline{M}$ and $\overline{M}$ from each other, the coupling member 140 is allowed to bend, whereby the coupling member 140 is withdrawn from the respective coupled members 130 and 130 while disengaging the coupling projections 142 and 142 with the coupling holes 130b and 130b.

Thus, according to the module coupling mechanism 120 constituted as described above, when the coupled members 130 mounted on the respective modules $\overline{M}$ and $\overline{M}$ are only fitted in the respective coupling members 140, these modules $\overline{M}$ and $\overline{M}$ can be linked with each other, while the coupled members 130 are only disengaged with the coupling members 140, these modules $\overline{M}$ and $\overline{M}$ can be separated from one another. Accordingly, even if a module $\overline{M}$ has a complicated structure, such modules $\overline{M}$ and $\overline{M}$ can be easily linked to and separated from each other. Besides, in the linked state, the coupling members 140 can positively be secured to the coupled members 130 by means of the lock members 141 and the stopper members 143, respectively, so that the linked state of the respective modules $\overline{M}$ and $\overline{M}$ can be extremely safely maintained.

Figure 72:
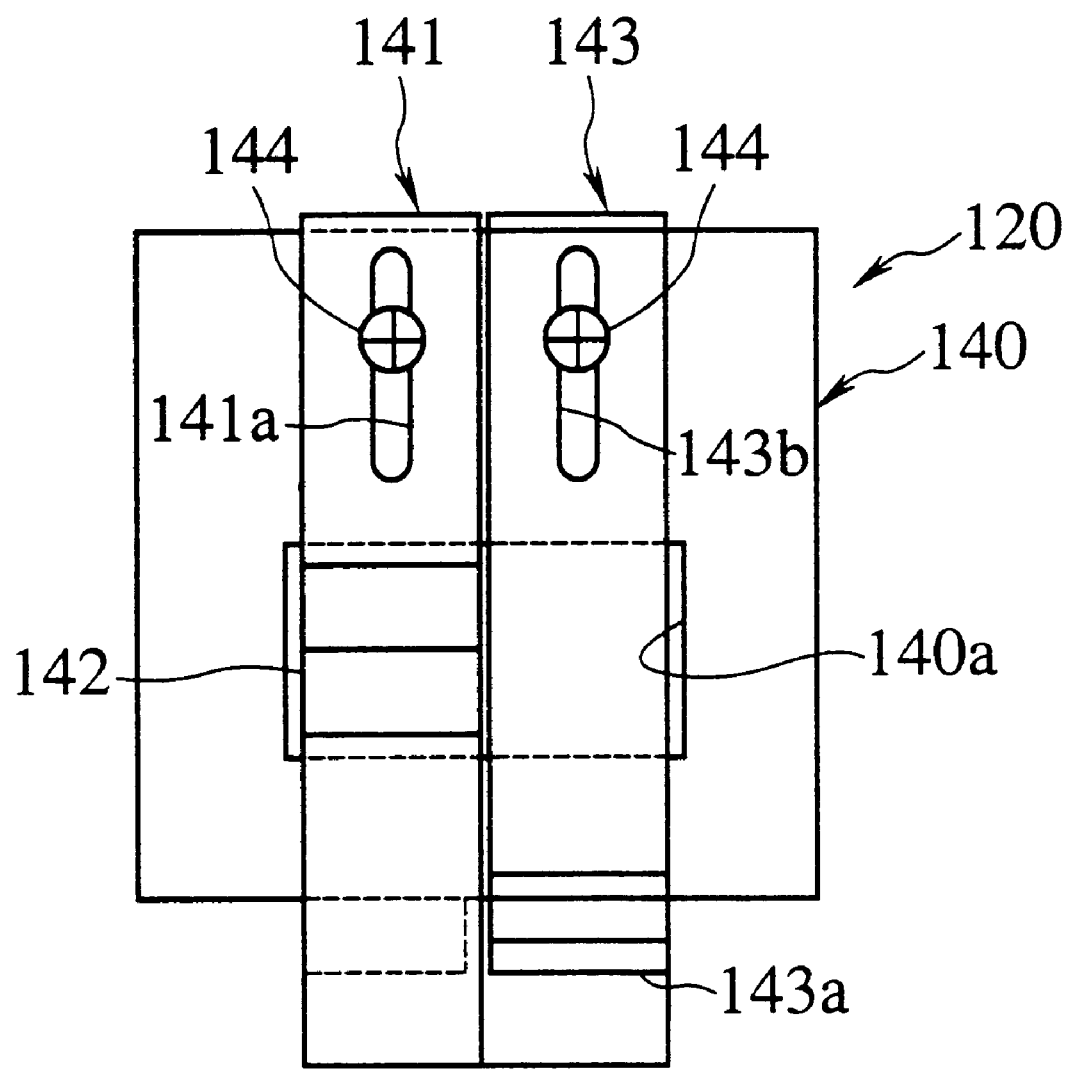
FIG. 72 is a front view drawing of a second embodiment of a module linkage mechanism according to the present invention.

In the following, the second embodiment of the present invention will be described by referring to FIG. 72 wherein the same components as that of the first embodiment illustrated in FIGS. 67 through 71 are designated by the same reference numbers and the explanation therefor will be simplified. The present second embodiment differs from the first embodiment in that the positions of a lock member 141 and a stopper member 143 are adjustable.

More specifically, the lock member 141 is secured to a coupling member 140 by means of a screw 144 through a long hole 141a. The long hole 141a is defined extensively on the lock member 141 in the direction along which a coupled member 130 moves relatively with respect to the coupling member 140. Furthermore, the stopper member 143 contains also a long hole 143b which extends similarly to the above described long hole 141a, and the stopper member 143 is secured to the coupling member 140 through the long hole 143b by means of a screw 144.

In the module coupling mechanism 120 constituted as described above, when the positions of the lock member 141 and the stopper member 143 are adjusted, the positions of the locking surfaces 142b, 142b and the stoppers 143a and 143a can be changed at the right and left sides shown in, for example, FIG. 68. Consequently, there is such an advantage that the relative positions of the respective modules $\overline{M}$ and $\overline{M}$ can be adjusted according to this module coupling mechanism 120.

While the above described embodiment has been constituted in such that the coupling member 140 encloses upwardly the coupled members 130 and 130 from the bottoms thereof, it may be constituted in such that the coupling member 140 can enclose downwardly, sidewards the coupled members 130 and 130 by orienting the parts on the sides of the free ends 130a and 130a of the coupled members 130 and 130 towards the upper, the side and the like directions.

According to the module coupling mechanism of the present embodiment, when the respective coupled members used in the respective modules to be linked are united and the coupled members thus united are only enclosed by the coupling member, the respective modules can be linked to each other. On the other hand, when the coupling member is merely withdrawn from the coupled members, the respective modules can be separated. Accordingly, even if each module has a complicated structure, the coupling and the separation of the respective modules can be very easily carried out. Besides, in the state where the coupling projection has been fitted in the coupling hole, the stopper member has abutted upon the free end of the coupled member, so that the disengagement of the coupling projection with the coupling hole can positively be prevented. In other words, the coupling states of the respective modules can be positively maintained.

Moreover, in the mechanism wherein the positions of the lock member and the stopper member are adjustable with respect to the coupling member, the positions of the coupling projection and the stopper member can be changed with respect to the coupling hole. As a consequence, the relative positions of the respective coupled members in the coupling state can be changed, whereby the relative positions of the respective modules can be adjusted.

Embodiments of a holding/releasing mechanism will be described hereinbelow by referring to FIGS. 73 through 80. These embodiments relate to the holding/releasing mechanism for setting up deployable structures each having a prescribed configuration on a satellite by holding or releasing the deployable structures for supporting an antenna on or from the satellite.

Figure 73:
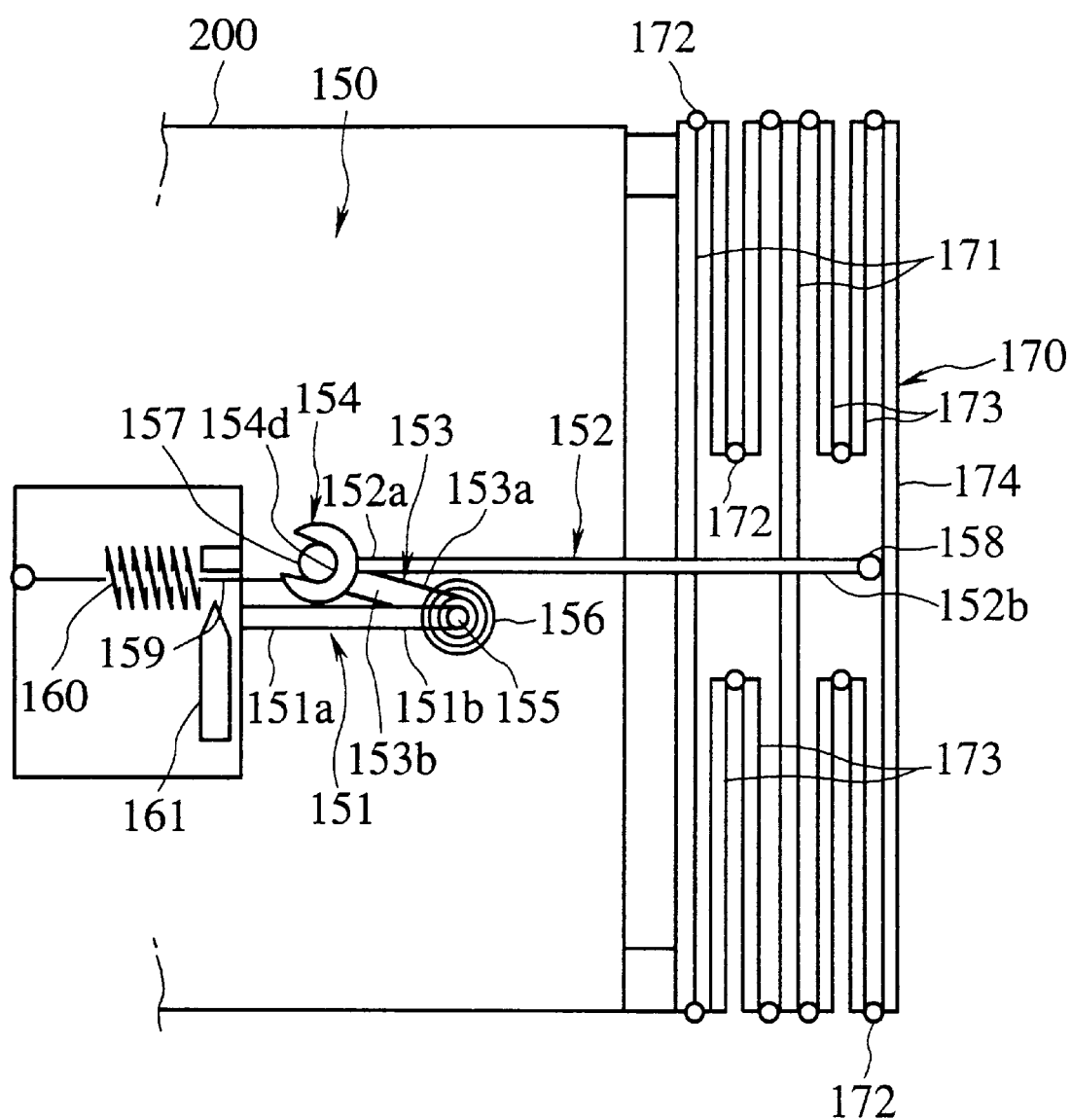
FIG. 73 is a plane drawing of a first embodiment of a holding/releasing mechanism according to the present invention.

First, the holding/releasing mechanism according to the first embodiment of the present invention will be described in conjunction with FIGS. 73 through 75. In FIG. 73, a holding/releasing mechanism 150 holds fixedly a deployable structure (movable body) 170 on a main structure 200, or release a holding power from the deployable structure 170. The holding/releasing mechanism 150 is provided with a support arm 151 the proximal end 151a of which is linked to the main structure 200, a push rod 152 positioned on the side of the distal end of the support arm 151 and the distal end 152b of which is linked to the deployable structure 170, and an intermediate link 153 the proximal end 153a of which is rotatably connected to the distal end 152b of the support arm 151 and at the same time, the distal end 153b of which is rotatably connected to the proximal end 152a of the push rod 152. To the distal end 153b of the intermediate link 153 is mounted a connecting and cutting means 154 which performs operations for connecting with or cutting from the push rod 152. The connecting and cutting means 154 draws positively the push rod 152 to the side of the main structure 200, so that the deployable structure 170 is fixedly held on the main structure 200 In the case when the distal end 153b of the intermediate link 153 is rotated towards the side of the proximal end 151a of the support arm 151, while the connecting and cutting means 154 releases the connection with the push rod 152 in the case when the distal end 153b of the intermediate link 153 is rotated towards the side of the extension line of the distal end 151b of the support arm 151.

The deployable structure 170 is the one having a framed structure which deploys into a configuration of a tetragonal prism, and the deployable structure 170 is provided with horizontal members 171 disposed in a tetragonal shape, and longitudinal members 173 which are connected to four corners of the tetragon through rotating hinges 172. Furthermore, at the central portion of the extreme end of the deployable structure 170 is disposed a holding horizontal member 174, and to which is rotatably connected the push rod 152. The deployable structure 170 is arranged in such that when the horizontal members 171. the longitudinal members 173, and the holding horizontal member 174 are folded into a layer-shaped configuration, they are stowed in the main structure 200. Moreover, the deployable structure 170 has a power deploys automatically, so that when a holding power derived from the outside is released, the structure deploys automatically, whereby the respective longitudinal members 173 extend straight.

The proximal end 151a of the support arm 151 is fixedly connected to the main structure 200, while to the distal end of which is rotatably connected the intermediate link 153 through the rotating hinge 155. To the rotating hinge 155 is mounted a rotation driving means 156 for rotationally driving the intermediate link 153. The rotation driving means 156 is consisted of a spiral screw, and which produces the driving force for rotating the distal end 153b of the intermediate link 153 from the side of the proximal end 151a of the support arm 151 to the side of the extension line of the distal end 151b of the supporting arm 151.

Moreover, to the distal end 153b of the intermediate link 153 is mounted the connecting and cutting means 154. The connecting and cutting means 154 is formed into U-shaped configuration, and which has a U-shaped concave 154a opened on the side of the extension line of the distal end 153b of the intermediate link 153.

The push rod 152 has a boss portion 157 which fits in the above described concave 154a. The boss portion 157 is formed in a circular profile in the section, and which rotates smoothly in the concave 154a, while the boss portion 157 is arranged so as to smoothly escape from the opening of the concave 154a. The distal end 152b of the push rod 152 is rotatably linked to the holding horizontal member 174 through the rotating hinge 158.

Furthermore, to the distal end 153b of the intermediate link 153, i.e. the connecting and cutting means 154 are disposed a wire 159 and a spring 160 for holding the intermediate link 153 at the position where the intermediate link 153 has been rotated towards the side of the proximal end 151a of the support arm 151 at the maximum. The wire 159 and the spring 160 are linked in a straight line state wherein the wire 159 is linked to the connecting and cutting means 154, while the spring 160 is secured to the main structure 200. It is arranged in such that the spring 160 acts on the wire 159 with a certain tension in such a manner that the connecting and cutting means 154 abuts upon the proximal end 151a of the support arm 151 with a prescribed amount of force.

To the part in which the tension of the wire 159 appears is placed a cutter 161 for cutting the wire 159, and the cutter 161 is adapted to positively cut the wire 159 due to the actuation by explosion of an explosive.

In the holding/releasing mechanism 150 constructed as described above, when the intermediate link 153 is rotated on the side of the proximal end 151a of the support arm 151, the push rod 152 can positively be drawn. The horizontal members 171, the longitudinal members 173 and the holding horizontal member 174 in the deployable structure 170 are positively be folded in a layer-shaped configuration in the state where the connecting and cutting means 154 abuts upon the proximal end 151a of the support arm 151. Besides, the position of the folded deployable structure 170 with respect to the main structure 200 is positively fixed by means of a link mechanism consisted of the support arm 151, the push rod 152, and the intermediate link 153, and which is in a state where the folded deployable structure is forced to the side of the main structure 200 with a prescribed amount. Accordingly there is no vibration and slippage of the deployable structure 170 with respect to the main structure 200, so that the damage of the deployable structure 170 and the like due to such vibration and slippage can be positively prevented.

Figure 74:
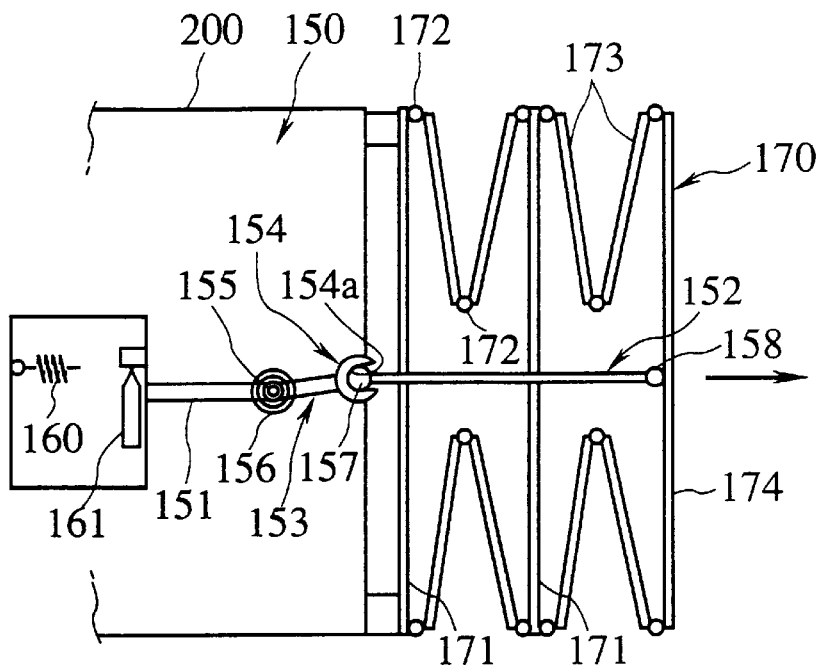
FIGS. 74 and 75 show deploying process of a holding/releasing mechanism according to a first embodiment.
Figure 75:
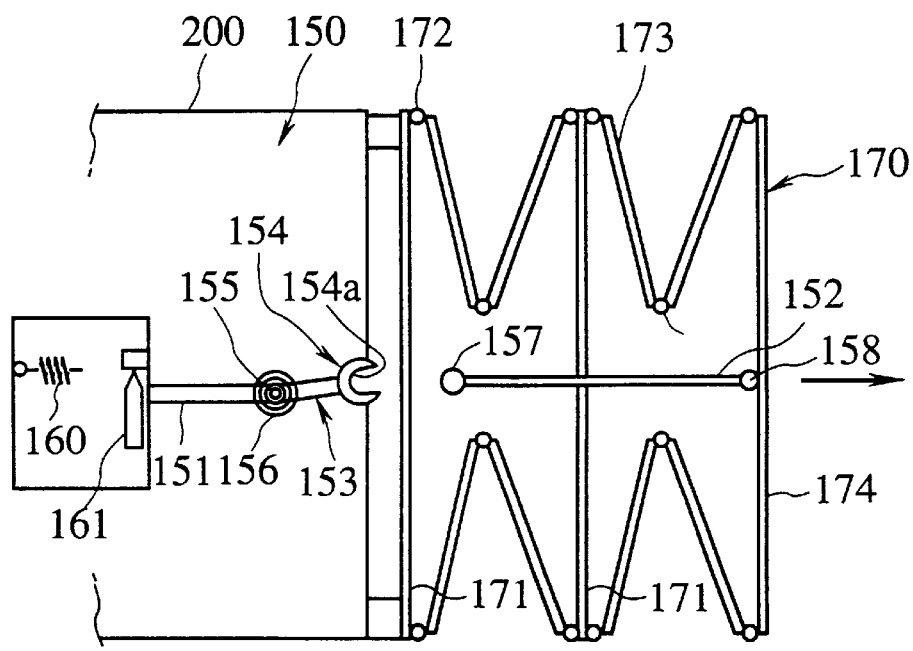
Figure 76:
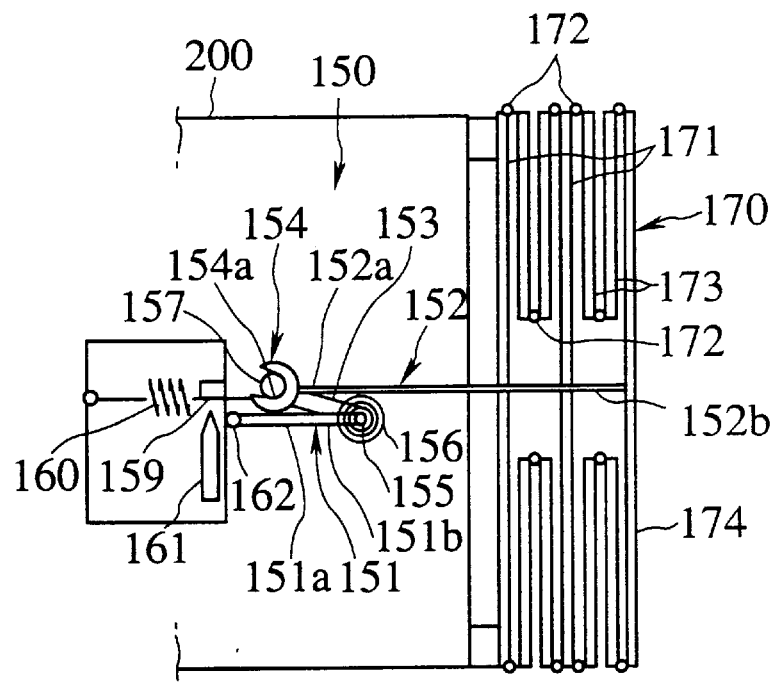
FIG. 76 is a plane drawing of a second embodiment of a holding/releasing mechanism according to the present invention.
Figure 77:
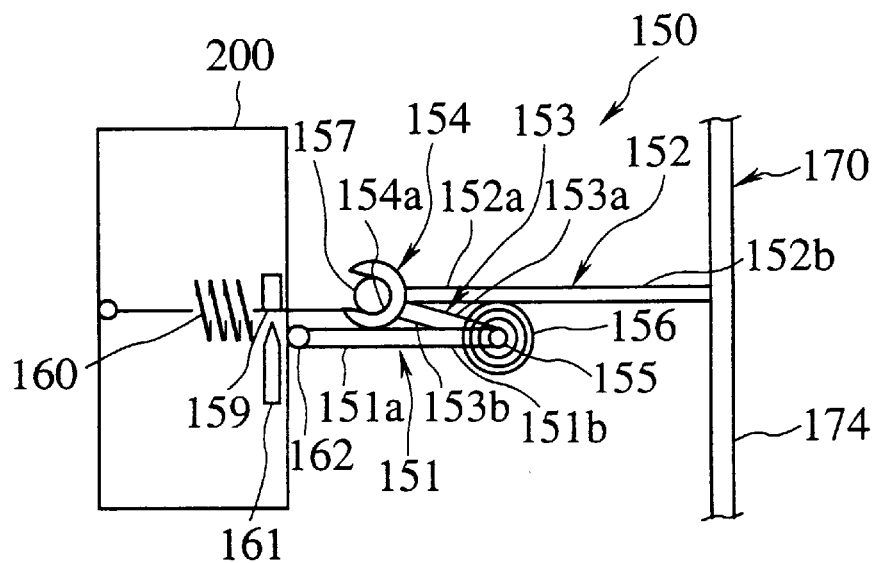
FIGS. 77 to 79 show deploying process of a holding/releasing mechanism according to a second embodiment.
Figure 78:
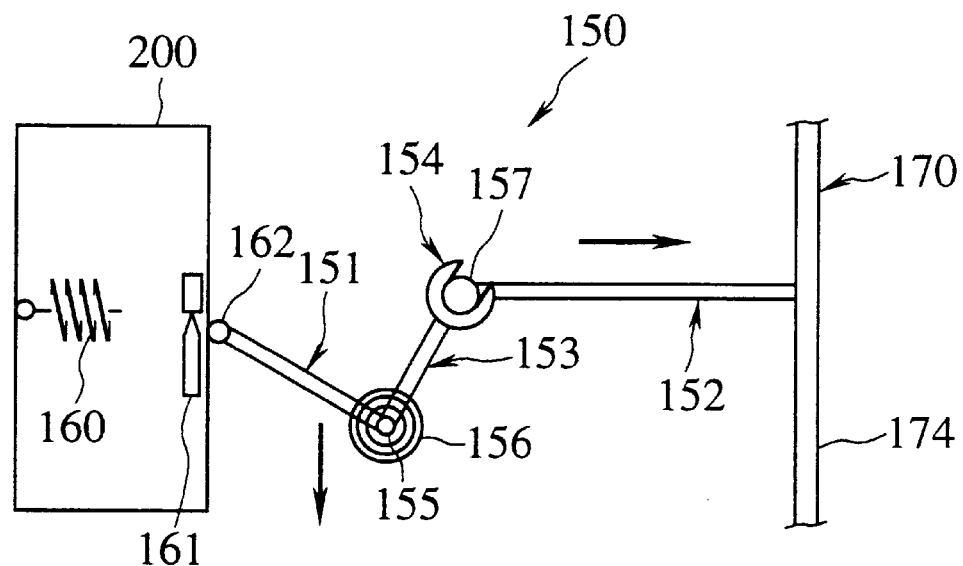
Figure 79:
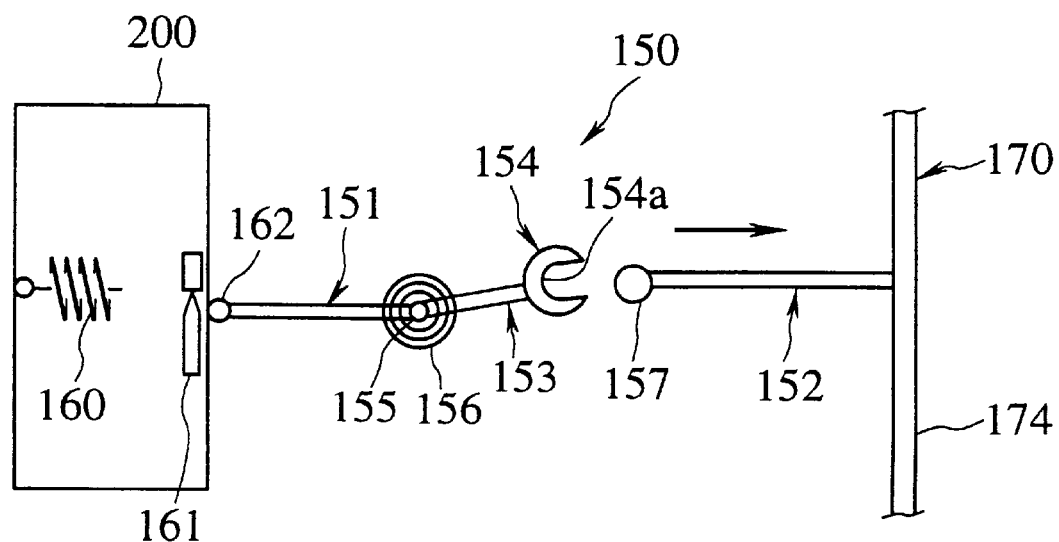

Then, when the wire 159 is cut by means of the cutter 161 as shown in FIGS. 74 and 75, the intermediate link 153 is started to rotate by means of the rotation driving means 156. Due to the rotation, the distal end 153b of the intermediate link 153 moves to the side of the deployable structure 170 so as to draw a circular arc, so that the push rod 152 moves towards the direction along which the deployable structure 170 deploys. Thus, the deployable structure 170 starts to deploy by means of the own deployable force in addition to the aid of the push rod 152. As a consequence, even if the case where the deployable structure 170 is in the folded state of a layer shaped configuration, so that the parts of the respective rotating hinges 172 are in a state of geometrical singularity, or a state of increasing coefficient of static friction, the deployable structure 170 can positively be deployed in its original shape.

Besides, since the distal end 153b of the intermediate link 153 moves so as to draw a circle centering around the proximal end 153a thereof, the velocity component of the distal end 153b towards the direction of the push rod 152 becomes the smallest at the positions of the proximal end 151a of the support arm 151 and the extension line of the distal end 151b thereof. For this reason, even if the intermediate link 153 was rotating at a constant speed from the beginning, the velocity at which the deployable structure 170 goes away from the main structure 200 is such that it becomes gradually faster from the state of substantially zero.

Thus, there is not such a case where a shock is applied to the deployable structure 170, or the case where due to the reaction thereof, a shock is applied to the main structure 200 of a satellite in the case where the holding power with respect to the deployable structure 170 is released. As a result, the deployable structure 170 is far from damage and the like, and a satellite constituted by the deployable structure 170 does not go out of the orbit. In addition to the above, in the case where the distal end 153b of the intermediate link 153 is on the side of the proximal end 151a of the support arm 151, an increased large power acts on the push rod 152 due to the same reason as that mentioned above, i.e. where the velocity component is small, even if the torque for driving the intermediate link 153 is constant. In this respect, even if the state is in such a state where, for example, a coefficient of friction has increased, so that the deployable structure 170 is initially difficult to deploy, the deployable structure 170 can be positively initiated.

Furthermore, since the connecting and cutting means 154 holds the boss portion 157 of the push rod 152 by means of the U-shaped concave 154a, the push rod 152 can be positively drawn nearer to the side of the main structure 200 in the case when the distal end 153b of the intermediate link 153 moves to the side of the proximal end 151a of the support arm 151, whereby the deployable structure 170 can positively be secured to the main structure 200. On the other hand, since the boss portion 157 disengages automatically with the concave 154 in the case when the distal end 153b of the intermediate link 153 moves to the side of the extension line of the distal end 151b of the support arm 151, the deployable structure 170 can positively be deployed.

Moreover, since the distal end 152b of the push rod 152 is rotatably connected to the holding horizontal member 174 by means of the rotating hinge 158, the push rod 152 may be swung at the distal end 152b thereof, as the fulcrum, in the case of the rotation of the intermediate link 153. Therefore, there is not a case where an unnatural force acts on the deployable structure 170 through the push rod 152.

In the following, the holding/releasing mechanism according to the second embodiment of the present invention will be described by referring to FIGS. 76 through 79 wherein the same components as that of the first embodiment illustrated in FIGS. 73 through 75 are designated by the same reference numbers and the explanation therefor will be simplified. The present second embodiment differs from the first embodiment in that the proximal end 151a of a support arm 151 is connected to a main structure 200 through a rotating hinge 162, while the distal end 152b of a push rod 152 is fixedly connected to a holding horizontal member 174.

More specifically, the support arm 151 swings at the rotating hinge 162, as the fulcrum, at the proximal end 151a of the support arm 151 as a result of the rotation of an intermediate link 153.

In the holding/releasing mechanism 150 constructed as described above, the support arm 151 swings at the proximal end 151a thereof, as the fulcrum, in case of the rotation of the intermediate link 153, so that there is no case where the push rod 152 moves relatively with respect to the deployable structure. Hence, there is no case where the push rod 152 collides with the deployable structure 170 in case of releasing the same, so that a damage to the deployable structure 70 can be prevented.

Figure 80:
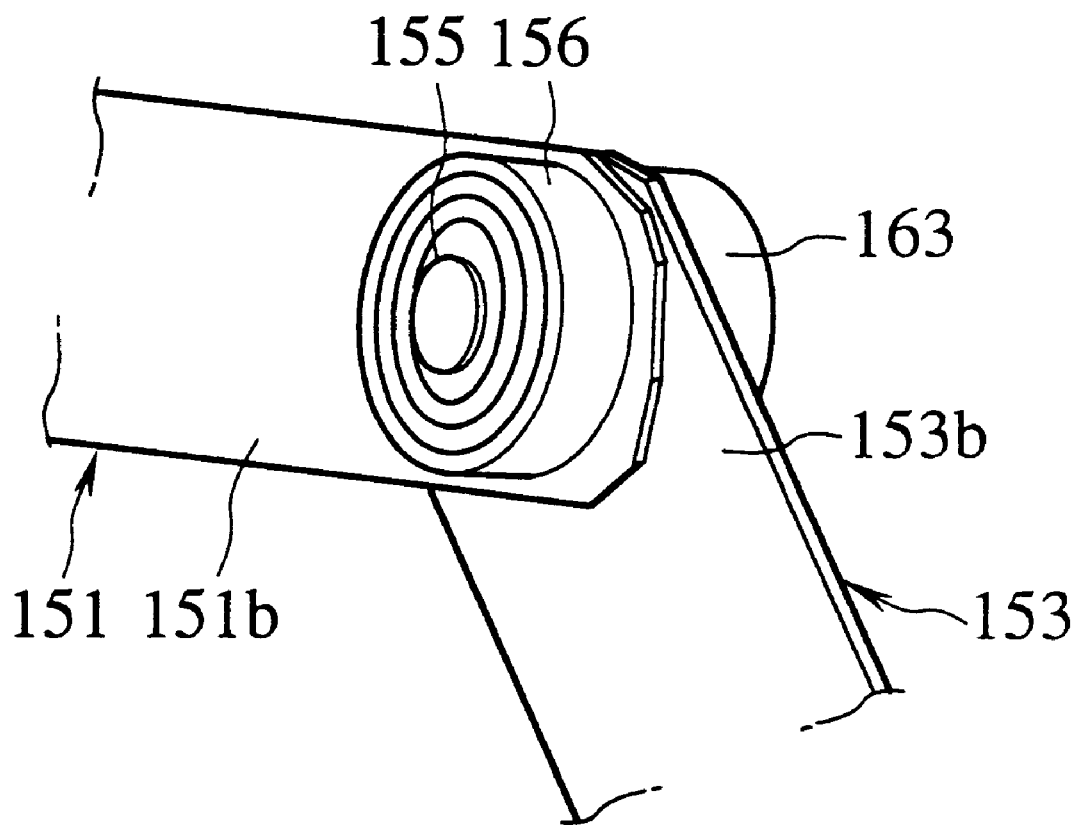
FIG. 80 is an explanatory drawing of a second embodiment of a holding/releasing mechanism according to the present invention.

In the following, the holding/releasing mechanism according to the third embodiment of the present invention will be described by referring to FIG. 80 wherein the present third embodiment differs from the above described first and second embodiments in that only a coupling portion for a support arm 151 and an intermediate link 153 is provided, so that the explanation will be made on merely the coupling portion in which the same components as that of the above described respective embodiments are designated by the same reference numbers and the description therefor will be simplified.

More specifically, a rotating hinge 155 is provided with a damper 163 for controlling the rotational speed of the intermediate link 153. The damper 163 is consisted of an impeller rotating in a viscous material, and which reduces the rotational speed of the intermediate link 153.

In the holding/releasing mechanism 150 provided with the damper 163 as described above, the intermediate link 153 can be adjusted in such that the rotational speed thereof comes to be not excessive, whereby the deploying speed of the deployable structure 170 can be made appropriate. As a result, the deployable structure can be released more smoothly.

In the above described respective embodiments, the invention has been constructed in such that the connecting and cutting means 154 is allowed to abut upon the proximal end 151a of the support arm 151 to stop the same in the state where the wire 159 has been stretched. In other words, the support arm 151 has been used as a stopper for the intermediate link 153. However, it may be constructed in such that another stopper means is separately disposed in place of the support arm 151. Particularly, in the second embodiment, it is preferred to provide such stopper means.

Moreover, while an example wherein the rotation driving means 156 is consisted of a spiral spring has been described in the above described respective embodiments, it may be constructed in such that the rotation of the rotation driving mechanism 156 is attained also by driving a motor and the like. Besides, the rotation driving means 156 is not used for only the releasing direction, but also for the securing direction in such a manner that the intermediate link 153 may be rotationally driven.

In this case, it becomes easily possible that the deployable structures 170 are secured to the main structure 200 in the folded state.

Furthermore, while an example wherein the holding/releasing mechanism has been applied to the deployable structure 170 in a satellite in the above described respective embodiments, the holding/releasing mechanism can be applied not only to satellites in outer space, but also the deployable structure on the ground and the like, besides the holding/releasing mechanism may be applied not only to the deployable structures, but also the one for holding and releasing other movable bodies which can be transformed or moved, as a matter of course.

In the holding/releasing mechanism according to the present invention, since the position of a movable body is positively restricted with respect to a main structure by means of the link structure consisted of the support arm, the intermediate link, and the push rod, whereby the movable body can be secured to the main structure. Thus, there is no vibration or slippage of the movable body with respect to the main structure. Accordingly, the damage on the movable body and the like due to the vibration or the slippage thereof can be positively prevented.

In the case when a movable body is released from the holding state, the push rod moves by means of the rotation of the intermediate link, and due to the movement of the push rod, the movable body can start to move towards the original state and the position. As a consequence, even if the movable body in the holding state is in the state of geometrical singularity, or a state of increasing coefficient of static friction, the movable body can positively be moved to the original state and the position.

Besides, in the intermediate link, since the distal end moves so as to draw a circle centering around the proximal end thereof, the velocity component of the distal end towards the direction of the push rod becomes the smallest on the distal end side of the support arm and the side of the extension line of the same support arm. For this reason, even if the intermediate link was rotating at a constant speed from the beginning, the velocity at which the movable body goes away from the main structure increases gradually, while the movable body does not leave abruptly in the case when it leaves from the connecting and cutting means. Thus, it is possible to prevent such an accident where a shock is applied to the movable body and the like in case of the release. As a result, it is possible to prevent from causing damage to the movable body and the like. In addition to the above, in the case where the distal end of the intermediate link is on the side of the proximal end of the support arm, an increased large power acts on the push arm due to the same reason as that mentioned above wherein the velocity component is small, even if the torque for driving the intermediate link is constant. In this respect, even if the state is in such a state where, for example, a coefficient of friction has increased, so that a movable body is initially difficult to move, the movement of the movable body can be positively initiated.

Furthermore, in a modification wherein the connecting and cutting means is consisted of a concave opened on the side of the extension line of the distal end of an intermediate link, a push rod can be positively drawn nearer to the side of a main structure by the rotation of the distal end of the intermediate link towards the side of the proximal end of a support arm, whereby a movable body can positively be secured to the main structure. Besides, since the push rod disengages automatically with the concave in the case when the distal end of the intermediate link moves to the side of the extension line of the distal end of the support arm, the movable body can positively be released.

In a modification wherein an intermediate link is provided with a rotation driving means, it is easily possible to hold fixedly a movable body to a main structure, or to release the movable body from the main structure. Particularly, if the rotation driving means has been disposed in the releasing direction, the movable body can be automatically released even at a position where human power cannot directly reach, for example, that of satellite in outer space.

Moreover, in a modification wherein the proximal end of a support arm is fixedly connected to a main structure, while the distal end of a push rod is rotatably connected to a movable body, the push rod can be swung at the distal end thereof, as the fulcrum, with the rotation of an intermediate link. Therefore, there is not a case where an unnatural force acts on the movable body due to the rotation of the intermediate link.

Still further, in a modification wherein the proximal end of a support arm is rotatably connected to a main structure, while the distal end of a push rod is fixedly connected, the support arm swings at the proximal end, as the center thereof, with the rotation of an intermediate link. Accordingly, an unnatural force does not act on the place defined between the push rod and the movable body even if the push rod is fixedly connected to the movable body. Besides, since the push rod is fixedly connected to the movable body, there is not the case where the push rod collides with the movable body at the time of releasing them.

Furthermore, in a modification wherein an intermediate link is provided with a damper for controlling the rotational speed, the magnitude of the rotational speed in the intermediate link can suitably be reduced, so that a movable body can be released more smoothly.

It should be understood that many modifications and adaptations of the invention will become apparent to those skilled in the art and it is intended to encompass such obvious modifications and changes in the scope of the claims appended hereto.

What is claimed is:

1. A linked structure, comprising:
   two opposite parallel members;
   two opposite nonparallel members forming a quadrangle by being coupled to said two opposite parallel members through a hinge; and
   an intermediate coupling member having each end coupled through each hinge to an intermediate part of each of said two opposite parallel members so that the intermediate coupling member is parallel to one of said two opposite nonparallel members, wherein
   distance between hinges for the other of said two opposite nonparallel members can be changed.

2. The linked structure according to claim 1, wherein the distance between said hinges can be changed so that one end of one of said parallel members can be moved along one end of the corresponding nonparallel member.

3. The linked structure according to claim 1, wherein the distance between said hinges can be changed so that the other of said two opposite nonparallel members can be elongated or shortened.

4. The linked structure according to claim 1, further comprising:
   a diagonal member having one end coupled to one end of said the other of said two opposite nonparallel members and having the other end coupled to said one of said two opposite nonparallel members through a slider, wherein
   said slider can be moved along the axial direction of said one of said two opposite nonparallel members.

5. The linked structure according to claim 1, further comprising:
   a diagonal member having one end coupled to one end of one of said parallel members and having other end coupled to said one of said two opposite nonparallel members through a slider, wherein
   said slider can be moved along the axial direction of said one of said two opposite nonparallel members.

6. The linked structure according to claim 2, further comprising:
   a diagonal member having one end coupled to one end of said the other of said two opposite nonparallel members and having the other end coupled to said one of said two opposite nonparallel members through a slider, wherein
   said slider can be moved along the axial direction of said one of said two opposite nonparallel members.

7. The linked structure according to claim 3, further comprising:
   a diagonal member having one end coupled to one end of said the other of said two opposite nonparallel members and having the other end coupled to said one of said two opposite nonparallel members through a slider, wherein
   said slider can be moved along the axial direction of said one of said two opposite nonparallel members.

* * * * *